(12) United States Patent
Kubo et al.

(10) Patent No.: US 7,414,512 B2
(45) Date of Patent: Aug. 19, 2008

(54) OPERATING DEVICE, POSITION-SWITCHING DEVICE, AND MAGNETO-OPTICAL RECORDING/REPRODUCING APPARATUS

(75) Inventors: Kenji Kubo, Ikoma (JP); Isao Shinohara, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 345 days.

(21) Appl. No.: 10/569,543

(22) PCT Filed: Aug. 25, 2004

(86) PCT No.: PCT/JP2004/012614

§ 371 (c)(1),
(2), (4) Date: Feb. 27, 2006

(87) PCT Pub. No.: WO2005/022527

PCT Pub. Date: Mar. 10, 2005

(65) Prior Publication Data
US 2007/0050796 A1     Mar. 1, 2007

(30) Foreign Application Priority Data
Aug. 28, 2003 (JP) .............................. 2003-303782
Feb. 20, 2004 (JP) .............................. 2004-043743

(51) Int. Cl.
*H01H 71/18* (2006.01)
*H01H 61/04* (2006.01)

(52) U.S. Cl. .................... 337/139; 337/140; 60/527; 60/528

(58) Field of Classification Search ............... 337/139, 337/140, 143, 123, 128, 382; 720/658; 360/250; 60/527, 528
See application file for complete search history.

(56) References Cited

U.S. PATENT DOCUMENTS

| | | | | | |
|---|---|---|---|---|---|
| 3,594,675 | A | * | 7/1971 | Willson | 337/140 |
| 3,634,803 | A | * | 1/1972 | Willson et al. | 337/123 |
| 3,652,969 | A | * | 3/1972 | Willson et al. | 337/140 |
| 3,893,055 | A | * | 7/1975 | Jost et al. | 337/140 |
| 3,922,591 | A | * | 11/1975 | Olsen | 318/676 |
| 4,544,988 | A | * | 10/1985 | Hochstein | 361/211 |
| 4,551,974 | A | * | 11/1985 | Yaeger et al. | 60/527 |
| 4,551,975 | A | * | 11/1985 | Yamamoto et al. | 60/528 |
| 4,684,913 | A | * | 8/1987 | Yaeger | 337/140 |

(Continued)

FOREIGN PATENT DOCUMENTS

EP         380256 A1 *  8/1990

(Continued)

*Primary Examiner*—Anatoly Vortman
(74) *Attorney, Agent, or Firm*—Steptoe & Johnson LLP

(57) ABSTRACT

An operating device has a pair of linear members (43, 44) made of a shape memory alloy and contracting axially due to heat generated by electrification and generating tension in the contracting direction, a drive lever (19) supported to pivot about a pivot shaft (19a), a pair of drive rods (33, 34) respectively connected to both sides of the drive lever (19) with the pivot shaft (19a) being disposed between the sides of the drive lever (19), and a power supply circuit for selectively electrifying the linear members (43, 44). One end of each of the linear members (43, 44) is fixed to a stationary member, and the other end is connected to each of the drive rods (33, 34).

9 Claims, 42 Drawing Sheets

U.S. PATENT DOCUMENTS

| | | | |
|---|---|---|---|
| 4,761,955 A * | 8/1988 | Bloch | 60/528 |
| 4,887,430 A * | 12/1989 | Kroll et al. | 60/527 |
| 4,932,210 A * | 6/1990 | Julien et al. | 60/527 |
| 4,965,545 A * | 10/1990 | Johnson | 337/140 |
| 5,410,290 A * | 4/1995 | Cho | 337/140 |
| 5,463,514 A * | 10/1995 | Yaeger | 360/254.3 |
| 5,629,662 A * | 5/1997 | Floyd et al. | 337/36 |
| 5,684,448 A * | 11/1997 | Jacobsen et al. | 337/140 |
| 5,912,786 A * | 6/1999 | Nicklos et al. | 360/99.09 |
| 6,133,816 A * | 10/2000 | Barnes et al. | 337/123 |
| 6,279,869 B1 * | 8/2001 | Olewicz | 251/7 |
| 6,384,707 B2 * | 5/2002 | Minners | 337/139 |
| 6,851,260 B2 * | 2/2005 | Mernøe | 60/527 |
| 2002/0046622 A1 * | 4/2002 | Yoshida | 74/572 |
| 2004/0068985 A1 * | 4/2004 | Mernoe | 60/527 |
| 2005/0195064 A1 * | 9/2005 | Biasiotto et al. | 337/140 |

FOREIGN PATENT DOCUMENTS

| | | | |
|---|---|---|---|
| JP | 59157878 A | * | 9/1984 |
| JP | 05101303 A | | 4/1993 |
| JP | 08022650 A | | 1/1996 |
| JP | 09-120765 | | 5/1997 |
| JP | 2001003850 A | | 1/2001 |
| JP | 2002032938 A | | 1/2002 |

* cited by examiner

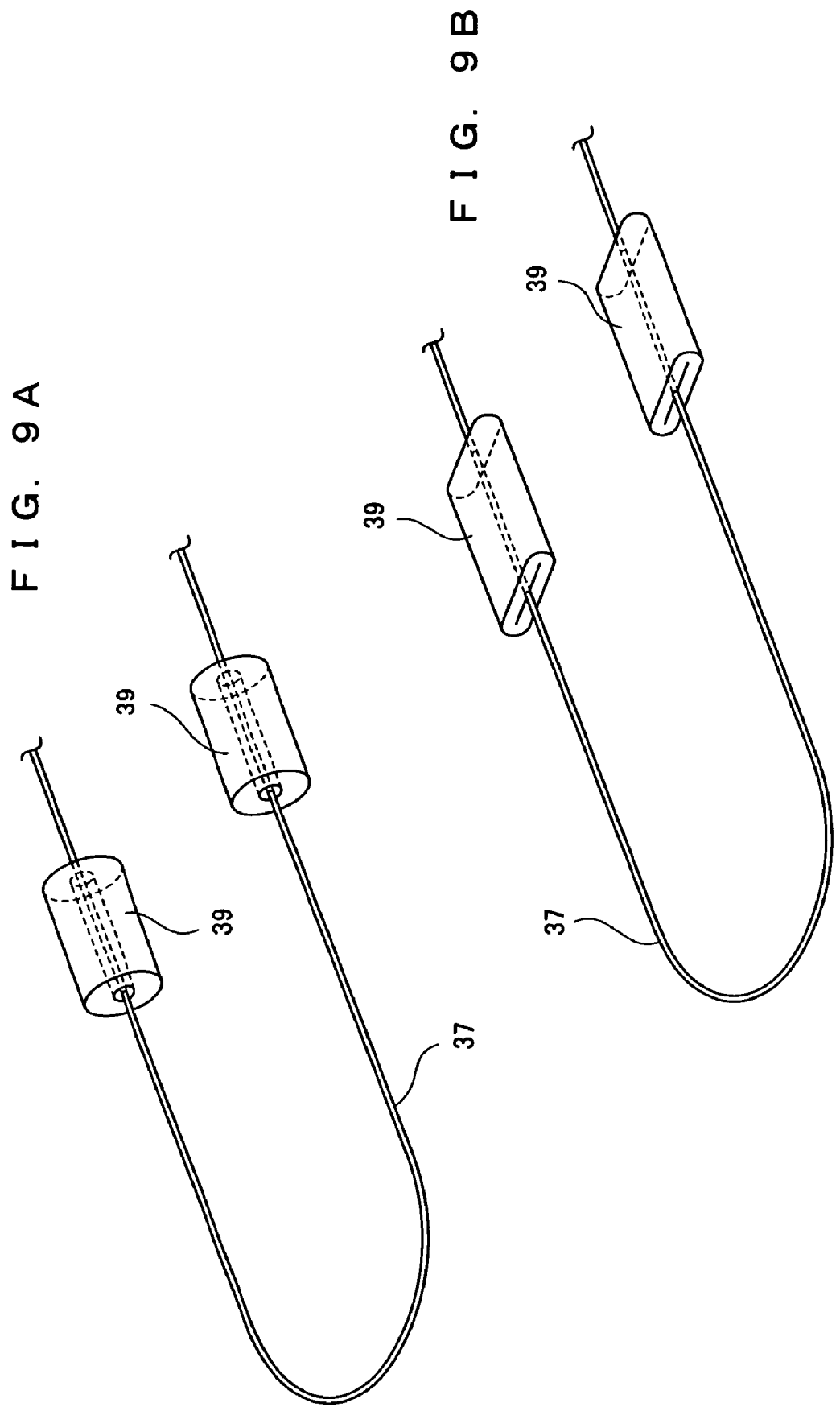

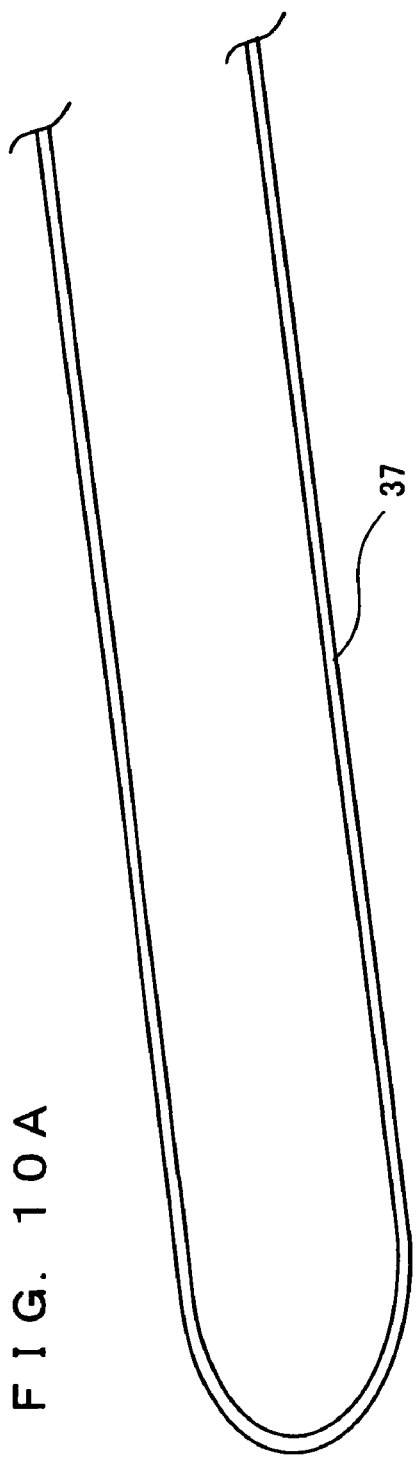

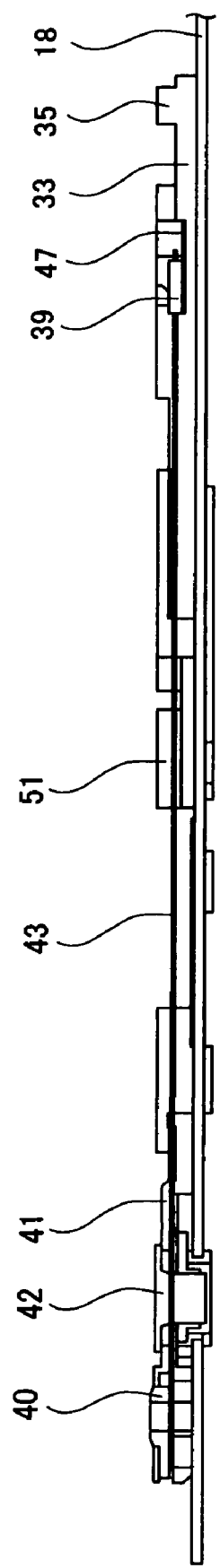
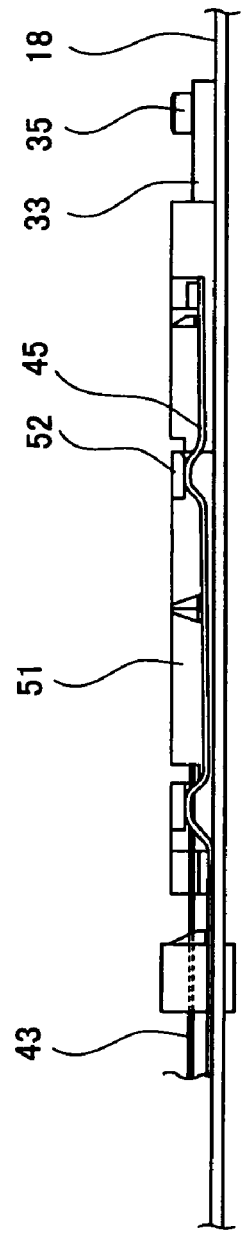
FIG. 12A
FIG. 12B

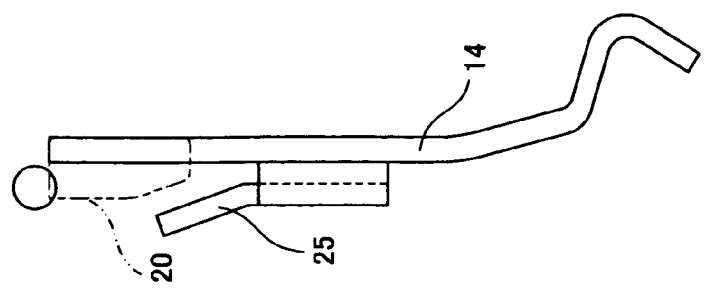
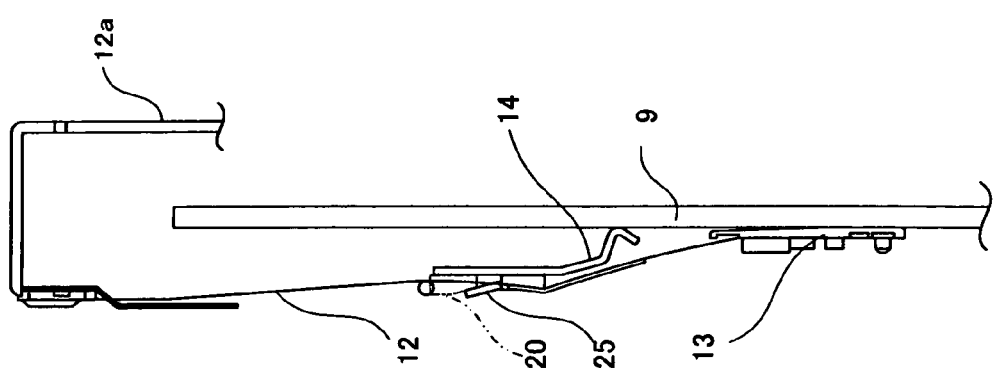
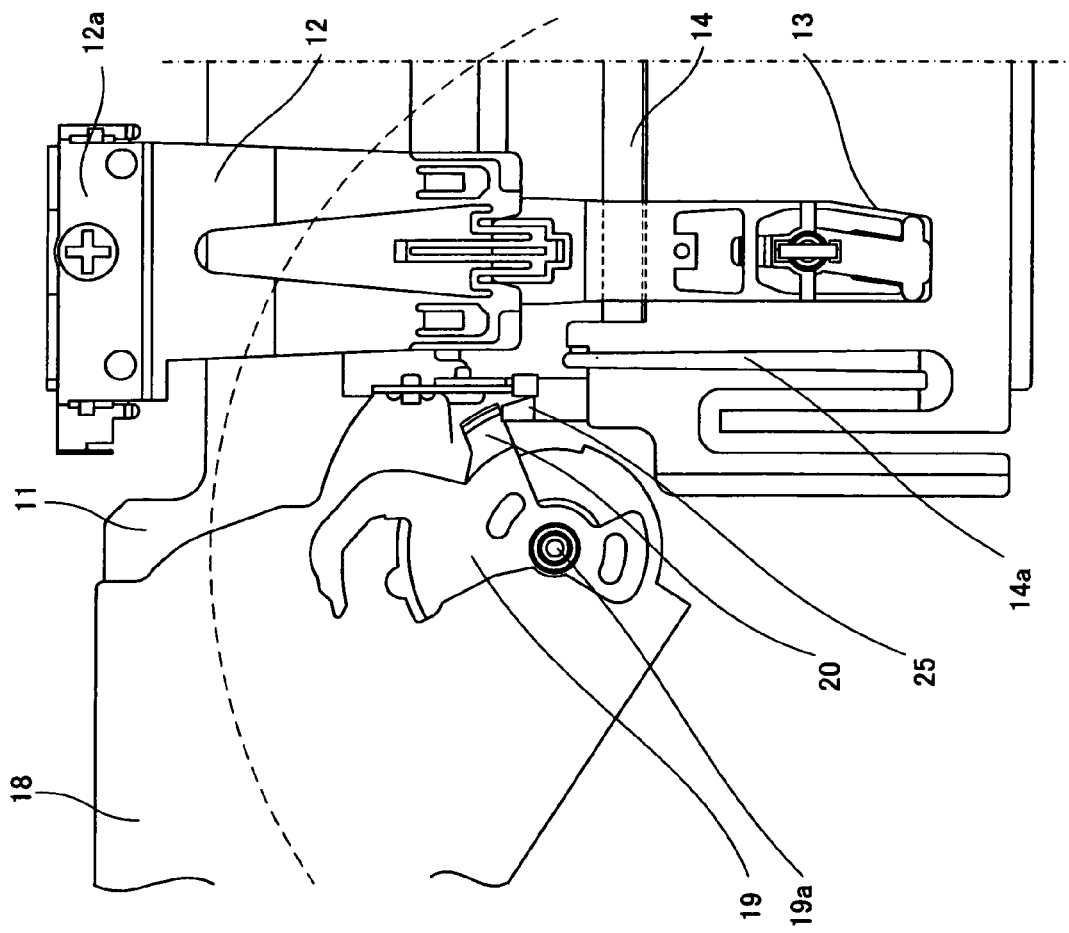

OPERATING DEVICE, POSITION-SWITCHING DEVICE, AND MAGNETO-OPTICAL RECORDING/REPRODUCING APPARATUS

CLAIM OF PRIORITY

This application claims priority under 35 USC 371 of International Application No. PCT/JP2004/012614, filed on Aug. 25, 2004, which claims priority of Japanese Patent Application No. 2003-303782, filed on Aug. 28, 2003 and Japanese Patent Application No. 2004-043743, filed on Feb. 20, 2004, each of which is incorporated by reference in its entirety.

TECHNICAL FIELD

The present invention relates to a magneto-optical recording/reproducing apparatus capable of recording and reproducing information on a disc and a position switching device preferably used for the magneto-optical recording/reproducing apparatus, and specifically relates to an operating device and a position switching device for switching the position of a magnetic head unit in response to the driving of the operating device.

BACKGROUND ART

In recent years, magneto-optical recording/reproducing apparatuses have become compact with higher performance, in which reading and reproducing are performed by optical pickups on optical discs acting as recording mediums. Portable MD recorders using MiniDisc (MD) have become generally available as such portable magneto-optical recording/reproducing apparatuses with smaller size and higher performance.

A conventional magneto-optical recording/reproducing apparatus is disclosed in, for example, Japanese Patent Laid-Open No. 2002-32938. Referring to FIGS. 35 to 42, the magneto-optical recording/reproducing apparatus will be discussed below.

As shown in FIG. 35, in the magneto-optical recording/reproducing apparatus, an electric circuit 102 and a mechanical mechanism 103 are stored in a body cabinet 101. The magneto-optical recording/reproducing apparatus has a lid 104 covering the opening of the body cabinet 101. The mechanical mechanism 103 comprises a mechanical base 105 and a mechanical part 106 placed on the mechanical base 105. A mini disc 107 loaded in a storage space between the mechanical base 105 and the mechanical part 106 has an optical disc 109, on which signals such as a music signal can be recorded and reproduced, in a cartridge 108. The optical disc 109 is a known disc such as a magneto-optical disc.

Referring to FIG. 36, the following will discuss various components placed on a holder 110 of the mechanical part 106. A lifter 111 has a hinge shaft 112 which is engaged with a hinge bearing 113 formed on the holder 110, so that the lifter 111 swings up and down. A drive rod 114 is slidably placed on the holder 110. A wedge 115 of the drive rod 114 is engaged with and removed from a wedge receiving portion 116 formed on the lifter 111.

A driving gear 118 is placed on a motor 117 screwed onto the holder 110, and a reduction gear 119 engaged with the driving gear 118 is rotatably placed on the holder 110 via a shaft 120. A transmission gear unit 122 is placed between the reduction gear 119 and an SW piece 121 provided on the drive rod 114. The transmission gear unit 122 is made up of a worm wheel 124 and a feed gear 125 which are rotated together via a shaft 123. As shown in FIG. 37, a worm 126 is integrally placed on the reduction gear 119. The worm 126 is engaged with the worm wheel 124 and the feed gear 125 is engaged with an engaging claw 127 of the SW piece 121.

A magnetic head unit 128 has a magnetic head 129 which can swing up and down. The base end of the magnetic head unit 128 is screwed onto a head angle 130, the head angle 130 is screwed onto a base 131, and the base 131 is placed on the mechanical base 105. As shown in FIG. 38A, when the lifter 111 swings to a lower position and does not support the magnetic head 129, the magnetic head 129 comes into a recording state where the magnetic head 129 is in sliding contact with the optical disc 109. When the lifter 111 swings to an upper position and lifts the magnetic head 129, as shown in FIG. 38B, the magnetic head 129 comes into a reproduction state where the magnetic head 129 is separated from the optical disc 109. As shown in FIG. 39, a spindle motor 132 for rotating the optical disc 109 is provided on the mechanical base 105.

In this configuration, the driving gear 118 is rotated by the driving of the motor 117, the reduction gear 119 engaged with the driving gear 118 is rotated with the worm 126 by the rotation of the driving gear 118, and the worm wheel 124 engaged with the worm 126 is rotated with the feed gear 125 via the shaft 123 by the rotation of the worm 126.

The SW piece 121 engaged with the feed gear 125 via the engaging claw 127 is moved with the drive rod 114 in the axial direction of the shaft 123 by the rotation of the feed gear 125. The moving direction of the drive rod 114 is determined by the rotation direction of the motor 117. The drive rod 114 is moved forward and backward in response to the normal and reverse rotations of the motor 117.

For example, FIGS. 40A and 40B show the reproduction state. As shown in FIG. 40A, the wedge 115 of the drive rod 114 presses up the wedge receiving portion 116 of the lifter 111 and keeps the lifter 111 at the upper position. Since the lifter 111 lifts the magnetic head 129, the magnetic head 129 is separated from the optical disc 109.

In this state, as shown in FIG. 40B, when the driving gear 118 is rotated counterclockwise by the driving of the motor 117, the feed gear 125 rotates via the reduction gear 119, the worm 126, the worm wheel 124, and the shaft 123, and as shown in FIG. 41B, the engaging claw 127 is moved to the right of FIG. 40B together with the SW piece 121 and the drive rod 114 by the rotation of the feed gear 125. With this configuration, as shown in FIG. 41A, the wedge 115 is moved in a direction separating from the wedge receiving portion 116 of the lifter 111. The magnetic head 129 moves close to the optical disc 109 as the lifter 111 swings to the lower position.

When the engaging claw 127 reaches one end of the feed gear 125 as shown in FIG. 42B, the wedge 115 moving with the SW piece 121 and the drive rod 114 reaches a position where the wedge receiving portion 116 of the lifter 111 is not pressed as shown in FIG. 42A. The lifter 111 is placed on the lower position and the magnetic head 129 is brought into sliding contact with the optical disc 109.

As described above, in the conventional magneto-optical recording/reproducing apparatus, the motor 117 is mounted on the holder 110 as shown in FIG. 37 as a mechanism for driving the lifter 111, and the turning force of the motor 117 is transmitted through the driving gear 118, the reduction gear 119, the worm 126, the worm wheel 124, and the feed gear 125. Thus, the upper part of the holder 110 requires a relatively large height to place these components.

This height is determined by one of a value obtained by adding the thickness of the body of the motor 117 and the thickness of the driving gear 118, a value obtained by adding the thickness of the body of the motor 117, the thickness of the reduction gear 119, and the height of a gap between the motor 117 and the reduction gear 119, and a value obtained by adding the diameter of the worm wheel 124, the thickness of the reduction gear 118, and the height of a gap between the worm wheel 124 and the reduction gear 118. Since it is difficult to reduce this height, a portable MD recorder has a large thickness.

Further, the structure becomes large because of the complicated reduction mechanism in which the turning force of the motor 117 is reduced by two or more gears and then transmitted. Moreover, the motor is expensive. For this reason, the number of components increases and the manufacturing cost rises. The control of an electric signal also tends to become complicated in order to improve trackability for the electric signal.

Similar problems rise even if a plunger is used instead of the motor 117. The size of the mechanism is determined by the size of the plunger and the plunger causes high cost.

DISCLOSURE OF THE INVENTION

In order to solve the problems, an operating device of the present invention comprises a pair of linear members made of a shape memory alloy and contracting axially due to heat generated by electrification and generating tension in the contracting direction, a movable member supported on a fixing member to be rotatable about a pivot shaft, a pair of drive rods respectively connected to both sides of the movable member with the pivot shaft being disposed therebetween, and a power supply circuit for selectively electrifying the linear members, wherein each of the linear member has one end connected to the fixing member and the other end connected to the drive rod.

With this configuration, when one of the linear members is connected to one side of the movable member via one of the drive rods and electrified, tension generated by the shrinkage of the linear member acts on one side of the movable member and the movable member rotates about the pivot shaft in one direction, and the other linear member extends with initial tension. The other liner member is connected to the other side of the movable member via the other drive rod.

When the other extended linear member is electrified, tension generated by the shrinkage of the linear member acts on the other side of the movable member and the movable member rotates about the pivot shaft in the other direction. Therefore, the linear members are alternately electrified and caused to repeatedly contract and extend, so that the movable member is repeatedly rotated about the pivot shaft.

It is thus possible to achieve an operating device enabling the movable member to repeatedly rotate about the pivot shaft without the necessity for the power of a motor or the like. Since the linear members act as a driving force source instead Of a motor or the like, which has conventionally been an obstacle to a reduction in thickness, the thickness of the operating device can be easily reduced and lower manufacturing cost is achieved. Further, since the linear members are kept tensed with the initial tension and then are caused to contract from this state, an interval of the extension and contraction of the linear members is increased, and thus the range of the swinging angles of the movable member can be increased.

The pair of linear members, which are alternately electrified, is caused to repeatedly contract and extend and the movable member repeatedly rotates about the pivot shaft, so that the operating device can be obtained without the necessity for the power of a motor or the like and the tension of one of the linear members can be used as the initial tension of the other linear member. Further, operations can be performed by simple control of passing or interrupting current to the linear members. Therefore, the linear members (for example, a wire having a diameter of about 0.1 mm) act as a driving force source instead of a motor or the like, which has conventionally been an obstacle to a reduction in thickness, so that the thickness of the operating device can be reduced with relatively ease. As the operating device becomes slim, a mechanism for driving a lifter can be easily made using low-profile components, thereby achieving lower manufacturing cost.

Further, a single wire is bent to form the pair of linear members, so that the number of components can be reduced as compared with the case where a wire is used for each of the linear members.

A position switching device of the present invention comprises the operating device, a lifter held by a fixing member to be swingable between an active position and an inactive position, a drive lever composed of a movable member of the operating device, the drive lever having a guide surface for urging the lifter in a swinging direction, releasing the lifter on the inactive position at a rotation stop point in one direction of the movable member, and swinging the lifter to the active position at a rotation stop point in the other direction of the movable member, and a locking unit for locking the drive lever at the rotation stop points in both directions around the pivot shaft, wherein the locking unit comprises a cam provided on the drive lever, a locking arm having a base end pivotally supported on the fixing member and a leading end rotatably supporting a cam following roller slidingly contact with the cam, and an elastic member for urging the locking arm in a direction of pressing the cam following roller to the cam, and the cam comprises a one-side active surface for applying force received from the cam following roller to the drive lever swinging in the one direction, and an other-side active surface for applying force received from the cam following roller to the drive lever swinging in the other direction.

With this configuration, both of the linear members of the operating device are alternately electrified to cause the linear members to repeatedly contract and extend, so that the drive lever made up of the movable member repeatedly rotates about the pivot shaft. When the drive lever is rotated in one direction by tension generated by the shrinkage of one of the linear members, the guide surface moves in a direction separating from the lifter and the drive lever rotates to the rotation stop point of one direction and swings the lifter to the inactive position. When the drive lever is rotated in the other direction by tension generated by the shrinkage of the other linear member, the guide surface moves in a direction approaching the lifter and urges the lifter in the swinging direction, and the drive lever rotates to the rotation stop point of the other direction and swings the lifter to the active position.

The locking unit locks the drive lever on the rotation stop points of both directions around the pivot shaft, so that the lifter is kept on the active position or the inactive position. In a state in which the locking unit is locked on the rotation stop point of one direction or the rotation stop point of the other direction, the cam following roller comes into sliding contact with the one-side active surface or the other-side active surface of the cam, and the pressing force of the elastic member for urging the locking arm acts in a direction of pressing the drive lever to the rotation stop point of one direction or the rotation stop point of the other direction.

The locking unit acts in a similar manner while the drive lever rotates in one direction or the other direction. For example, in the first half of the rotation, the drive lever is rotated from the rotation stop point of the other direction to the rotation stop point of one direction by tension generated by the shrinkage of the linear member; meanwhile the cam following roller is in sliding contact with the other-side active surface of the cam. In this process, as described above, the pressing force of the elastic member acts in the direction of pressing the drive lever to the rotation stop point of the other direction. The tension of one of the linear members rotates the drive lever to the rotation stop point of one direction against the pressing force of the elastic member.

In the latter half of the rotation after the rotation of the drive lever moves the cam following roller from the other-side active surface to the one-side active surface of the cam, the pressing force of the elastic member is applied through the cam following roller to the drive lever swinging in one direction. The pressing force of the elastic member is combined with the tension of the shrinking linear member, accelerates the action of the drive lever, and contributes to the extension of the other linear member.

In response to tension generated by the shrinkage of one of the linear members and the pressing force of the elastic member, the other linear member extends longer than a typical unloaded and non-electrified state. This state is kept by the locking unit which locks the drive lever on the rotation stop points of both directions around the pivot shaft. The excessive extension increases the contraction coefficients of the linear members during contraction, increases an interval between the extension and contraction of the linear members, and increases the range of angles for swinging the drive lever.

The position switching device of the present invention further comprises a pair of lead portions formed in parallel with the linear members on a flexible printed board providing the power supply circuit of the operating device, wherein each of the lead portions has a leading end fixed on the drive rod and a base end fixed on the fixing member so that the lead portions can be distorted with the shrinkage of the corresponding linear members, the drive lever and the drive rods are connected by inserting connecting pins formed in one of the drive lever and the drive rods into oval connecting holes formed in the other of the drive lever and the drive rods, the connecting holes and the connecting pins are engaged with each other in the moving direction of the drive rods when the linear members are tensed by contraction and extension thereof, and the connecting holes accept the movement of the connecting pins in the moving direction of the drive rods when the linear members are loosened in a non-electrified state.

In this configuration, when the extended linear member is electrified, the linear member contracts and the drive rod moves with tension being generated between the drive rods and the fixing member, the drive lever rotates while the connecting holes and the connecting pins are engaged with each other in the moving direction of the drive rods, and the lead portion corresponding to the contracting linear member is elastically deformed and distorted with the movement of the drive rods.

In the non-electrified state, the contracting linear member returns to a predetermined length of an unloaded state and is loosened in a distorted manner between the drive rod and the fixing member. When the linear member is loosened, the lead portion returning to a linear state due to elastic restoring force presses the drive rod, the connecting holes accept the movement of the connecting pins while the locking unit locks the drive lever, and the drive rod moves to keep the linear member in a linear state.

In this way, in response to tension generated by the shrinkage of one of the linear members and the pressing force of the elastic member, the other linear member extends longer than the typical unloaded and non-electrified state, thereby increasing the contraction coefficients of the linear members during contraction, an interval between extension and contraction, and the range of angles for swinging the drive lever.

The lead portion corresponding to the contracting linear member is elastically deformed and distorted with the movement of the drive rod, so that the linear member having been loosed in a distorted manner between the drive rod and the fixing member in the non-electrified state can be linearly extended by the elastic restoring force of the lead portion and kept in a linear state.

The position switching device of the present invention further comprises a convex portions respectively formed on the one-side active surface and the other-side active surface of the cam, the convex portion making contact with the cam following roller to prevent the drive lever from rotating in a non-electrified state.

With this configuration, the convex portions of the cam prevent the drive lever from rotating in the non-electrified state.

In this way, the convex portion which makes contact with the cam following roller and prevents the drive lever from rotating in the non-electrified state is formed on each of the one-side active surface and the other-side active surface of the cam, so that it is not always necessary to electrify the linear members and thus minimize power consumption.

Further, in the non-electrified state of the linear member, even when the linear member naturally contracts due to a high temperature, a locking state can be kept and thus reliability improves.

Moreover, the position switching device of the present invention is configured such that, in the non-electrified state, initial tension acts in a contracting direction on the linear member not being switched from an electrified state to the non-electrified state, and $F_0 > P_0$ is satisfied wherein $P_0$ represents force acting on the drive lever along its rotation direction thereof based on the initial tension and $F_0$ represents force acting on the convex portions of the cam along the rotation direction of the drive lever based on force F acting from the locking arm, and in the electrified state, $T > F_0$ is satisfied wherein T represents force acting on the drive lever along its rotation direction thereof based on the contractive force of the electrified linear member.

With this configuration, the rotation of the drive lever can be preferably prevented in the non-electrified state; meanwhile the drive lever preferably rotates in the electrified state.

According to the position switching device of the present invention, even in the case where the linear member naturally contracts due to a high temperature in the non-electrified state of the linear member and the drive lever rotates such that the cam following roller moves over the top of the convex portion of the cam from a first tilted surface on the base side of the convex portion, the cam following roller has a second tilted surface formed near the top of the cam on the convex portion so that urging force from the locking arm is larger than the rotary force of the drive lever on the second tilted surface.

With this configuration, even in the case where the linear member naturally contracts due to a high temperature during the non-electrified state of the linear member, when the cam following roller reaches the second tilted surface of the convex portion, the urging force of the locking arm exceeds the rotary force of the drive lever and thus the drive lever comes into a locking state.

A magneto-optical recording/reproducing apparatus of the present invention comprises the position switching device and a magnetic head provided to be swingable between a position at which the magnetic head slidingly contact with an optical disc and a position at which the magnetic head separates from the optical disc, wherein the position switching device has a lifter for holding, in an active position, the magnetic head at the position at which the magnetic head separates from the optical disc, and releasing, in an inactive position, the magnetic head at the position at which the magnetic head slidingly contacts with the optical disc.

With this configuration, when one of the linear members of the operating device is electrified, tension generated by the shrinkage of the linear member rotates the drive lever in one direction, the guide surface moves in a direction separating from the lifter, the lifter swings to the inactive position, and the magnetic head approaches the optical disc.

When the drive lever rotates to the rotation stop point of one direction, the lifter swings to the inactive position, the locking unit locks the drive lever on the rotation stop point of one direction around the pivot shaft, and the lifter releases the magnetic head on the position making sliding contact with the optical disc.

When the drive lever is rotated by the shrinkage of one of the linear members, the connecting holes of the other side of the drive lever and the connecting pins of the other drive rod are engaged with each other, and the other linear member connected to the drive rod extends with the rotation of the drive lever.

While the drive lever rotates from the rotation stop point of the other direction to the rotation stop point of one direction, in the first half of rotation, the cam following roller comes into sliding contact with the other-side active surface of the cam and the pressing force of the elastic member acts in a direction of pressing the drive lever to the rotation stop point of the other direction. In the latter half of rotation, the cam following roller comes into sliding contact with the one-side active surface of the cam, the pressing force of the elastic member presses the drive lever in one direction, the pressing force is combined with the tension of the contracting linear member, accelerates the action of the drive lever, and contributes to the extension of the other linear member. The other extending linear member extends longer than the typical unloaded and non-electrified state. The excessive extension increases the contraction coefficients of the linear members during contraction, an interval between the extension and contraction of the linear members, and the range of angles for swinging the drive lever.

When one of the linear members contracts and the drive rod moves, the lead portion corresponding to the contracting linear member is elastically deformed and distorted with the movement of the drive rod. The contracting linear member returns to the predetermined length of the unloaded state and is loosened in a distorted manner in the non-electrified state, the lead portion presses the drive rod with elastic restoring force and the connecting holes accept the movement of the connecting pins, so that the drive rod moves and the linear member returns to a linear state.

When the other extended linear member is electrified, tension generated by the shrinkage of the linear member rotates the drive lever in the other direction and moves the guide surface in a direction approaching the lifter. The guide surface presses the lifter and swings the lifter to the active position, and the magnetic head swings in a direction separating from the optical disc. When the drive lever rotates to the rotation stop point of the other direction, the lifer swings to the active position, the locking unit locks the drive lever on the rotation stop point of the other direction around the pivot shaft, and the lifter keeps the magnetic head on a position separated from the optical disc.

According to the magneto-optical recording/reproducing apparatus of the present invention, the operating device can be reduced in thickness and manufacturing cost can be achieved by the operating device in which the movable member repeatedly operates with the pair of linear members acting as a driving force source. The pressing force of the locking unit can accelerate the action of the drive lever and contribute to the extension of the linear member with the initial tension. The linear members are extended longer than the unloaded and non-electrified state, so that an increased interval between the extension and contraction of the linear members can increase the range of swinging angles of the drive lever. The linear members can be kept in a linear state by the elastic restoring force of the flexible printed board which is distorted along with the contracting linear members. The present invention is applicable to a magneto-optical recording/reproducing apparatus capable of recording and reproducing information on a disc.

BRIEF DESCRIPTION OF THE DRAWINGS

FIGS. 9A and 9B are perspective views showing the steps of mounting a wire of the lifter driving part;

FIGS. 10A and 10B are perspective views showing the steps of mounting the wire of the lifter driving part;

FIGS. 12A and 12B are a principle part enlarged side view and a principle part enlarged view of the lifter driving part;

FIGS. 23A, 23B, and 23C are an enlarged plan view, an enlarged side view, and a principle part enlarged view of the magnetic head unit;

BEST MODE FOR CARRYING OUT THE INVENTION

Figure 1:
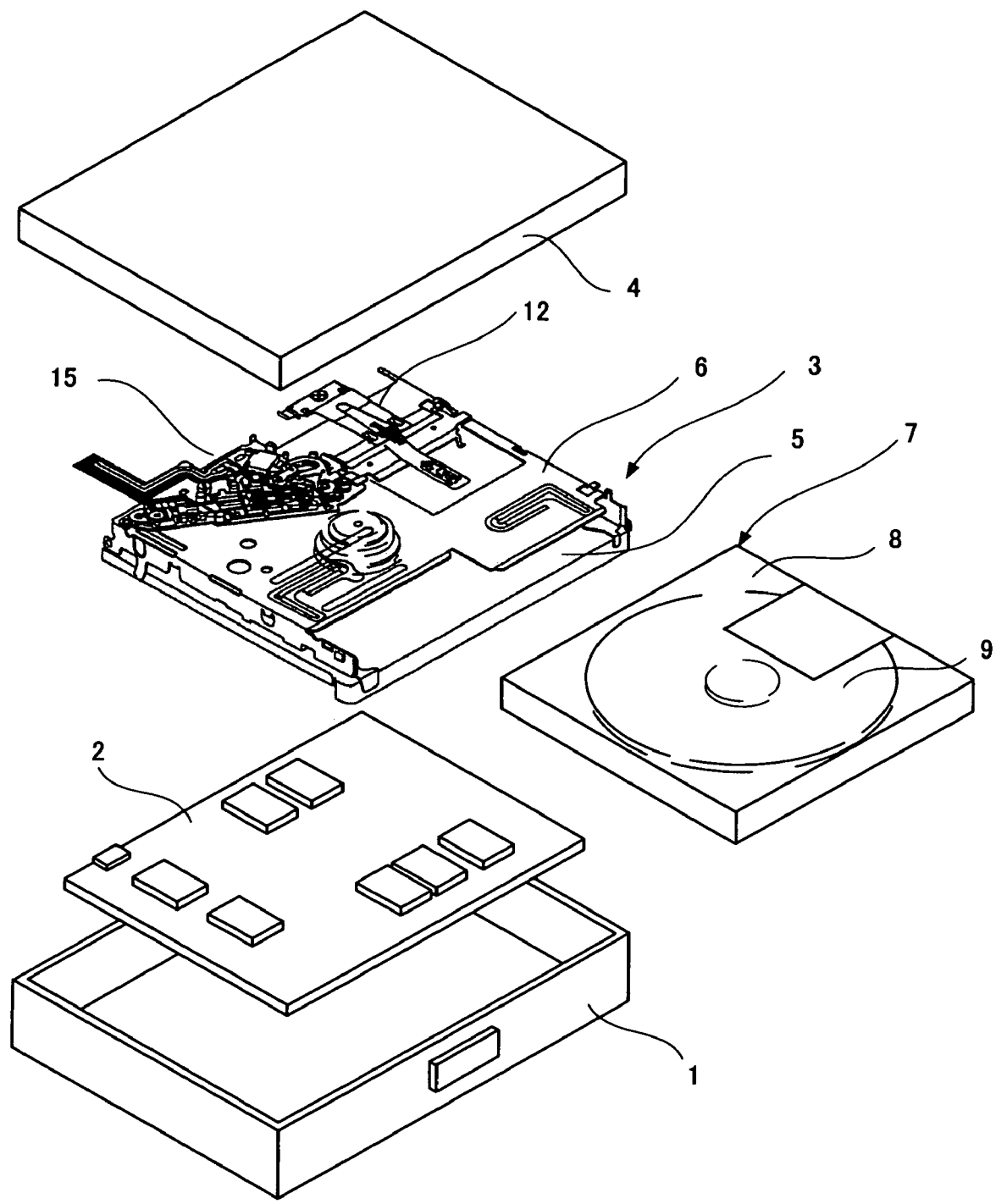
FIGS. 1 and 2 are exploded perspective views schematically showing a magneto-optical recording/reproducing apparatus according to an embodiment of the present invention.
Figure 2:
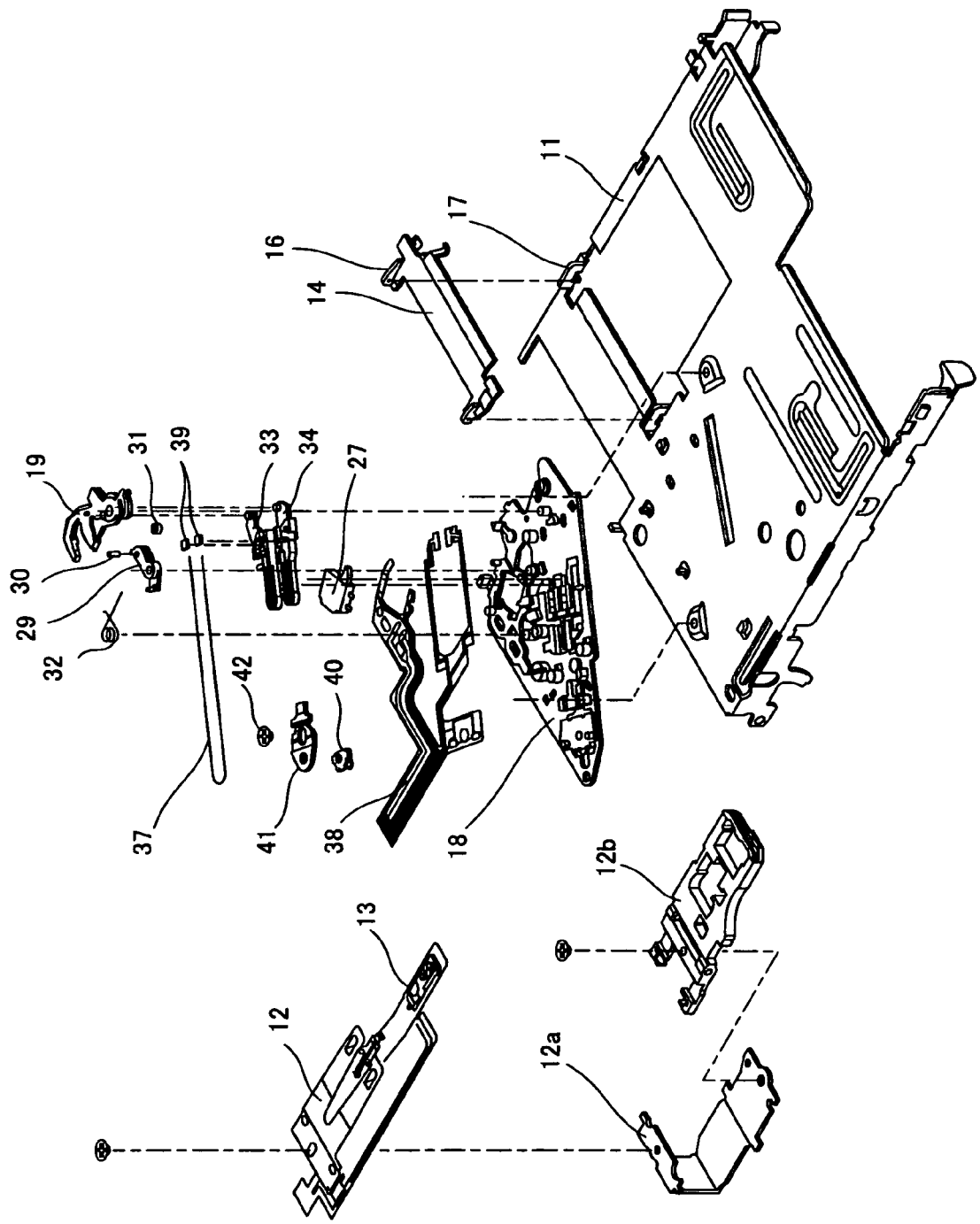
Figure 3:
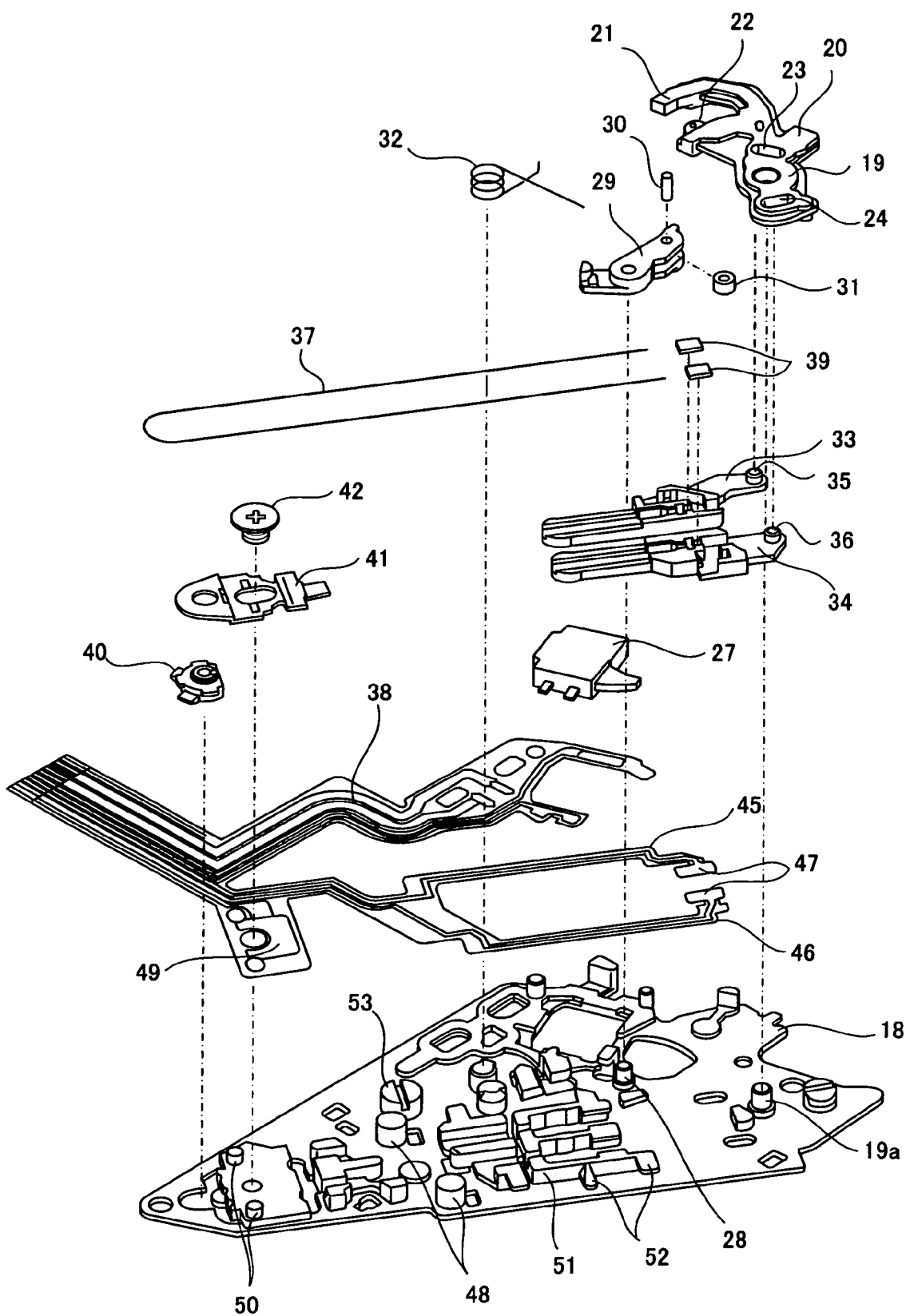
FIG. 3 is an exploded perspective view showing the principle part of the magneto-optical recording/reproducing apparatus.

Embodiments of the present invention will be discussed below in accordance with the accompanying drawings. FIG. 1 is an exploded perspective view schematically showing a magneto-optical recording/reproducing apparatus of the present embodiment. FIG. 2 is an exploded perspective view showing the magneto-optical recording/reproducing apparatus. FIG. 3 is an exploded perspective view showing the principle part of the magneto-optical recording/reproducing apparatus.

As shown in FIGS. 1 to 3, in the magneto-optical recording/reproducing apparatus, an electric circuit 2 and a mechanical mechanism 3 are stored in a body cabinet 1 and a lid 4 covers the opening of the body cabinet 1.

The mechanical mechanism 3 comprises a mechanical base 5 and a mechanical part 6 placed on the mechanical base 5. A mini disc 7 loaded in a storage space between the mechanical base 5 and the mechanical part 6 has an optical disc 9, on which signals such as a music signal can be recorded and reproduced, in a cartridge 8. The optical disc 9 is a known disc such as a magneto-optical disc. A spindle motor 10 for rotating the optical disc 9 is placed on the mechanical base 5.

As shown in FIG. 2, a magnetic head unit 12 is placed on a holder 11 of the mechanical part 6 and has a magnetic head 13 which can swing up and down. A head angle 12a is screwed on the base end side of the magnetic head unit 12. The head angle 12a is screwed onto a base 12b, and the base 12b is placed on the mechanical base 5. The magnetic head 13 swings to and from a sliding contact position (recording state) and a position separated from the optical disc 9 (reproduction state).

A position switching device for switching the position of the magnetic head 13 comprises a lifter 14 and a lifter driving part 15. The lifter 14 has a hinge bearing 16 engaged with a hinge shaft 17 formed on the holder 11 and the lifter 14 can swing up and down. The lifter 14 swings to an upper position, which is an active position, to swing the magnetic head 13 to the position separated from the optical disc 9. The lifter 14 swings to a lower position, which is an inactive position, to release the magnetic head 13 to the position where the magnetic head 13 comes into sliding contact with the optical disc 9. The lifter 14 is urged to the inactive position by a spring member 14a formed on the holder 11.

Figure 4:
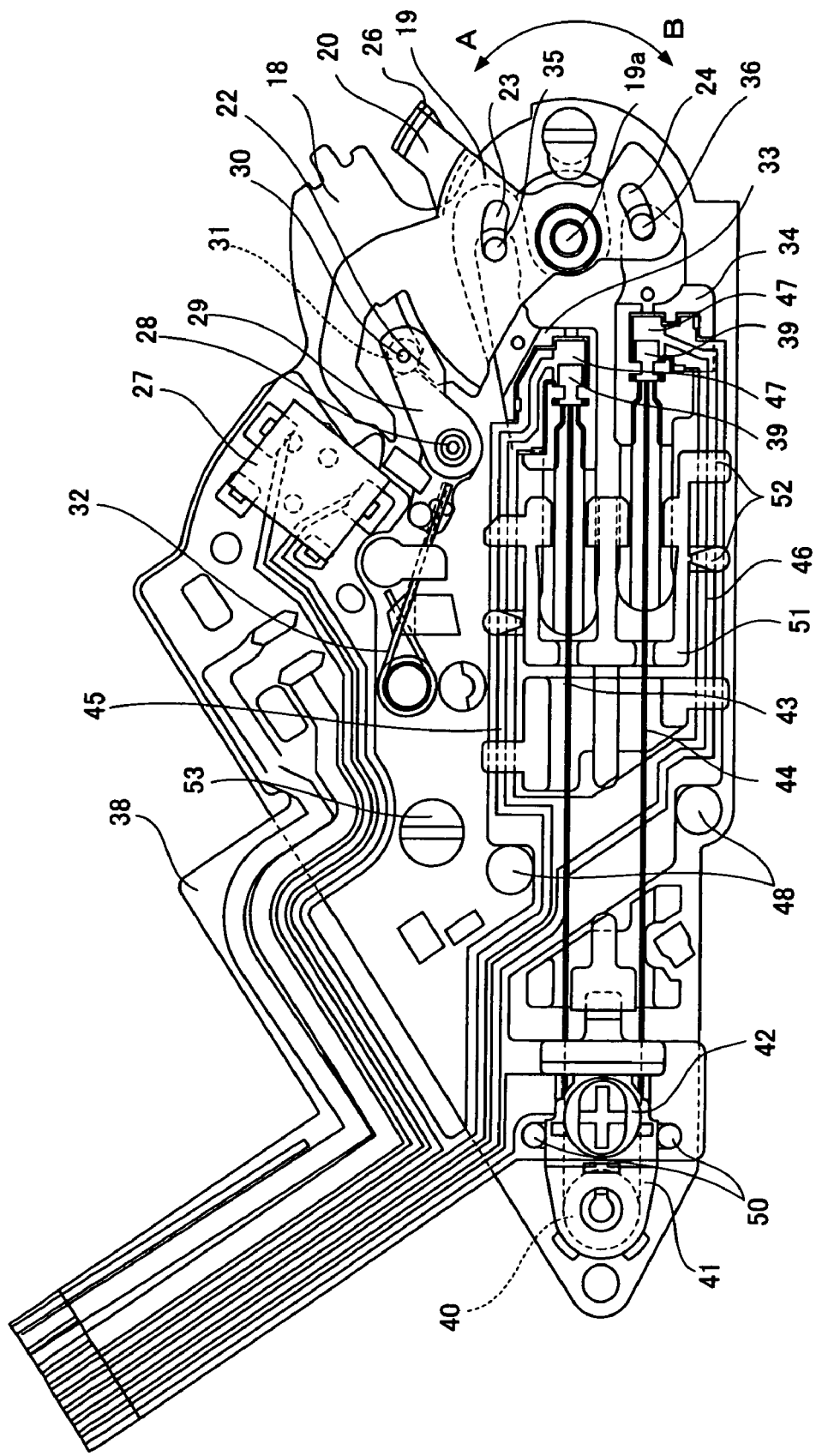
FIGS. 4 and 5 are plan views showing a lifter driving part of the magneto-optical recording/reproducing apparatus.
Figure 5:
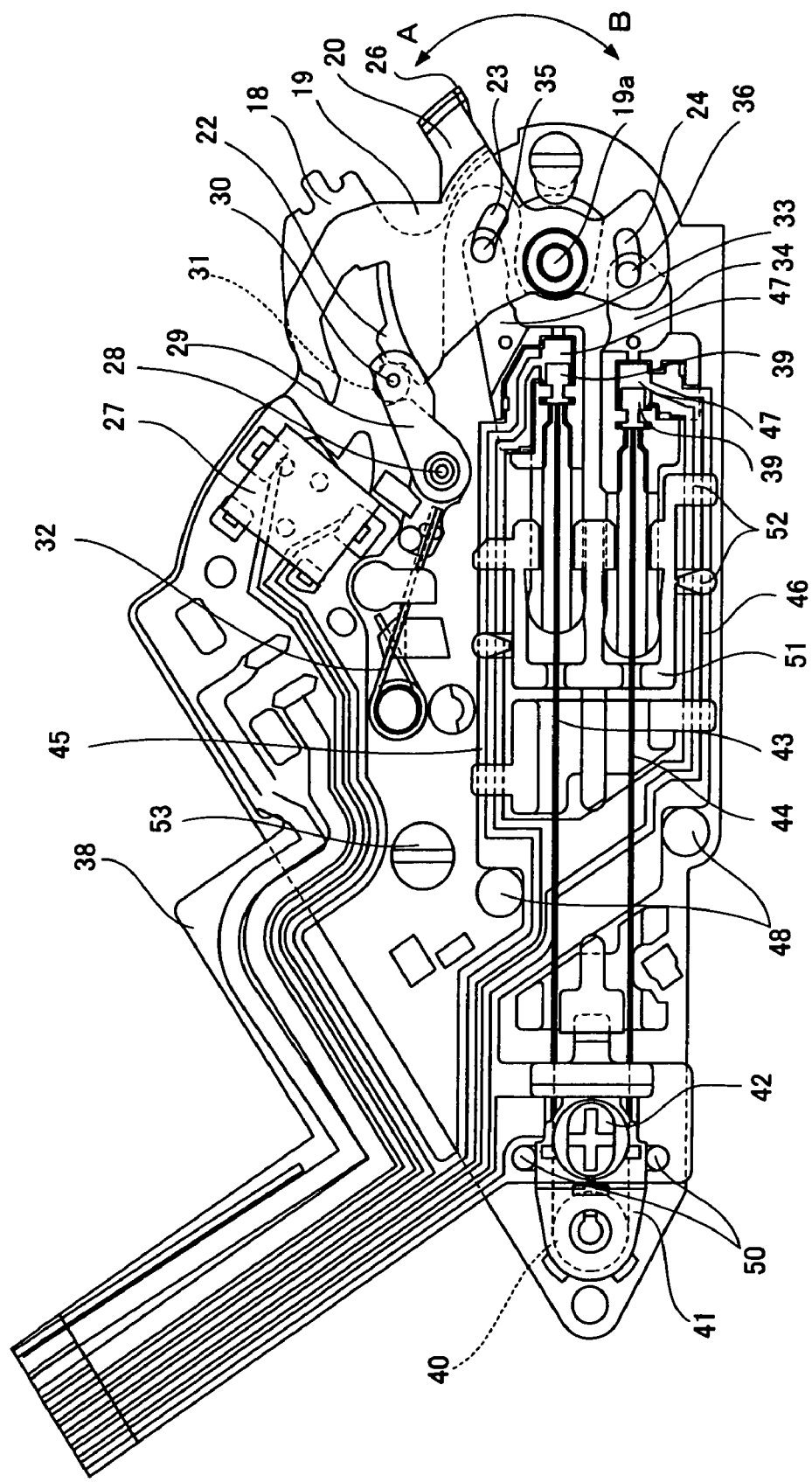
Figure 8:
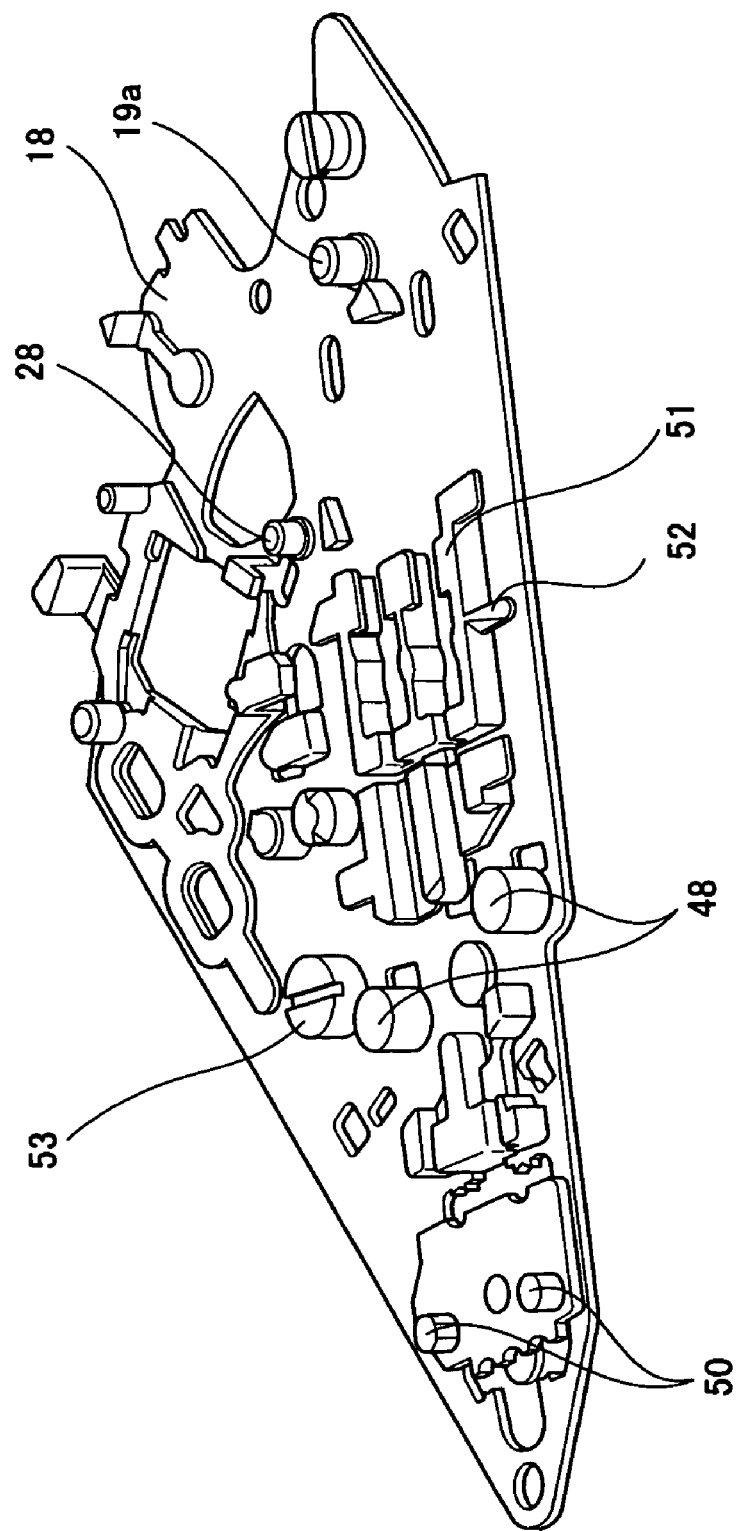
FIG. 8 is a perspective view showing a base member of the lifter driving part.

As shown in FIGS. 3 to 5, the lifter driving part 15 has various components placed on a base member 18 (FIG. 8). The configuration of the components will be discussed below. A drive lever 19 acting as a movable member of an operating device is placed so as to rotate about the axis of a spindle 19a provided on the base member 18. A wedge 20, a switch piece 21, a cam 22, and a pair of oval connecting holes 23 and 24 are formed on the drive lever 19.

The wedge 20 has a guide surface 26 making contact with a wedge receiving portion 25 formed on the lifter 14. The wedge receiving portion 25 is pressed by the guide surface 26 to swing the lifter 14. The guide surface 26 moves with the rotation of the drive lever 19. At a rotation stop point of one direction of the drive lever 19, the guide surface 26 releases the lifter 14 to the inactive position. At a rotation stop point of the other direction of the drive lever 19, the guide surface 26 swings the lifter 14 to the active position.

The switch piece 21 presses a detection switch 27 placed on the base member 18 and is moved by the rotation of the drive lever 19 to and from ON position making contact with the detection switch 27 and OFF position separated from the detection switch 27.

Figure 7:
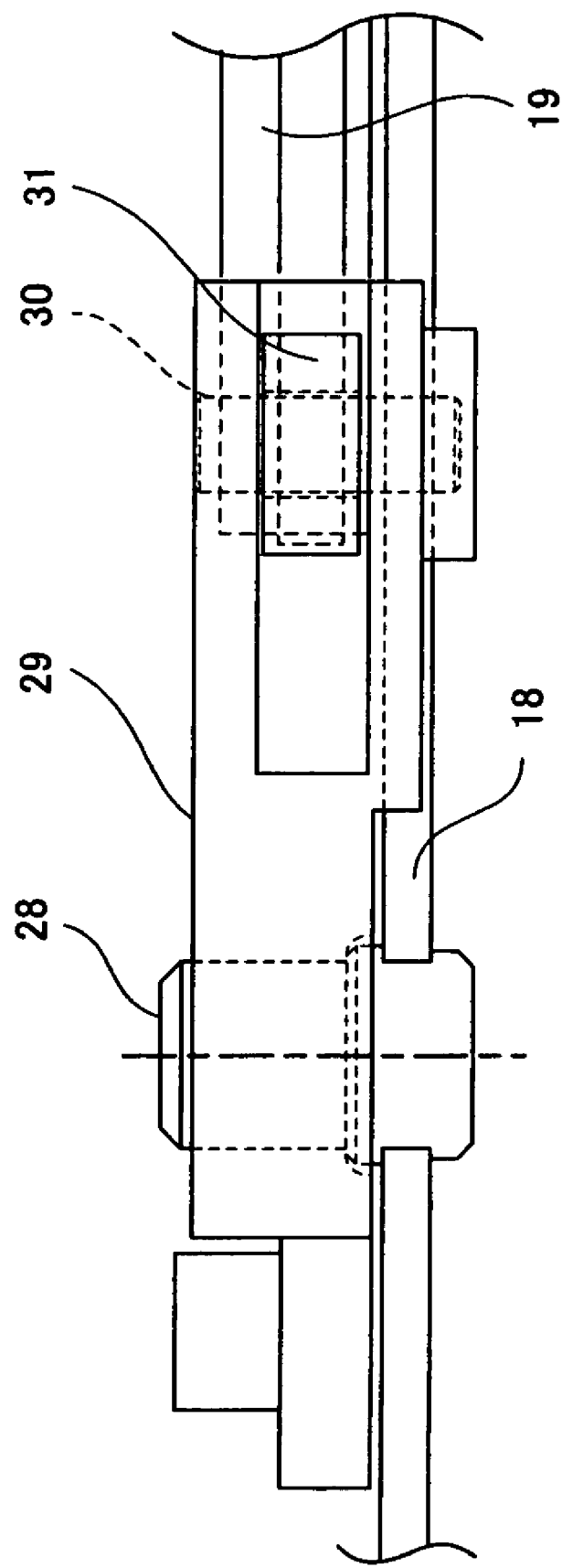
FIG. 7 is a principle part enlarged view showing a locking unit of the lifter driving part.

The cam 22 makes up a part of a locking unit. The locking unit comprises the cam 22, a locking arm 29 (FIG. 7) placed so as to rotate about the axis of a pivot shaft 28 provided on the base member 18, a cam following roller 31 (FIG. 7) rotatably placed on the locking arm 29 via a shaft 30, and a torsion spring 32 which is an elastic member for urging the locking arm 29 in a direction of pressing the cam following roller 31 to the cam 22. The cam following roller 31 is engaged with the cam 22 in the rotation direction of the drive lever 19, so that the drive lever 19 is kept on the rotation stop point of one direction or the rotation stop point of the other direction.

The pair of oval connecting holes 23 and 24 makes up a connecting part between the drive lever 19 and a pair of drive rods 33 and 34. Connecting pins 35 and 36 formed on the drive rods 33 and 34 are inserted into the connecting holes 23 and 24, respectively. When the drive lever 19 rotates, the connecting holes 23 and 24 and the connecting pins 35 and 36 are moved into engagement in the moving direction of the drive rods 33 and 34. In a state in which the drive lever 19 stops, the connecting holes 23 and 24 accept the movement of the connecting pins 35 and 36 in the moving direction of the drive rods 33 and 34.

The main components of the operating device include the drive lever 19, the drive rods 33 and 34, a wire 37, and a flexible printed board 38 making up a power supply circuit.

The wire 37 is made of a shape memory alloy. The temperature of the wire 37 is increased by electrification and the wire 37 contracts at temperatures exceeding a transformation point. Since electrification generates heat, fixing such as soldering cannot be used. For this reason, as shown in FIG. 9A, plus terminals 39 shaped like short tubes are inserted to both ends of the wire 37, and then as shown in FIG. 9B, the plus terminals 39 are swaged and fixed on the wire 37. As shown in FIGS. 10A and 10B, the intermediate part of the wire 37 is bent like letter U along a tension roller 40 so as to place both ends of the wire 37 in parallel.

The plus terminals 39 are fixed on the drive rods 33 and 34 via plus terminal strips 47 (discussed later), the tension roller 40 and the wire 37 are pressed to the base member 18 via a minus terminal 41, the minus terminal 41 is fixed on the base member 18 with a screw 42 via a minus terminal strip 49 (discussed later).

The single wire 37 is bent using the tension roller 40 by 180° to form a pair of linear members 43 and 44 in parallel, and thus it is possible to reduce the number of components as compared with the case where the linear members 43 and 44 are made up of different wires each being provided with a terminal for electrification.

The linear members 43 and 44 made of the shape memory alloy contracts in the axial direction between the plus terminals 39 and the minus terminal 41 due to heat generated by electrification, so that tension occurs in the contracting direction.

When the wire 37 is placed, both of the plus terminals 39 are simultaneously placed on the positions farthest from the minus terminal 41 in response to the drive rods 33 and 34 moved by the swing of the drive lever 19. In this state, the position of the tension roller 40 is adjusted to apply an initial tension (predetermined load) to the linear members 43 and 44. In this way, the tension roller 40 makes it possible to uniformly apply the initial tension to both of the linear members 43 and 44 at the same time.

The setting of the initial tension makes it possible to increase the contraction coefficients of the linear members 43 and 44 as compared with contraction from an unloaded state, thereby increasing a contraction interval of the linear members 43 and 44. For example, a predetermined load is applied to the linear members 43 and 44 having a shrinkage allowance of 0.6 mm to extend the linear members 43 and 44 by 0.3 mm from the unloaded state due to electrification in the unloaded state, and then the linear members 43 and 44 are caused to contract by electrification from a tense state of the initial tension. In this state, the linear members 43 and 44 have a shrinkage allowance of 0.9 mm.

The flexible printed board 38 making up the power supply circuit for selectively electrifying the linear members 43 and 44 has a pair of lead portions 45 and 46 placed in parallel along the linear members 43 and 44. The plus terminal strips 47 provided on the ends of the lead portions 45 and 46 are placed and fixed on the drive rods 33 and 34, so that the plus terminals 39 and the plus terminal strips 47 are brought into conduction.

In the axial directions of the lead portions 45 and 46, the lead portions 45 and 46 are engaged with, on its base ends, pins 48 provided on the base member 18. Thereafter, the lead portions 45 and 46 are integrated with the pins 48, and the lead portions 45 and 46 are engaged and fixed to pins 50 provided on the base member 18 on a part where the minus terminal strip 49 is provided, so that the minus terminal 41 and the minus terminal strip 49 are brought into conduction. The lead portions 45 and 46 are distorted when the drive rods 33 and 34 are moved by the shrinkage of the corresponding linear members 43 and 44.

The drive rods 33 and 34 are held by a rod holding portion 51 provided on the base member 18 so as to move in the axial directions of the linear members 43 and 44. A plurality of retaining portions 52 on the rod holding portion 51 are disposed above the lead portions 45 and 46 with predetermined intervals.

Figure 6A:
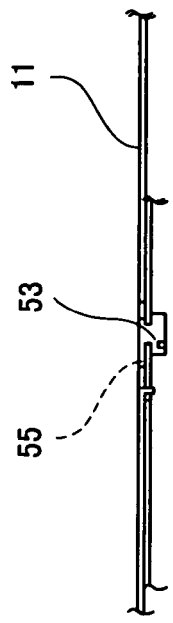
FIGS. 6A to 6D are a principle part enlarged side view, a principle part enlarged plan view, a principle part enlarged side view, and a principle part enlarged plan view which show the steps of mounting the lifter driving part.
Figure 6B:
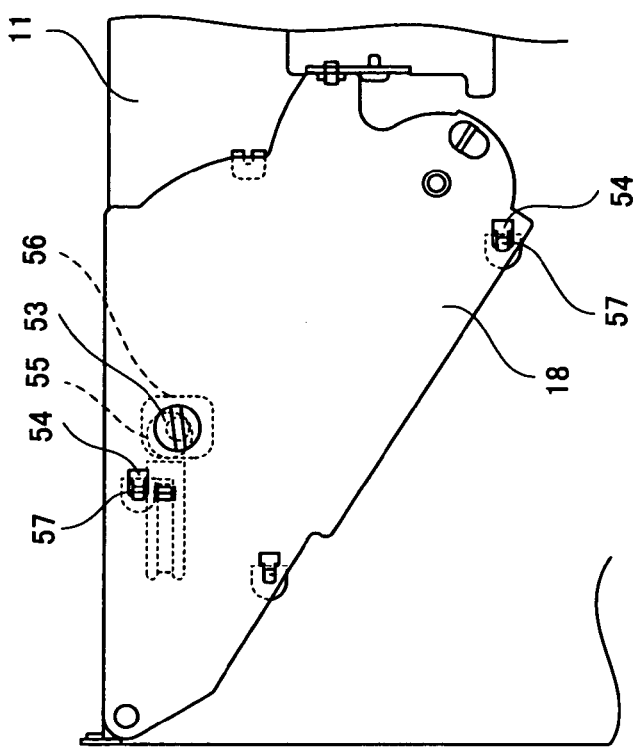
Figure 6C:
Figure 6D:
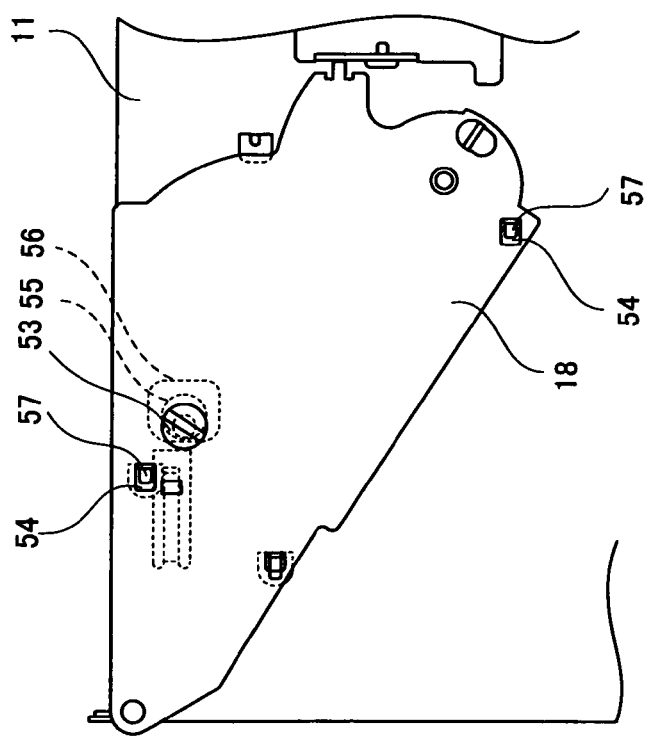

As shown in FIGS. 6A and 6B, the base member 18 comprises an eccentric pin 53 and a mounting hole 54. An eccentric portion 55 of the eccentric pin 53 is loosely fitted into a fitting hole 56 formed on the holder 11 and the base member 18 is placed on the holder 11 such that a mounting hook 57 formed on the holder 11 is loosely fitted into the mounting hole 54. Thereafter, as shown in FIGS. 6C and 6D, the eccentric pin 53 is rotated to press the edge of the fitting hole 56 with the eccentric portion 55, and the base member 18 is caused to slide on the holder 11 by reaction force and moves the mounting hole 54 and the mounting hook 57 into engagement, so that the base member 18 is fixed on the holder 11.

The action of the above configuration will be discussed below. First, the following will discuss the basic operations of the operating device and the position switching device.

Figure 15:
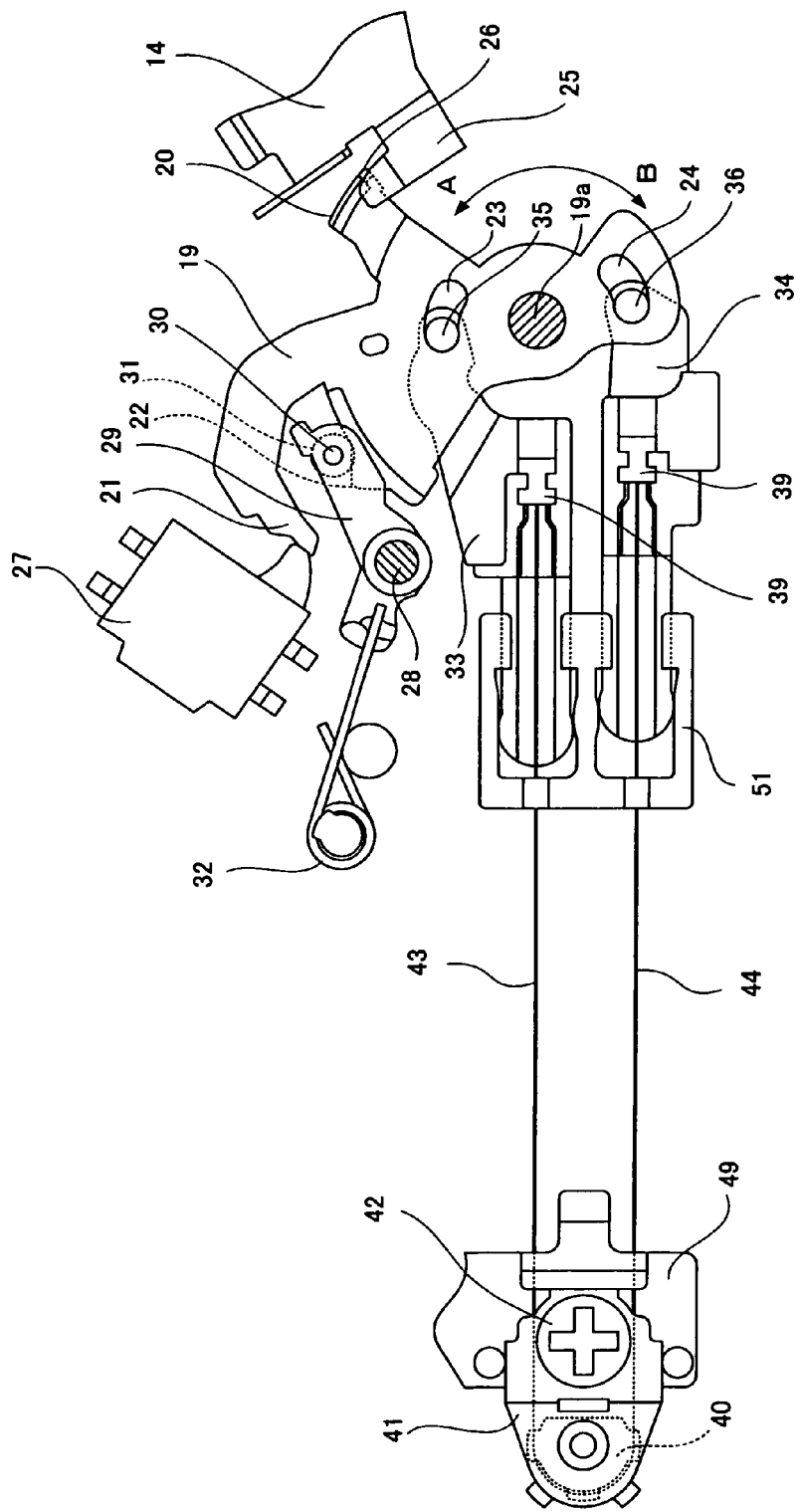
FIG. 15 is a principle enlarged plan view showing the lifter driving part.

As shown in FIG. 15, in the operating device, when the linear member 43 connected to the drive rod 33 is electrified through the flexible printed board 38, tension generated by the shrinkage of the linear member 43 is applied to one side of the drive lever 19 via the drive rod 33, the connecting pin 35, and the connecting hole 23. The drive lever 19 rotates about the axis of the pivot shaft 19a in one direction (arrow A) and stops on a rotation stop point. The rotation of the drive lever 19 extends the linear member 44 through the drive rod 34 connected to the other side of the drive lever 19, and the linear member 44 extends until the initial tension of a default setting is generated.

Figure 16:
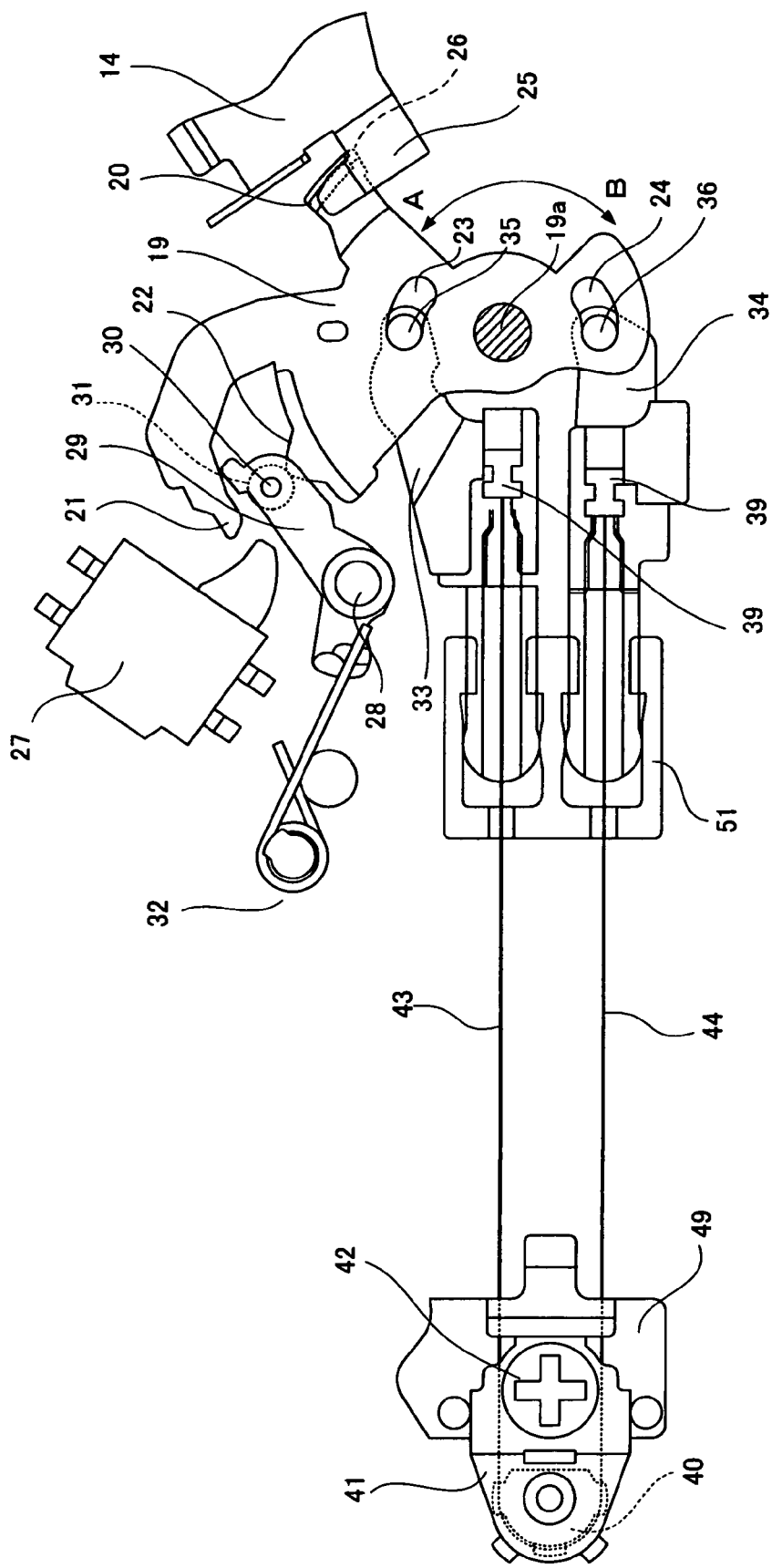
FIGS. 16 and 17 are principle enlarged plan views of the lifter driving part.
Figure 17:
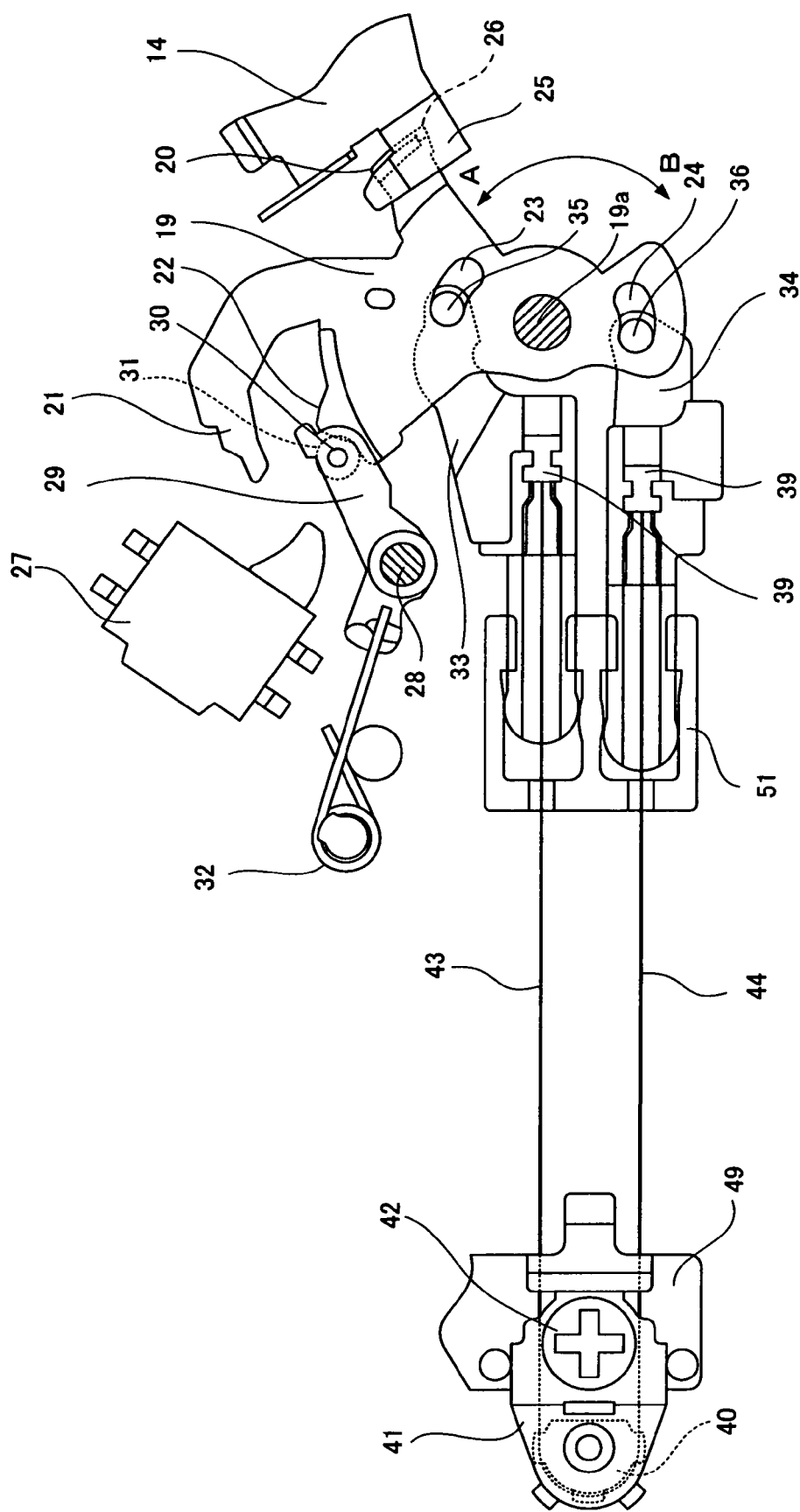

As shown in FIG. 16, when the extended linear member 44 is electrified through the flexible printed board 38, the initial tension and tension caused by the shrinkage of the linear member 44 are applied to the other side of the drive lever 19 and the drive lever 19 rotates about the axis of the pivot shaft 19a in the other direction (arrow B). Then, as shown in FIG. 17, the drive lever 19 stops on the rotation stop point of the other direction (arrow A). The linear members 43 and 44 are alternately electrified so as to repeatedly contract and extend, and thus the drive lever 19 repeatedly rotates about the axis of the pivot shaft 19a.

In this way, since driving force source is generated from the linear members, the drive lever 19 can repeatedly rotate about the pivot shaft without the necessity for a motor or the like, which has conventionally been an obstacle to a reduction in thickness, and the thickness of the operating device can be easily reduced, thereby achieving lower manufacturing cost. Further, since the linear members 43 and 44 having been extended from the unloaded state with the initial tension are caused to contract, an interval of the extension and contraction of the linear members 43 and 44 is increased, and thus the range of the swinging angles of the drive lever 19 can be increased.

Moreover, the pair of the linear members 43 and 44 alternately contracts and extends and the tension of one of the linear members 43 and 44 acts as the initial tension applied to the other of the linear members 43 and 44. Thus, without the necessity for additional member such as a spring for applying the initial tension, it is possible to effectively use the tensions of the linear members 43 and 44 to reduce the loss of generated force, and reduce the number of components.

The position switching device driven by the operating device operates as follows: as shown in FIG. 15, when the drive lever 19 is rotated in one direction (arrow A) by tension generated by the extension and shrinkage of the linear member 43, the guide surface 26 of the wedge 20 moves in a direction separating from the wedge receiving portion 25 of the lifter 14, the drive lever 19 is rotated to the rotation stop point of one direction (arrow A), and the lifter 14 urged by the spring member 14a swings to the inactive position relative to the magnetic head 13.

As shown in FIG. 16, when the drive lever 19 is rotated in the other direction (arrow B) by tension generated by the shrinkage of the other linear member 44, the guide surface 26 of the wedge 20 moves in a direction approaching the wedge receiving portion 25 of the lifter 14, and the guide surface 26 presses the wedge receiving portion 25 and urges the lifter 14 in the swinging direction against the urging force of the spring member 14a. Then, as shown in FIG. 17, the drive lever 19 rotates to the rotation stop point of the other direction (arrow B) and swings the lifter 14 to the active position relative to the magnetic head 13.

When the drive lever 19 is placed on the rotation stop point of one direction or the rotation stop point of the other direction, the locking unit locks the drive lever 19 to the rotation stop point to keep the lifter 14 on the active position or the inactive position.

Figure 18:
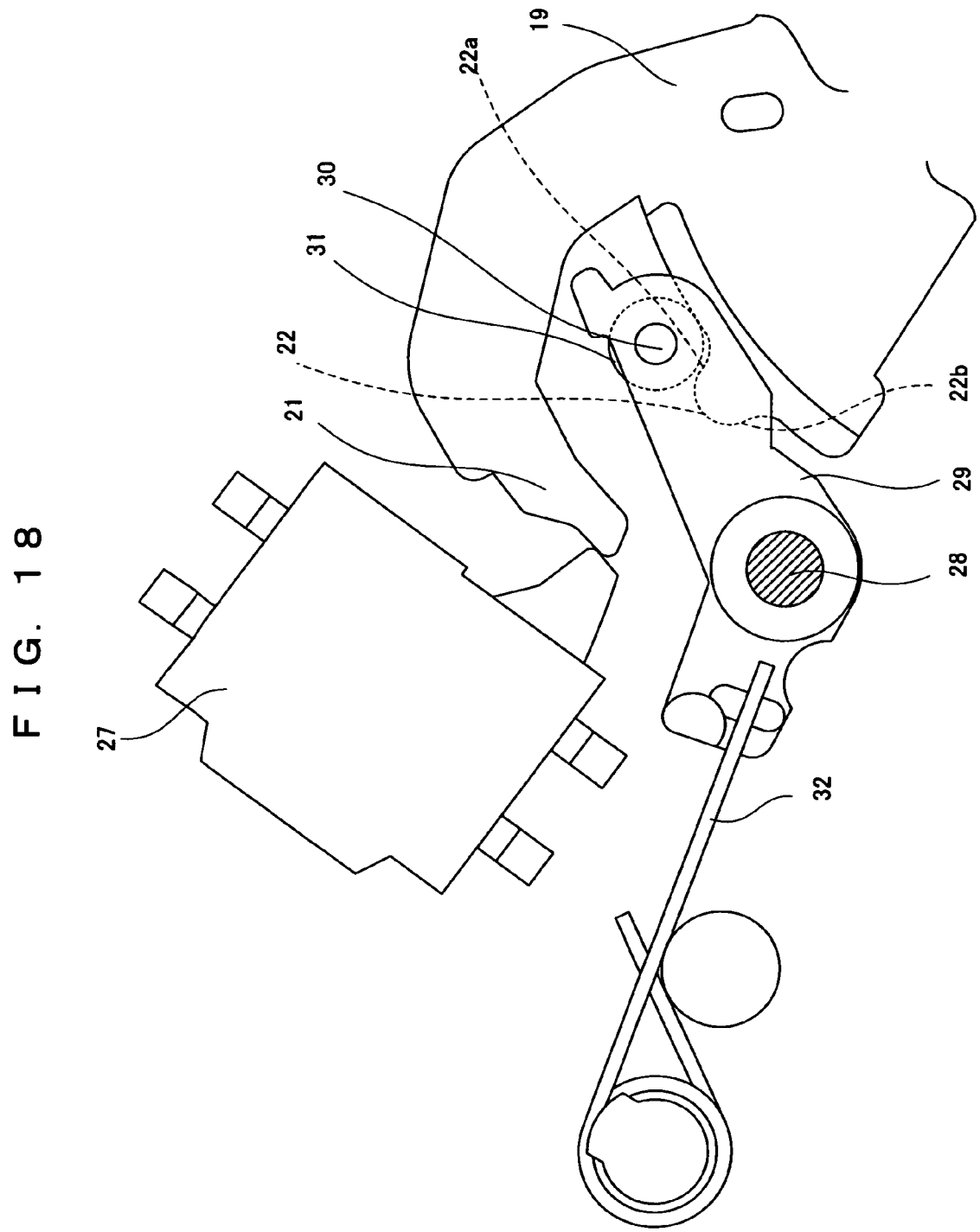
FIGS. 18 to 20 are principle enlarged plan views of the lifter driving part.

For example, as shown in FIG. 18, when the drive lever 19 is placed on the rotation stop point of one direction, the cam following roller 31 comes in sliding contact with a one-side active surface 22a of the cam 22, the pressing force of the torsion spring 32 acting on the locking arm 29 is applied to the one-side active surface 22a of the cam 22 through the cam following roller 31, and the drive lever 19 is urged in one direction and pressed to the rotation stop point by the pressing force of the torsion spring 32.

Figure 20:
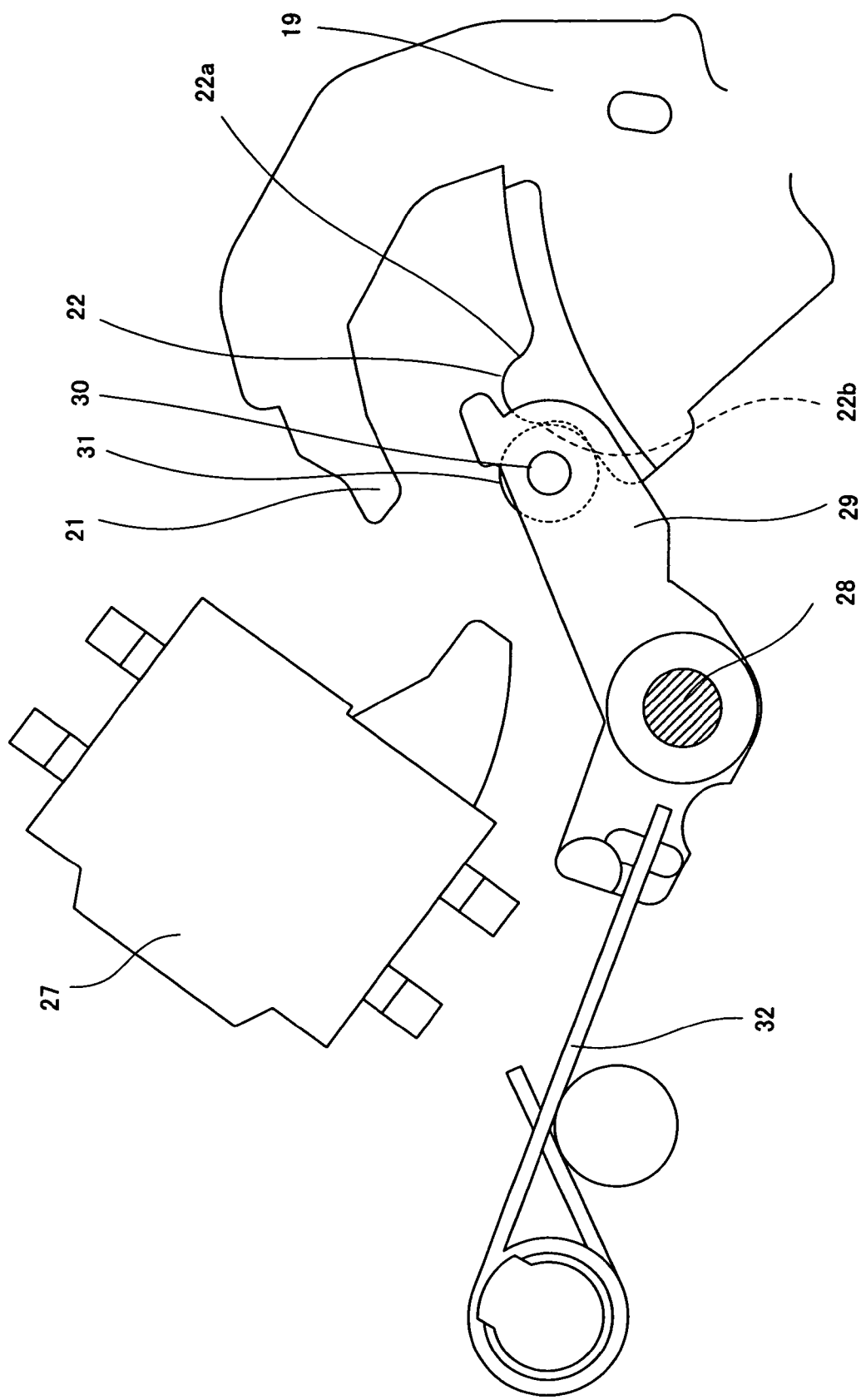

Conversely, as shown in FIG. 20, when the drive lever 19 is placed on the rotation stop point of the other direction, the cam following roller 31 comes in sliding contact with an other-side active surface 22b of the cam 22, the pressing force of the torsion spring 32 acting on the locking arm 29 is applied to the other-side active surface 22b of the cam 22 through the cam following roller 31, and the drive lever 19 is urged in the other direction and pressed to the rotation stop point by the pressing force of the torsion spring 32.

Figure 19:
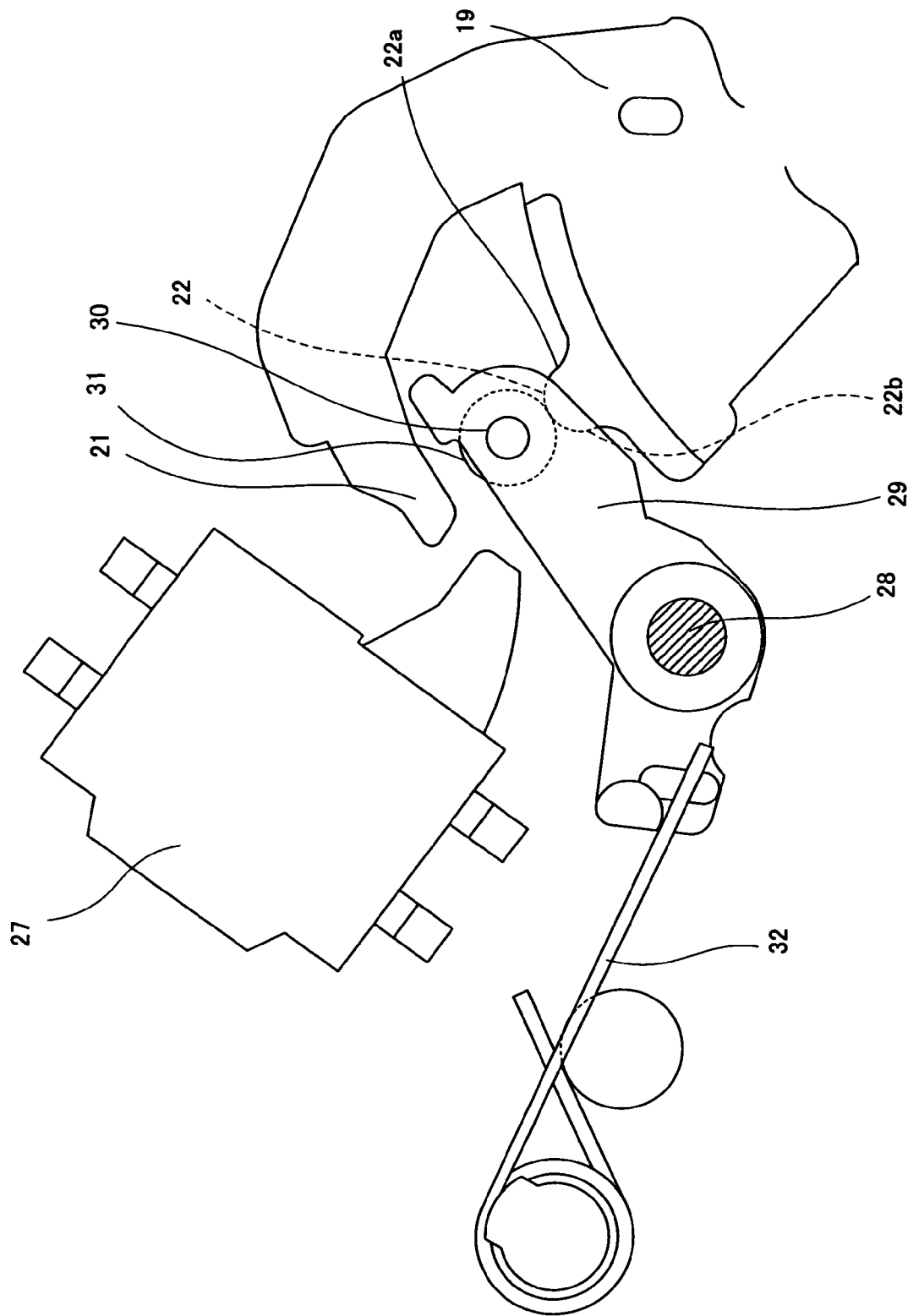

In the first half of the rotation, the drive lever 19 is rotated from the rotation stop point of the other direction shown in FIG. 20 through the intermediate point shown in FIG. 19 to the rotation stop point of one direction shown in FIG. 18 by tension generated by the shrinkage of the linear member 43 against the pressing force of the torsion spring 32; meanwhile the cam following roller 31 is in sliding contact with the other-side active surface 22b of the cam 22. In this process, as described above, the pressing force of the torsion spring 32 acts in the direction of pressing the drive lever 19 to the rotation stop point of the other direction.

As shown in FIG. 18, in the latter half of the rotation after the rotation of the drive lever 19 moves the cam following roller 31 from the other-side active surface 22b to the one-side active surface 22a of the cam 22, the pressing force of the torsion spring 32 is added through the cam following roller 31 to the drive lever 19 swinging in one direction (arrow A). Thus, the pressing force of the torsion spring 32 is combined with the tension of the shrinking linear member 43, accelerates the action of the drive lever 19 in one direction (arrow A), and contributes to the extension of the linear member 44. The locking unit acts in a similar manner while the drive lever 19 rotates in one direction or the other direction.

When the linear member 44 extends in response to the pressing force of the torsion spring 32 and the tension caused by the shrinkage of the linear member 43 or when the linear member 43 extends in response to the pressing force of the torsion spring 32 and the tension caused by the shrinkage of the linear member 44, the initial tension (predetermined load) of the default setting is applied to the extending linear members 43 and 44 and thus the linear members 43 and 44 extend longer than a typical unloaded and non-electrified state. This state is kept by the locking unit which locks the drive lever 19 on the rotation stop points of both directions around the pivot shaft.

The extension with the initial tension makes it possible to increase the contraction coefficients of the linear members 43 and 44 during shrinkage, increase an interval between the extension and contraction of the linear members 43 and 44, and increase the range of angles for swinging the drive lever 19.

Figure 14A:
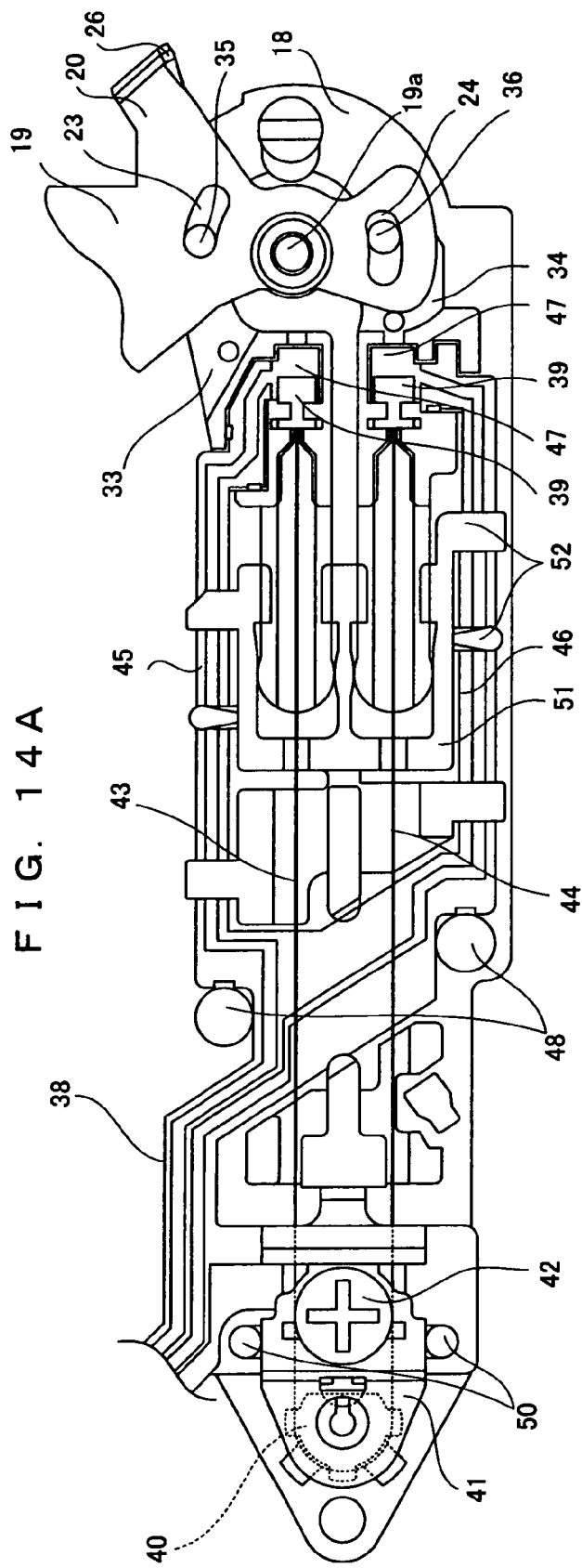
FIGS. 14A, 14B, and 14C are a plan view, a principle part enlarged side view, and a principle part enlarged view of the lifter driving part.
Figure 14B:
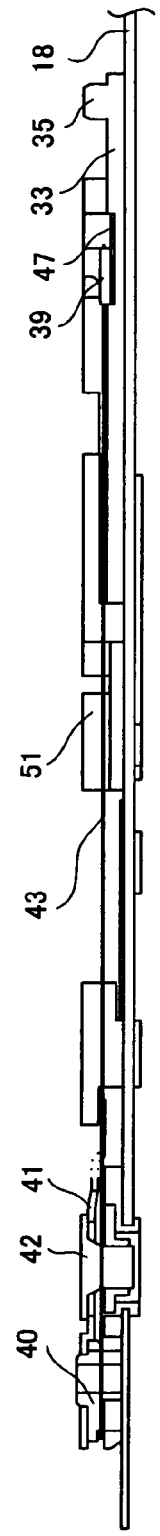
Figure 14C:
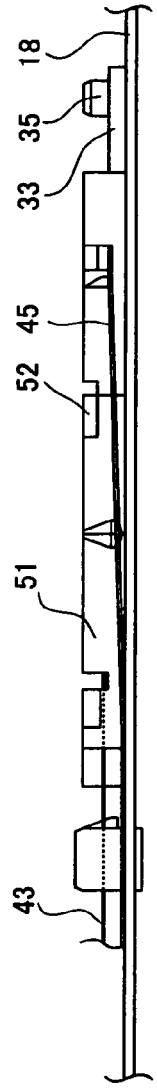

The following will describe the action of the magneto-optical recording/reproducing apparatus. When the cartridge 8 is loaded or during reproduction, as shown in FIG. 14, the linear member 43 is extended and tensed by a load and the linear member 44 is unloaded and loosened to the original dimensions.

Figure 21C:
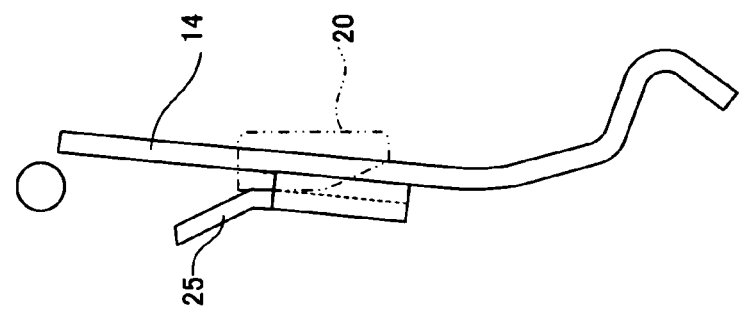
FIGS. 21A, 21B, and 21C are an enlarged plan view, an enlarged side view, and a principle part enlarged view of a magnetic head unit.
Figure 21B:
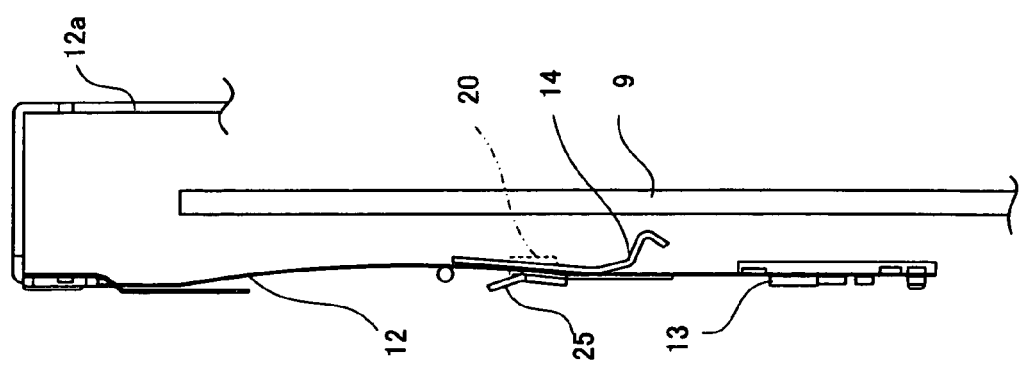
Figure 21A:
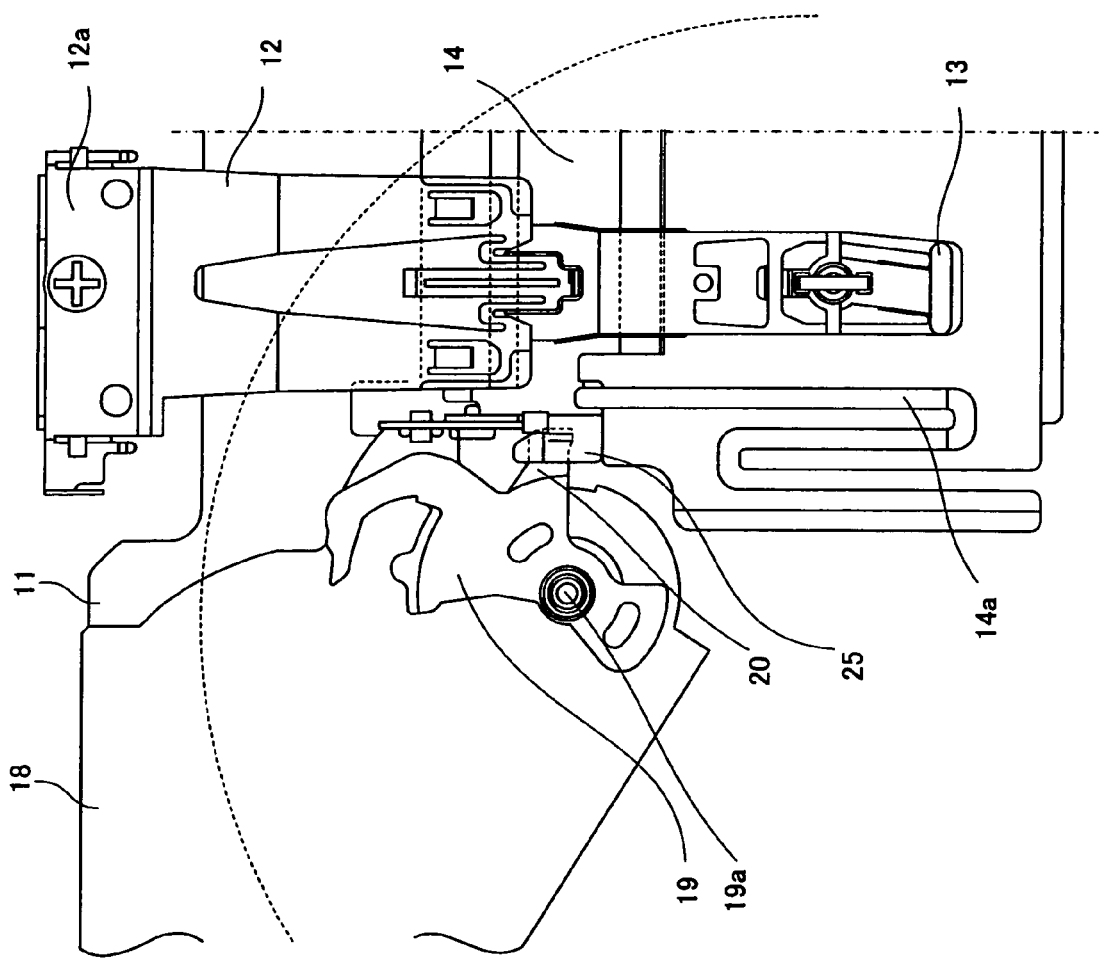

In this state, as shown in FIGS. 21A and 21C, the guide surface 26 of the wedge 20 presses the wedge receiving portion 25 of the lifter 14. Then, as shown in FIG. 21B, the lifter 14 swings to the action position relative to the magnetic head 13 to keep the magnetic head 13 on the position separated from the optical disc 9.

In the transition from reproduction to recording, the other linear member 43 of the operating device is electrified and the drive lever 19 is rotated as shown in FIG. 4 about the axis of the pivot shaft 19a in one direction (arrow A) by tension generated by the shrinkage of the linear member 43.

Figure 22C:
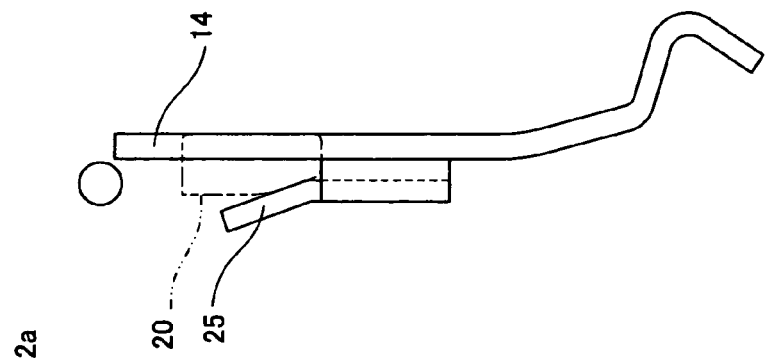
FIGS. 22A, 22B, and 22C are an enlarged plan view, an enlarged side view, and a principle part enlarged view of the magnetic head unit.
Figure 22B:
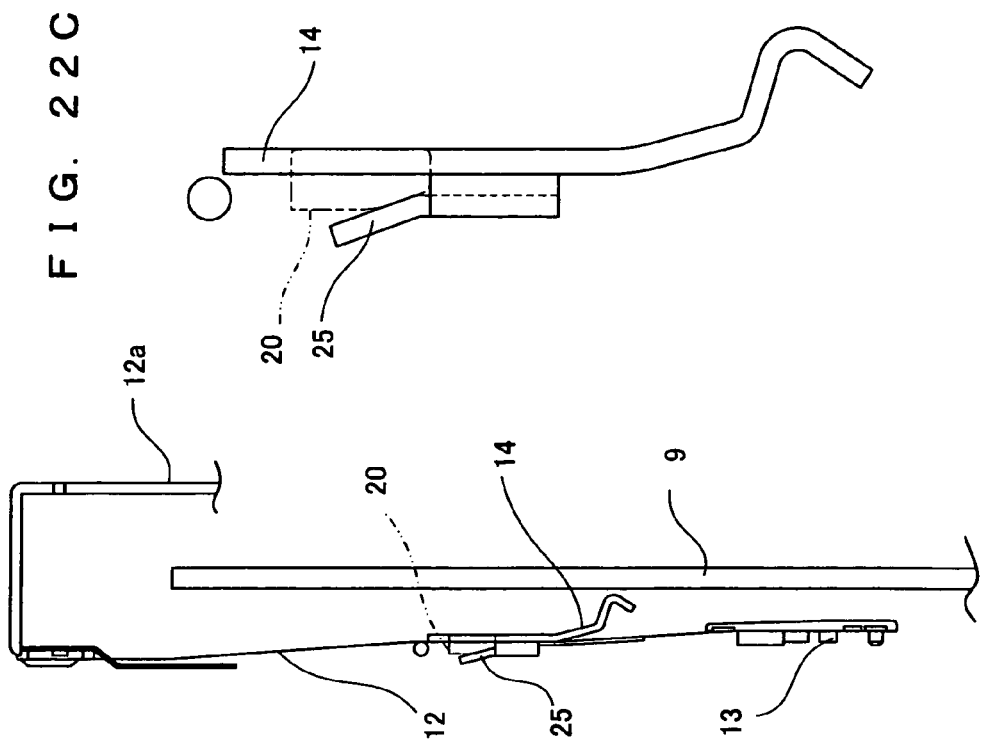
Figure 22A:
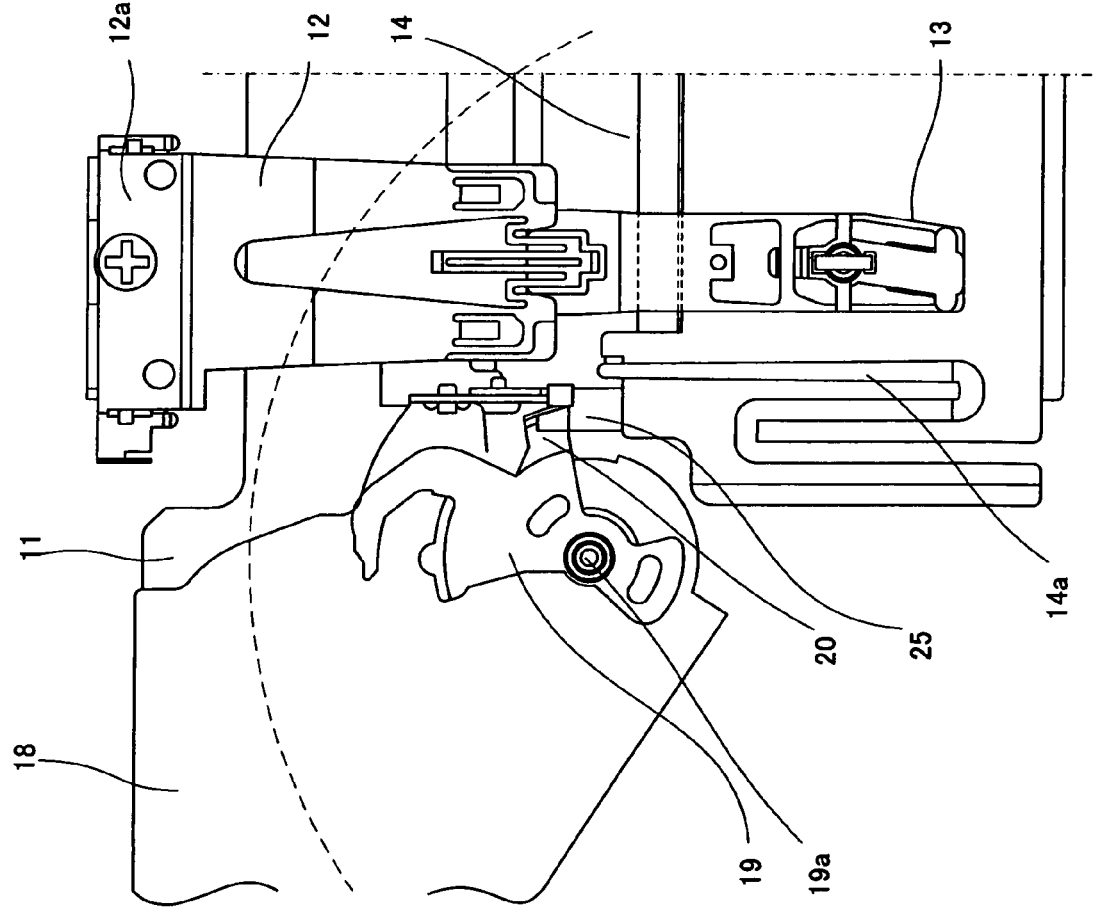

As shown FIGS. 22A and 22C, the rotation of the drive lever 19 moves the guide surface 26 of the wedge 20 in the direction separating from the wedge receiving portion 25 of the lifter 14. As shown in FIG. 22B, the lifter 14 swings to the inactive position and the magnetic head 13 approaches the optical disc 9.

As shown in FIGS. 23A and 23C, when the drive lever 19 rotates to the rotation stop point of one direction, the lifter 14 swings to the inactive position to release the magnetic head 13 on a position making sliding contact with the optical disc 9 as shown in FIG. 23B.

Figure 11:
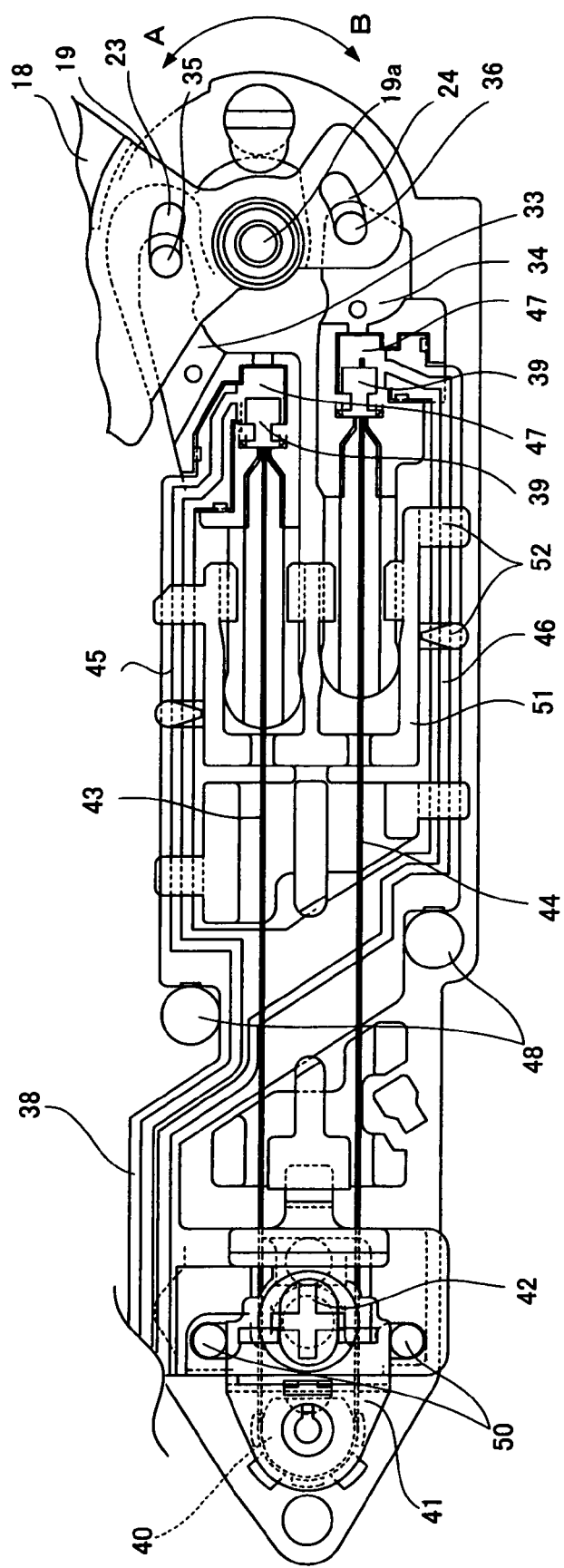
FIG. 11 is a plan view showing the lifter driving part.

As shown in FIG. 11, when the linear member 43 contracts and the drive rod 33 moves, the linear member 43 is tensed between the drive rod 33 and the tension roller 40 as shown in FIG. 12A, and the lead portion 45 corresponding to the linear member 43 is elastically deformed and bent in response to the movement of the drive rod 33 as shown in FIG. 12B.

Figure 13:
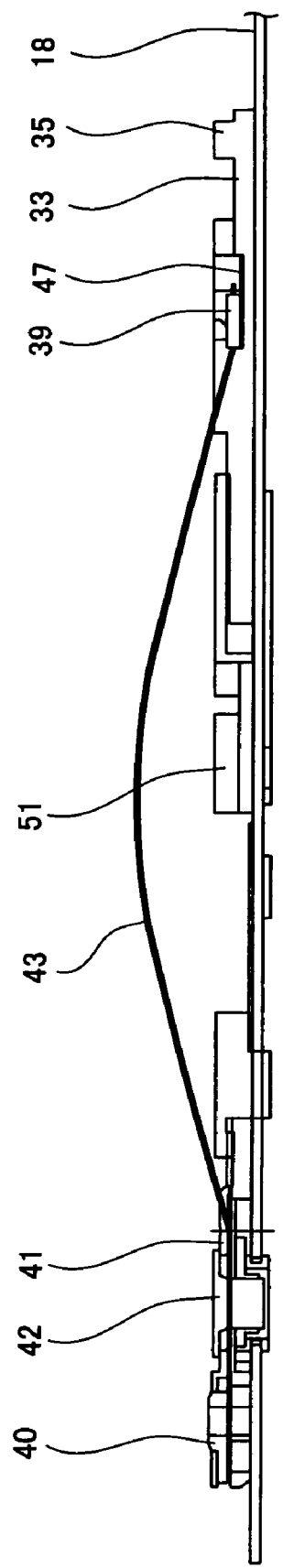
FIG. 13 is a principle enlarged side view showing the lifter driving part.

When electrification to the contracting linear member 43 is stopped while the locking unit keeps the drive lever 19 on the rotation stop point of one direction, the linear member 43 returns to the predetermined length of the non-electrified and unloaded state and is loosened in a distorted manner between the drive rod 33 and the tension roller 40 as shown in FIG. 13. The distortion of the linear member 43 results in contact with other parts.

However, when the linear member 43 is loosened and tension is eliminated, the lead portion 45 presses the drive rod 33 with elastic restoring force and the connecting hole 23 accepts the movement of the connecting pin 35, so that the distorted linear member 43 is returned to the linear state by the movement of the drive rod 33. Hence, it is possible to prevent the linear member 43 from being distorted and making contact with other parts.

In the transition from recording to reproduction, the linear member 44 of the operating device is electrified and the drive lever 19 is rotated, as shown in FIG. 5, about the axis of the pivot shaft 19a in the other direction (arrow B) by tension generated by the shrinkage of the linear member 44.

The rotation of the drive lever 19 brings the guide surface 26 of the wedge 20 into contact with the wedge receiving portion 25 of the lifter 14 to swing the lifter 14 to the active position, and the lifter 14 keeps the magnetic head 13 on the position separated from the optical disc 9. Other actions are similar to those of the transition from reproduction to recording, and thus the explanation thereof will not be repeated.

Referring to FIGS. 24 to 34, the following will discuss a more specific structure of a locking unit in a lifter driving part of a magneto-optical recording/reproducing apparatus according to another embodiment of the present invention. In FIGS. 24 to 34, a part of a locking arm 29 is omitted to clearly illustrate contact between a cam following roller 31 and a cam 22 of a drive lever 19.

Figure 24:
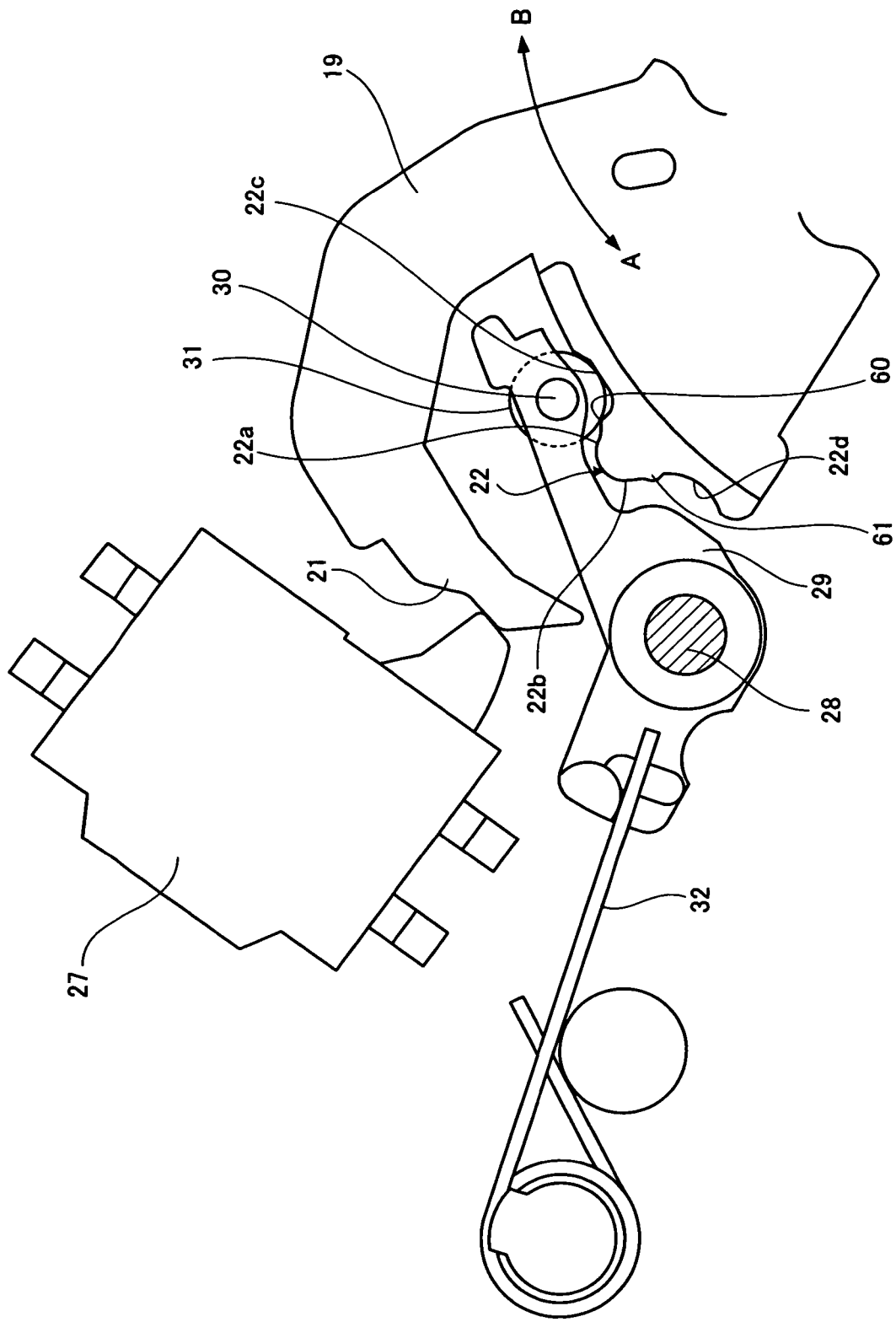
FIGS. 24 to 34 are enlarged plan views showing the principle part of a locking unit of a lifter driving part in a magneto-optical recording/reproducing apparatus according to another embodiment of the present invention.
Figure 25:
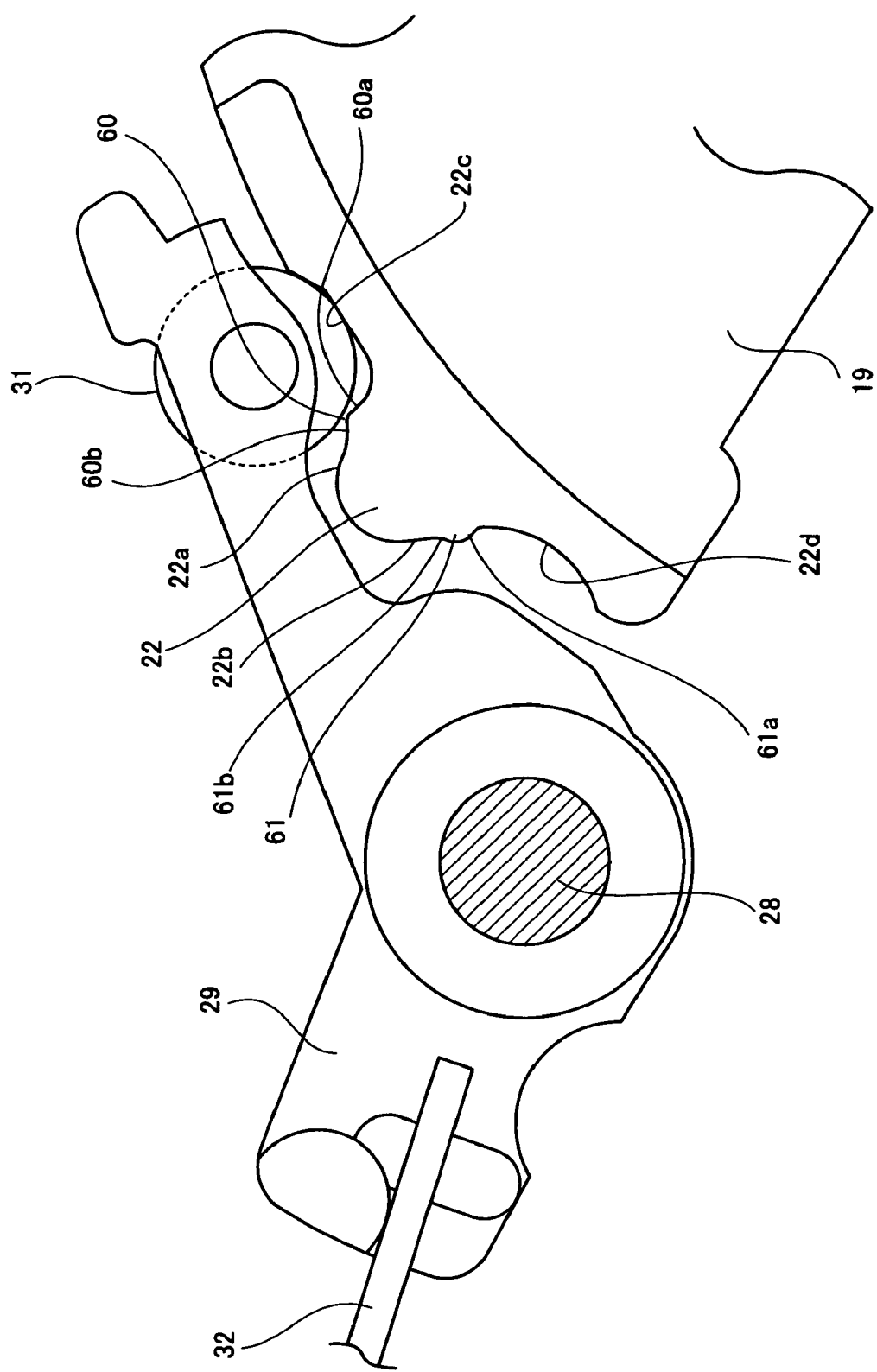
Figure 26:
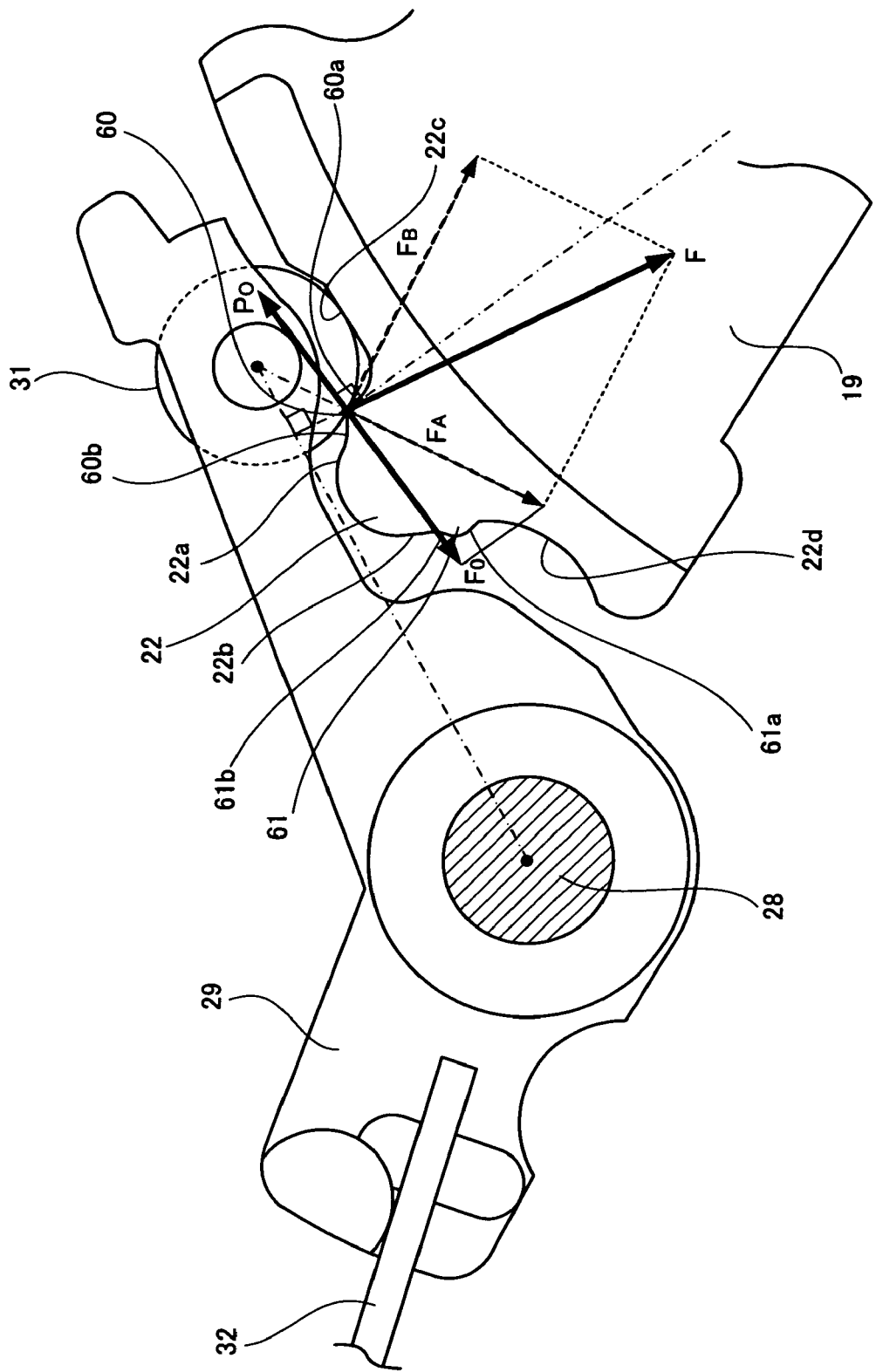
Figure 27:
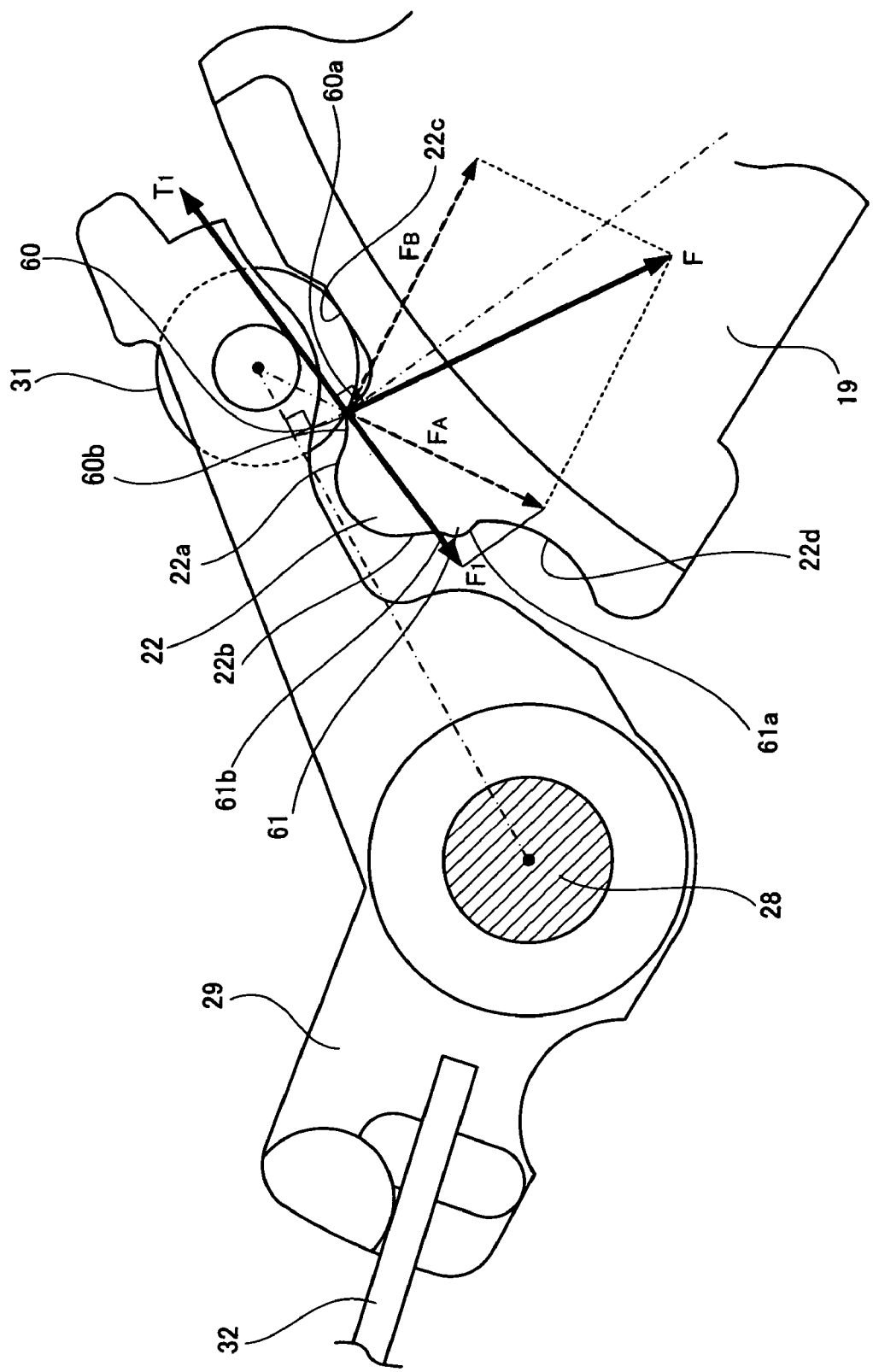
Figure 28:
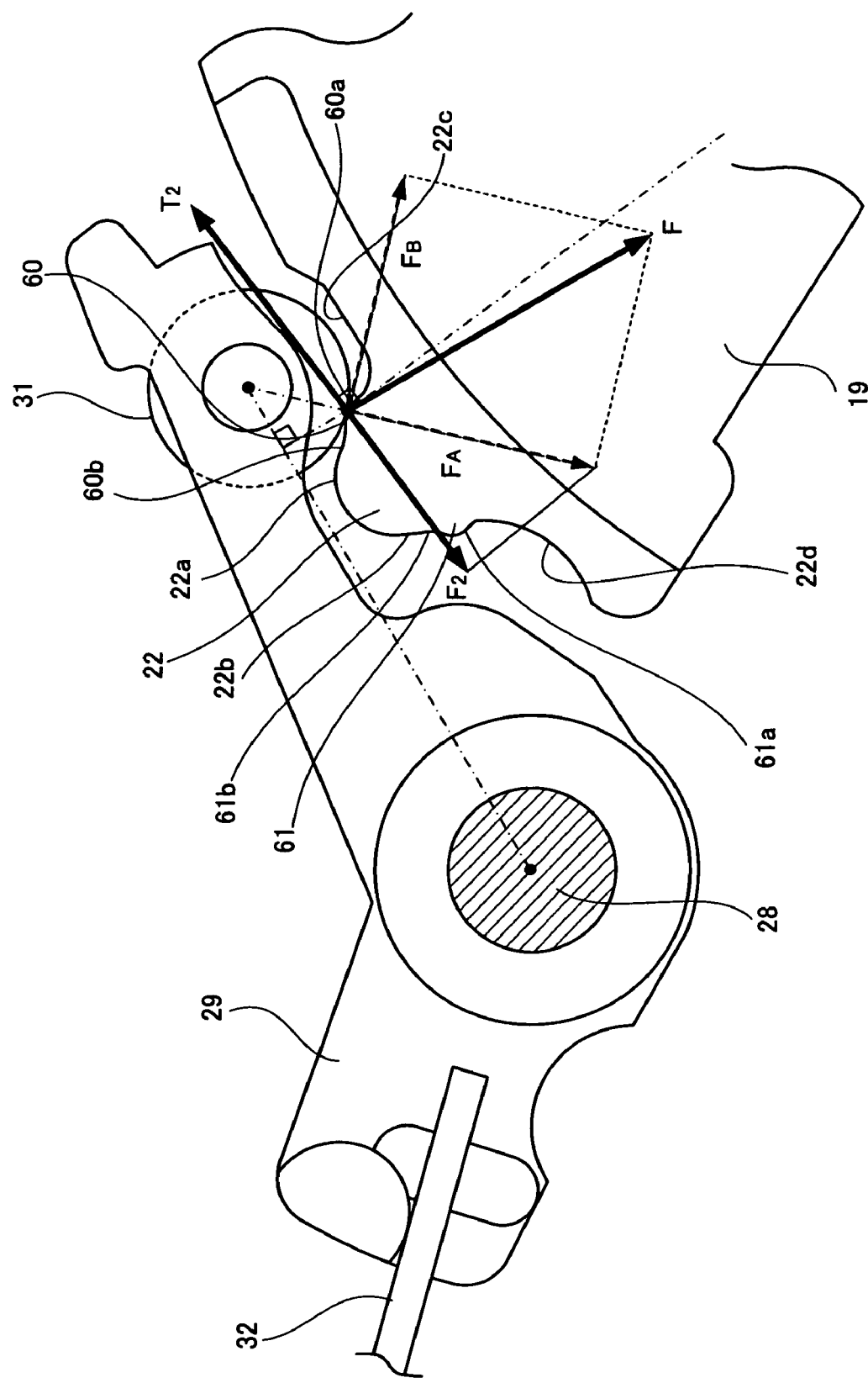
Figure 29:
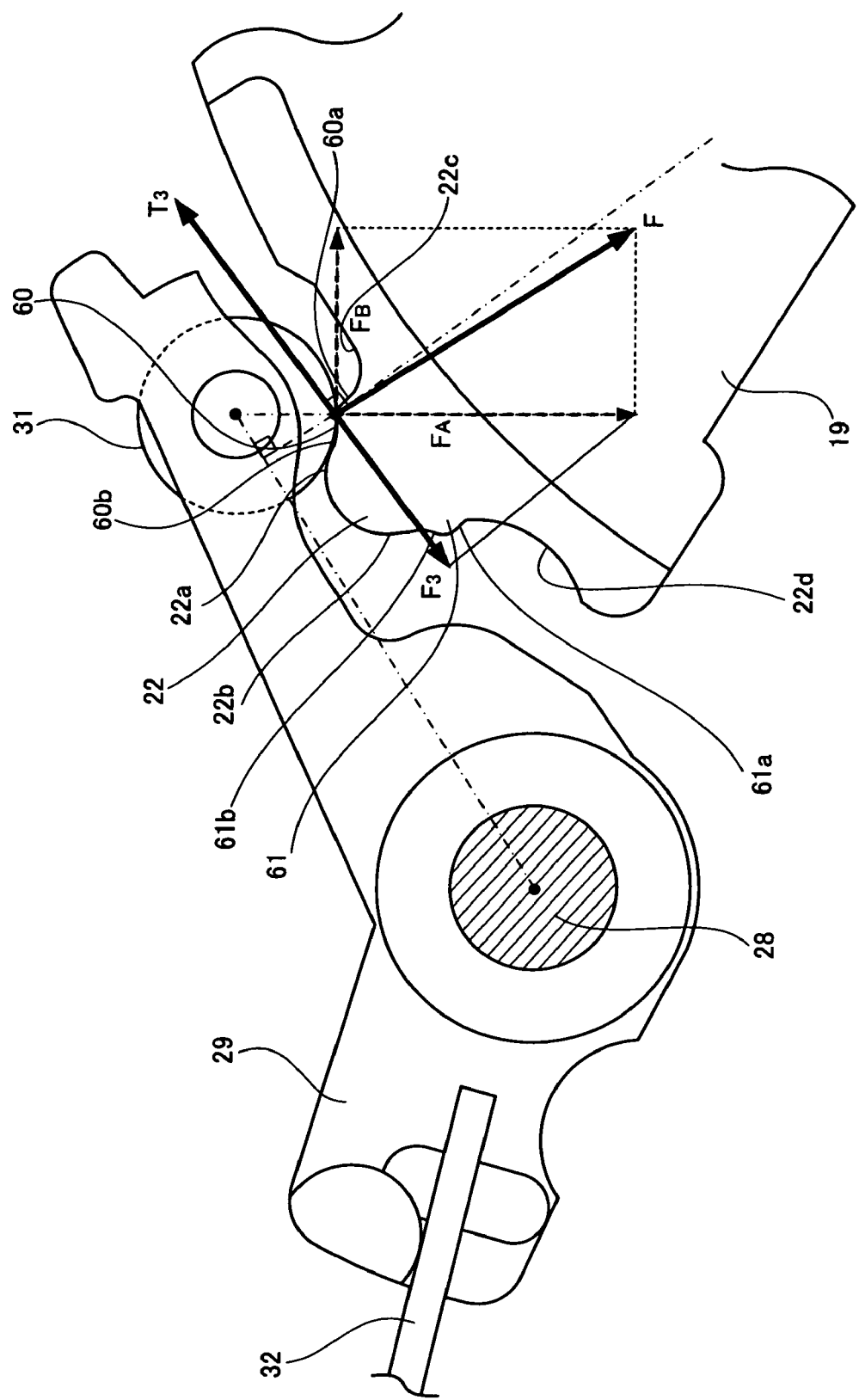
Figure 30:
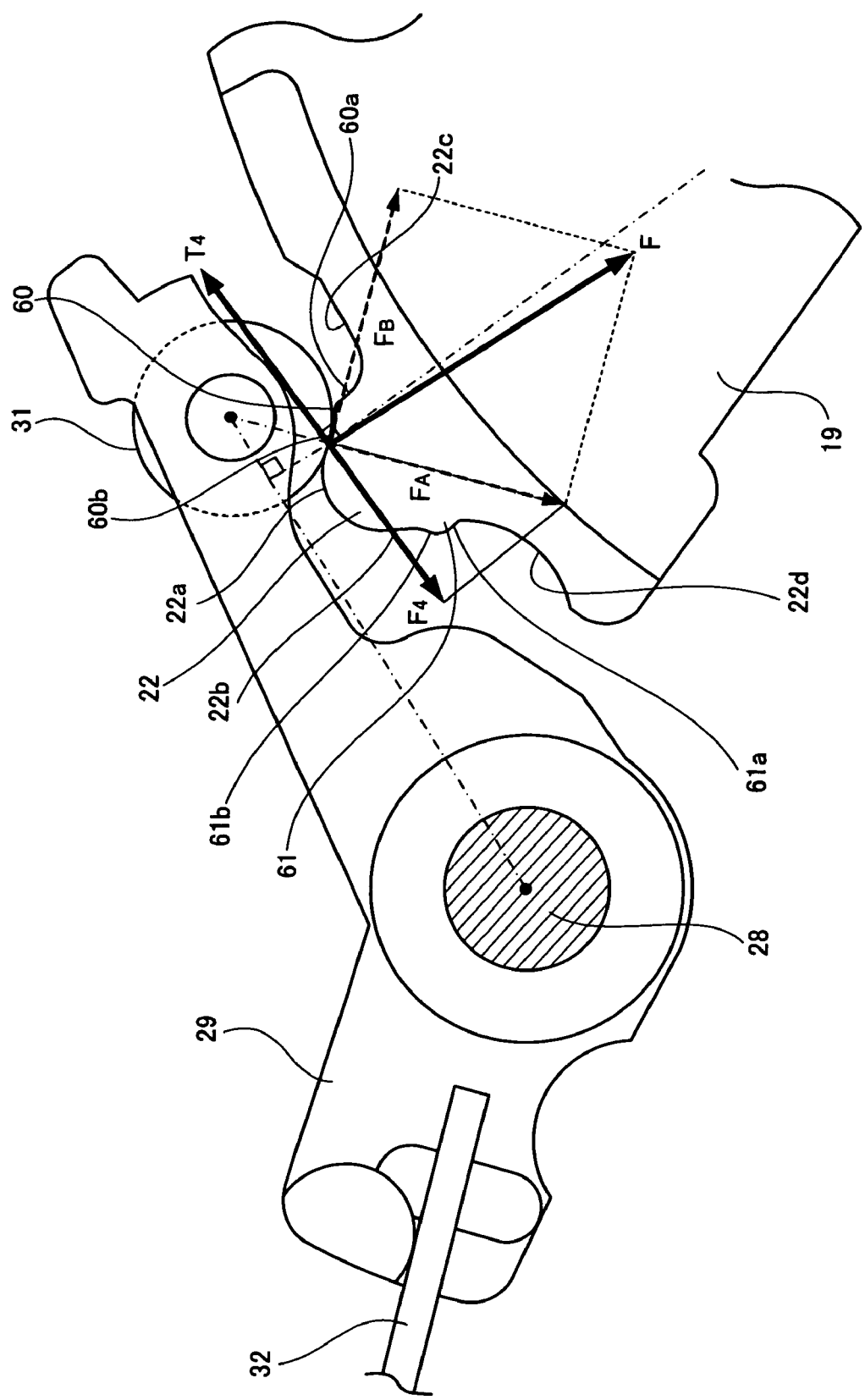

FIG. 24 is an enlarged plan view showing the principle part of the locking unit of the lifter driving part in the magneto-optical recording/reproducing apparatus. As shown in FIG. 24, convex portions 60 and 61 are formed respectively on a one-side active surface 22a and another-side active surface 22b of the cam 22 of the drive lever 19. The convex portions 60 and 61 come into contact with the cam following roller 31 and prevent the drive lever 19 from rotating in a non-electrified state. As enlarged in FIGS. 25 to 27, the convex portions 60 and 61 are configured such that first tilted surfaces 60a and 61a on the base of the cam 22 and second tilted surfaces 60b and 61b on the top of the cam 22 are combined. Joints of the first tilted surfaces 60a and 61a and the second tilted surfaces 60b and 61b are formed so as to protrude the most on the active surfaces 22a and 22b. As shown in FIG. 26, $F_0 > P_0$ is satisfied wherein $P_0$ represents force acting on the drive lever 19 along its rotation direction based on initial tension and $F_0$ represents force acting on the convex portions 60 and 61 of the cam 22 along the rotation direction of the drive lever based on force F acting on the locking arm 29 from a torsion spring 32. As shown in FIG. 27, $T > F_0$ is satisfied during electrification wherein T represents force acting on the drive lever 19 along its rotation direction based on the contractive force of the electrified linear members 43 and 44. In FIGS. 25 to 27, reference numeral 22c represents a one-side concave surface extending from the one-side active surface 22a on the cam 22 and reference numeral 22d denotes an other-side concave surface extending from the other-side active surface 22b on the cam 22.

Figure 31:
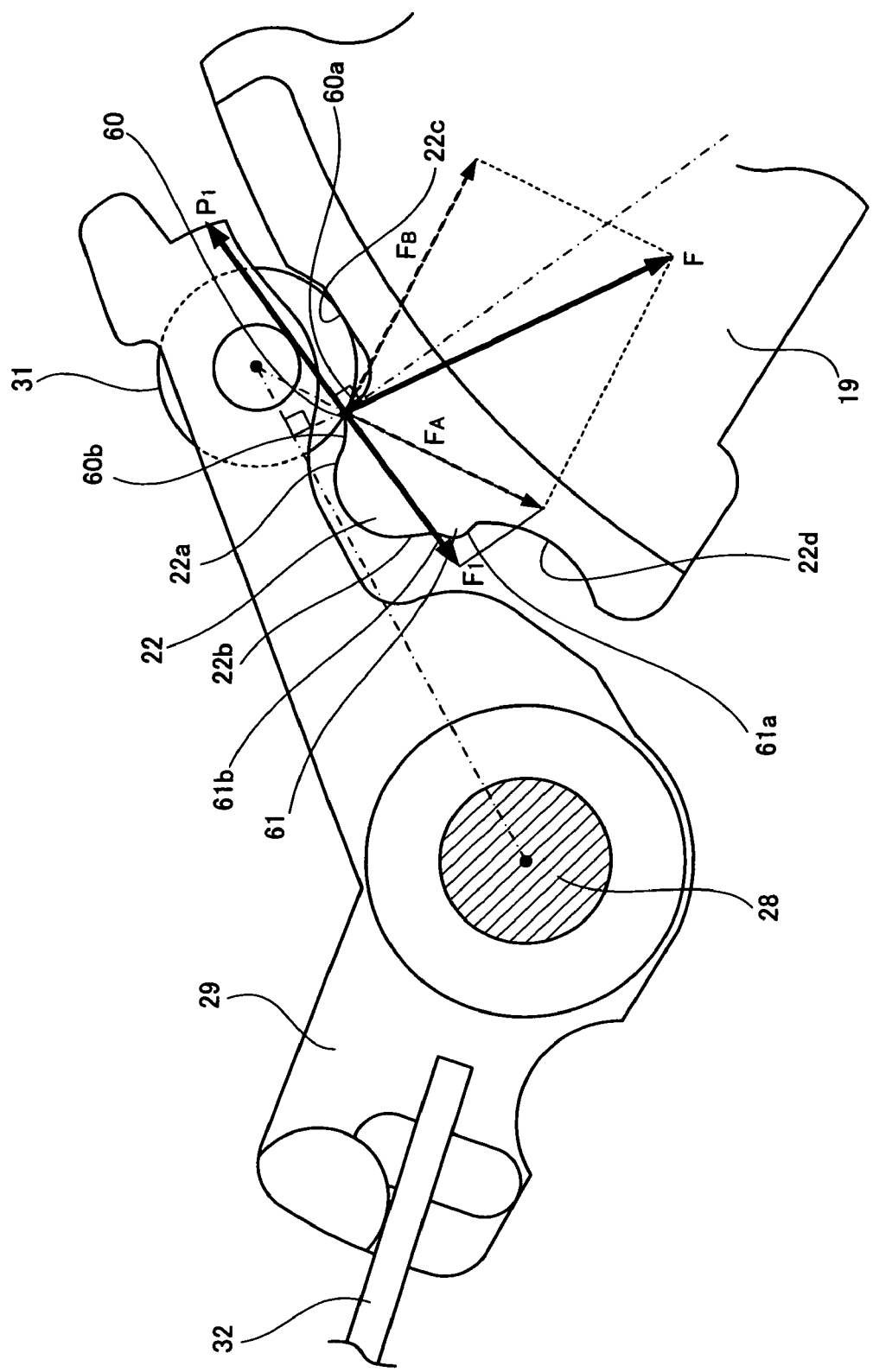
Figure 32:
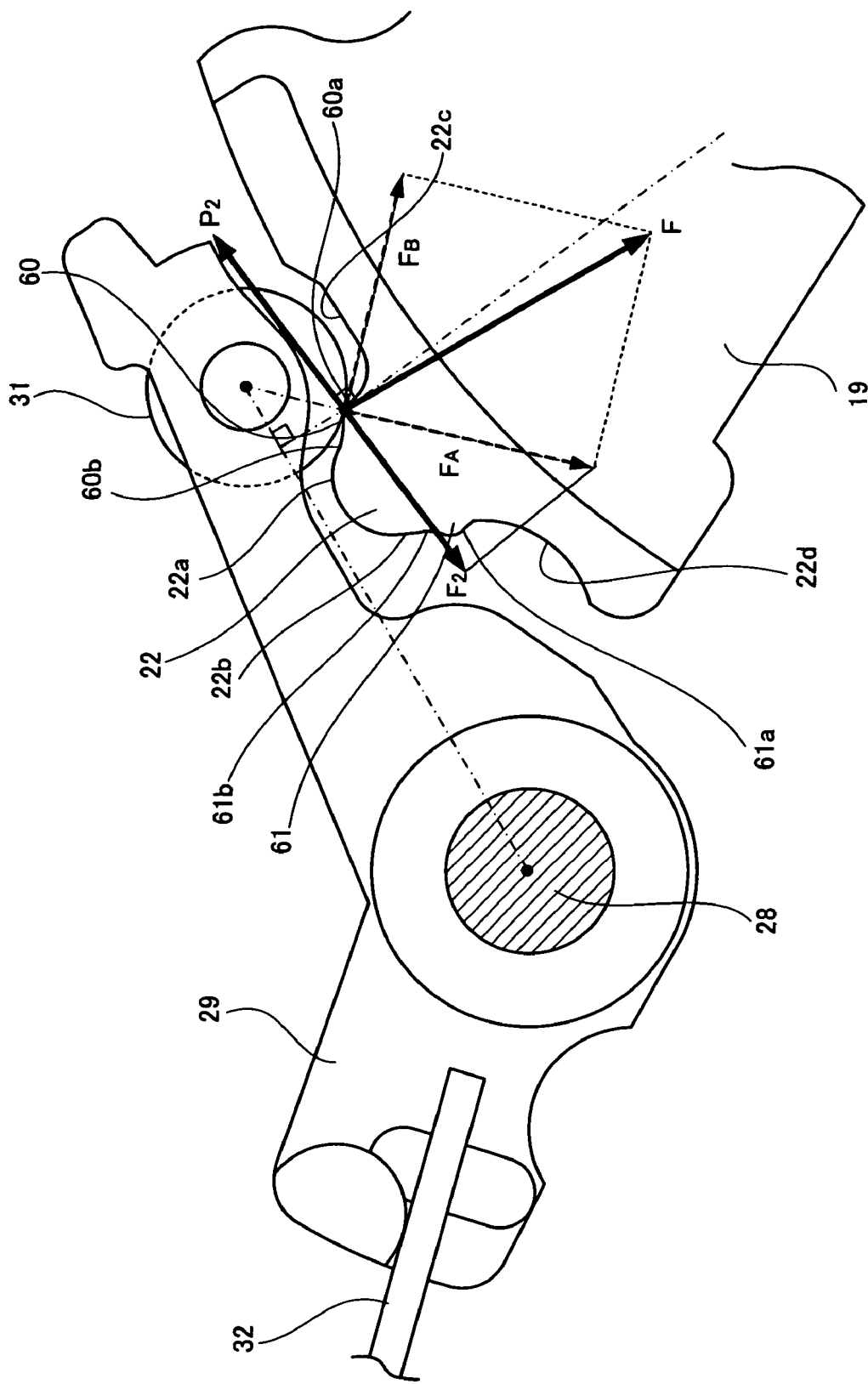
Figure 33:
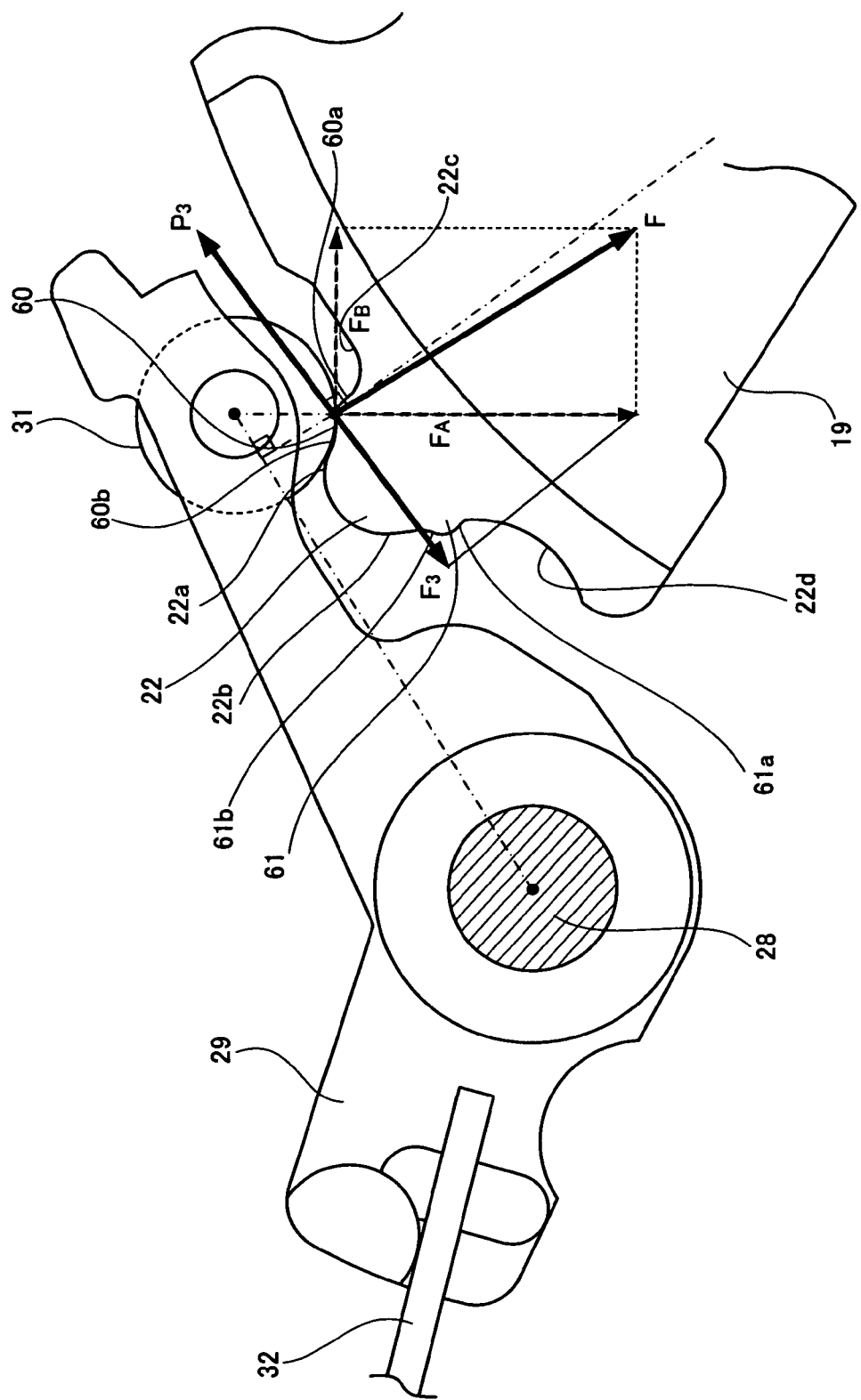

In some environmental changes or the like, portions and environments where the linear members 43 and 44 are placed may rise in temperature and thus result in natural contraction even when the linear members 43 and 44 are not electrified. In order to respond to such environmental changes, in the present embodiment as shown in FIGS. 31 and 32, the second tilted surface 60b of the convex portion 60 is formed such that urging force $F_4$ from the locking arm 29 is increased on the second tilted surface 60b after the state of FIG. 33. The state of FIG. 33 is obtained immediately after movement over the top of the convex portion 60 (the joint of the first tilted surface 60a and the second tilted surface 60b) from the first tilted surface 60a forming the convex portion 60 on the one-side active surface 22a. The second tilted surface 61b is similarly formed on the convex portion 61 of the other-side active surface 22b.

The following will more specifically describe a locking state in the operating device of the magneto-optical recording/reproducing apparatus configured thus.

As shown in FIG. 24, in the operating device of the magneto-optical recording/reproducing apparatus, when the linear member 43 connected to the drive rod 33 is electrified, tension generated by the shrinkage of the linear member 43 is applied to one side of the drive lever 19 via the drive rod 33, the connecting pin 35, and the connecting hole 23. The drive lever 19 rotates about the axis of the pivot shaft 19a of the drive lever 19 in one direction (arrow A) and moves to a position corresponding to the shrinkage of the linear member 43 (position where the cam following roller 31 moves over the one-side active surface 22a on the cam 22 of the drive lever 19 and comes into contact with the one-side concave surface 22c (FIG. 25)). In this case, the rotation of the drive lever 19 extends the linear member 44 through the drive rod 34 connected to the other side of the drive lever 19, and the linear member 44 extends until the initial tension of the default setting is generated. Thereafter, when electrification to the linear member 43 is stopped, the contractive force of the linear member 43 is eliminated. Thus, the initial tension of the linear member 44 acts on the drive lever 19 and the drive lever 19 is slightly pressed back in the other direction (arrow B). As shown in FIG. 26, the cam following roller 31 pivotally supported on the locking arm 29 via the shaft 30 comes into contact with the convex portion 60 of the one-side active surface 22a (to be specific, the joint of the first tilted surface 60a and the second tilted surface 60b of the convex portion 60) as well as the one-side concave surface 22c on the cam 22 of the drive lever 19.

In this state, the drive lever 19 is rotated by the initial tension in one direction (arrow A) and the cam following roller 31 slightly floats the one-side concave surface 22c. In this state, force F from the locking arm 29 acts on the convex portion 60 on the cam 22 of the drive lever 19 in a concentrated manner. However, as shown in FIG. 26, force $F_0$ acting along the rotation direction of the drive lever based on the urging force F from the locking arm 29 is set larger than force $P_0$ acting along the rotation direction of the drive lever 19 based on the initial force. Thus, the drive lever 19 stops in a state where the convex portion 60 of the cam 22 is in contact with the cam following roller 31, and then the drive lever 19 is stably kept in a locking state. In FIG. 26, reference character $F_A$ denotes a component of force generated from the force F from the locking arm 29. The component of force $F_A$ acts in the direction of the normal to the contact surface of the cam following roller 31. Reference character $F_B$ denotes a component of force generated from the force F from the locking arm 29. The component of force $F_B$ acts in the tangential direction of the cam following roller 31. Force $F_0$ acting along the rotation direction of the drive lever from the locking arm 29 is generated from a component of force of the force $F_A$ acting in the direction of the normal to the contact surface of the cam following roller 31.

FIGS. 27 to 30 show that the linear member 44 is electrified from the locking state. When the linear member 44 is electrified thus, tension generated by the shrinkage of the linear member 44 acts on one side of the drive lever 19. In this case, as shown in FIGS. 27 to 30, forces (rotary forces) $T_1$, $T_2$, $T_3$, and $T_4$ acting on the drive lever 19 along its rotation direction based on the contractive force of the electrified linear member 44 are set larger than forces (urging forces) $F_1$, $F_2$, $F_3$, and $F_4$ acting in the respective cases along the rotation direction of the drive lever from the locking arm 29 ($T_1 > F_1$, $T_2 > F_2$, $T_3 > F_3$, and $T_4 > F_4$ are set). Thus, in any case, the rotary forces $T_1$, $T_2$, $T_3$, and $T_4$ Of the drive lever 19 operated by tension caused by the shrinkage of the linear member 44 are larger than the urging forces $F_1$, $F_2$, $F_3$, and $F_4$ from the locking arm 29. Consequently, as shown in FIGS. 27 to 30, the drive lever 19 preferably rotates about the axis of the pivot shaft 19a in the other direction (arrow B), rotates from the state of FIG. 30, and moves over the top of the cam 22 (the joint of the one-side active surface 22a and the other-side active surface 22b). When the cam following roller 31 reaches the other-side active surface 22b on the cam 22 of the drive lever 19, force acting along the rotation direction of the drive lever from the locking arm 29 is applied in a direction of positively rotating the drive lever 19. Thus, after that, the drive lever 19 moves to a position according to the shrinkage of the linear member 44 such that the cam following roller 31 moves over the other-side active surface 22b on the cam 22 of the drive lever 19 and comes into contact with the other-side concave surface 22d. As shown in FIGS. 27 to 30, when the linear member 44 is electrified and caused to contract, the shrinkage of the linear member 44 slightly decreases in response to the rotation of the drive lever 19 to the linear member 44 ($T_1>T_2>T_3>T_4$), and the urging forces $F_1$, $F_2$, $F_3$, and $F_4$ acting along the rotation direction of the drive lever from the locking arm 29 are also changed ($F_1<F_2>F_3<F_4$) according to the shape of the convex portion 60 of the cam 22. In any state, the rotary forces $T_1$, $T_2$, $T_3$, and $T_4$ acting along the rotation direction of the drive lever 19 are set larger than the urging forces $F_1$, $F_2$, $F_3$, and $F_4$ acting along the rotation direction of the drive lever from the locking arm 29, and thus the drive lever 19 preferably rotates in the other direction (arrow B) without causing any problems.

When electrification to the linear member 44 is stopped after that, in a state in which the cam following roller 31 is in contact with the convex portion 61 of the other-side active surface 22*b* of the cam 22, the drive lever 19 positively stops and is stably kept in a locking state as in the case where the cam following roller 31 is in contact with the convex portion 60 of the one-side active surface 22*a* of the cam 22.

When the linear member 43 is electrified from the locking state, the drive lever 19 is preferably rotated about the axis of the pivot shaft 19*a* in one direction (arrow A) because of a similar power relationship, and the cam following roller 31 moves over the convex portion 61 of the other active surface 22*b* on the cam 22, the top of the cam 22, and the convex portion 60 of the one-side active surface 22*a* to the position making contact with the one-side concave surface 22*c*. Then, as described above, electrification to the linear member 43 is stopped, so that the drive lever 19 comes into the locking state.

In this way, the convex portions 60 and 61 making contact with the cam following roller 31 and preventing the rotation of the drive lever 19 in a non-electrified state are formed respectively on the one-side active surface 22*a* and the other-side active surface 22*b* on the cam 22. Thus, it is not always necessary to electrify the linear members 43, power consumption can be minimized, the rotation of the drive lever 19 can be preferably prevented in the non-electrified state, the locking state is stably kept, and the drive lever 19 can be preferably rotated during electrification. Further, the spring pressure of the torsion spring 32 is minimized within a range satisfying the power relationship, so that an amount of current can be reduced during electrification to the linear members 43.

FIGS. 31 to 34 show that a portion or an environment where the linear member 44 is placed rises in temperature and results in natural contraction, though the linear member 44 is not electrified.

In order to prevent problems in such a case, in the present embodiment as shown in FIGS. 31 to 34, the second tilted surfaces 60*b* and 61*b* of the convex portions 60 and 61 are formed such that urging force $F_4$ from the locking arm 29 is increased on the second tilted surfaces 60*b* and 61*b* after the state of FIG. 33. The state of FIG. 33 is obtained immediately after movement over the tops of the convex portions 60 and 61 from the first tilted surfaces 60*a* and 61*a* forming the convex portions 60 and 61 on the one-side active surface 22*a* and the other-side active surface 22*b*.

Figure 34:
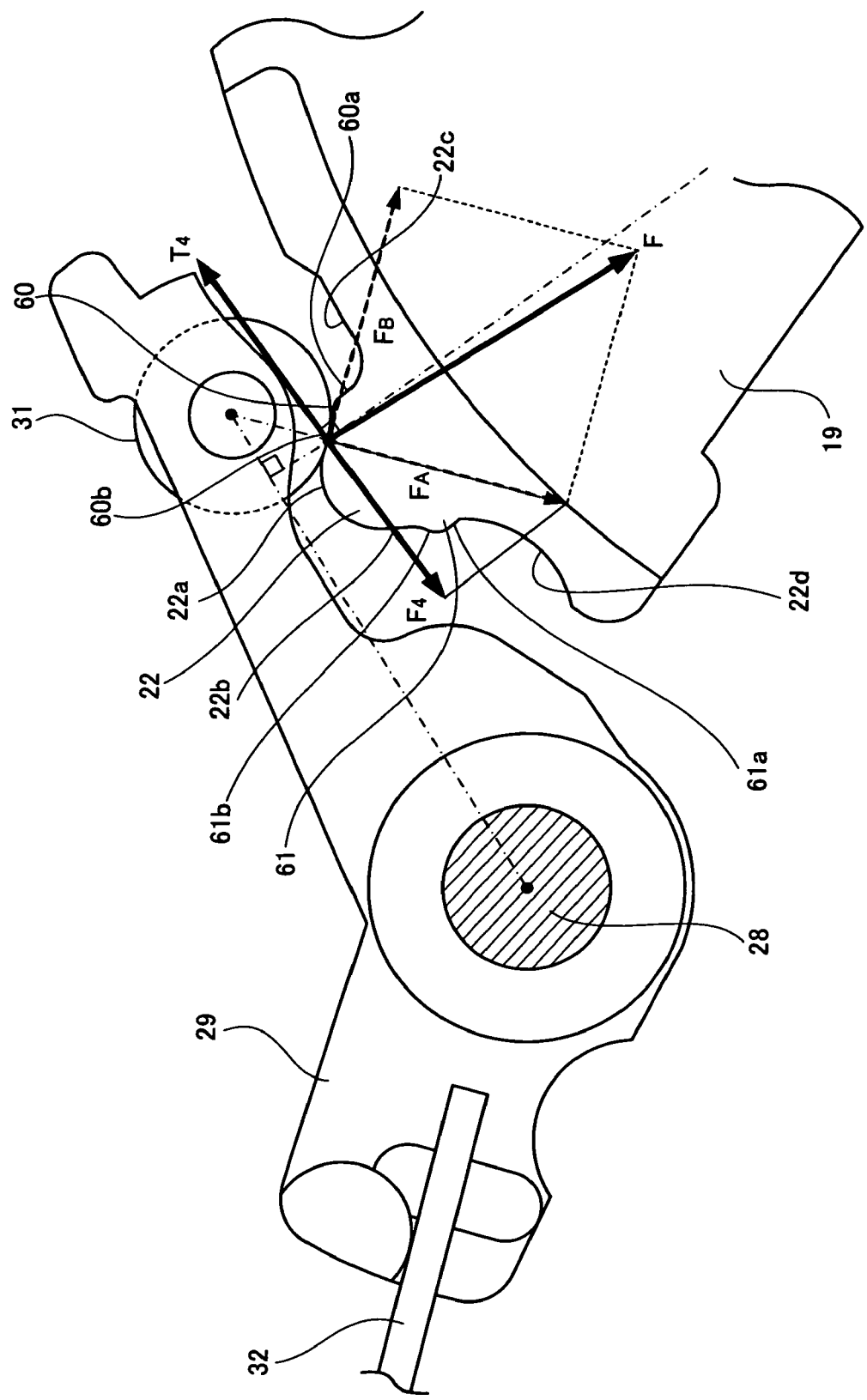
Figure 35:
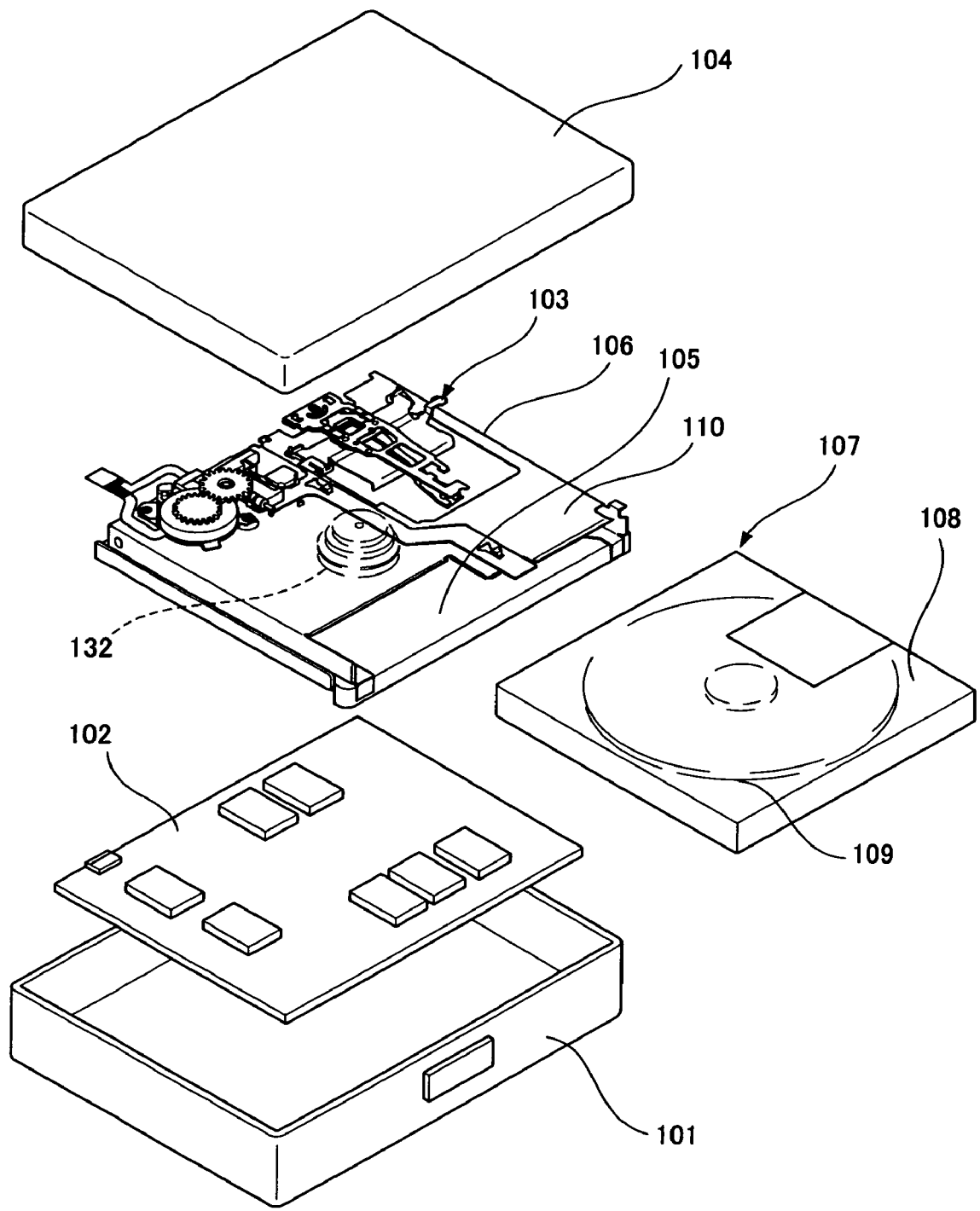
FIGS. 35 and 36 are exploded perspective views schematically showing a conventional magneto-optical recording/reproducing apparatus.
Figure 36:
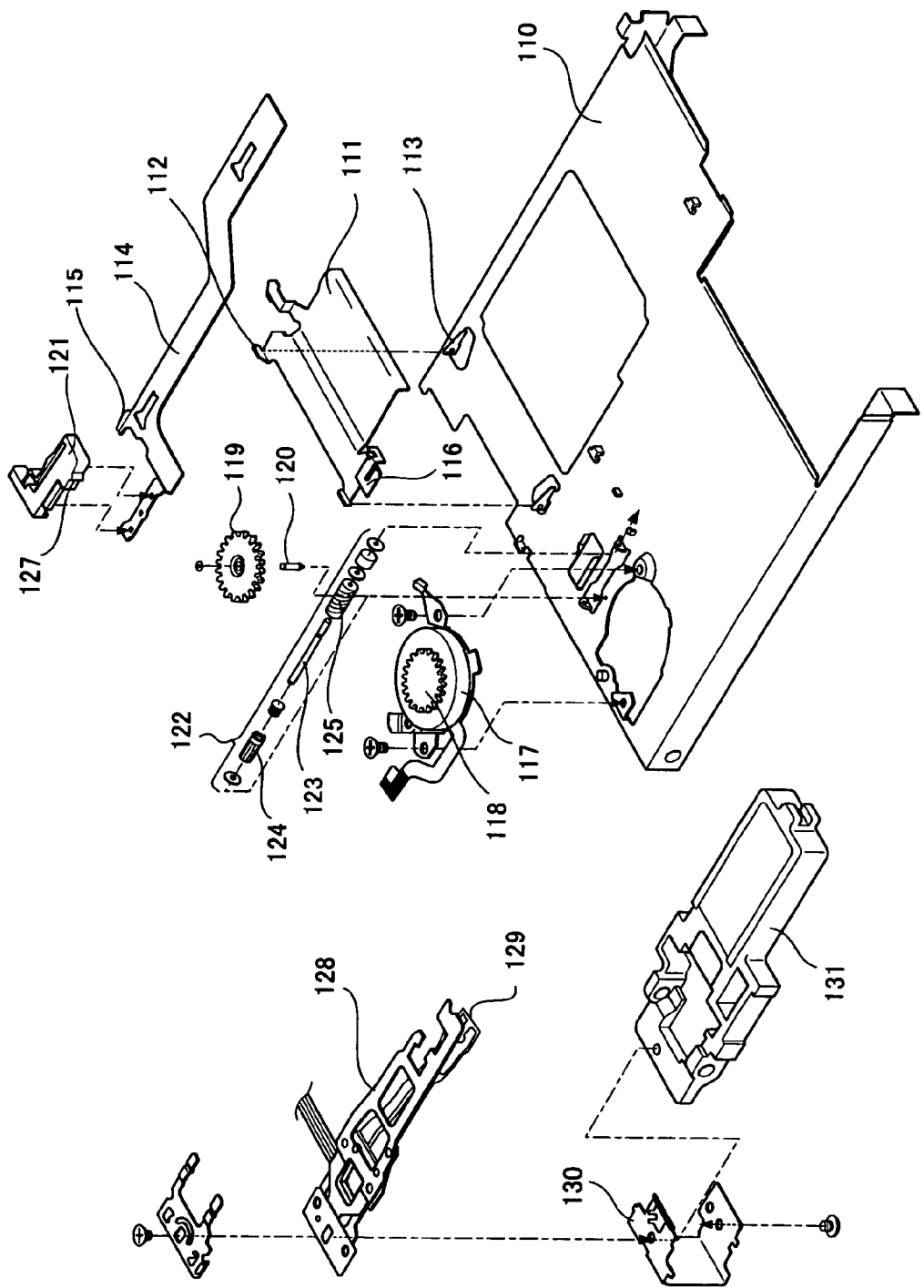
Figure 37:
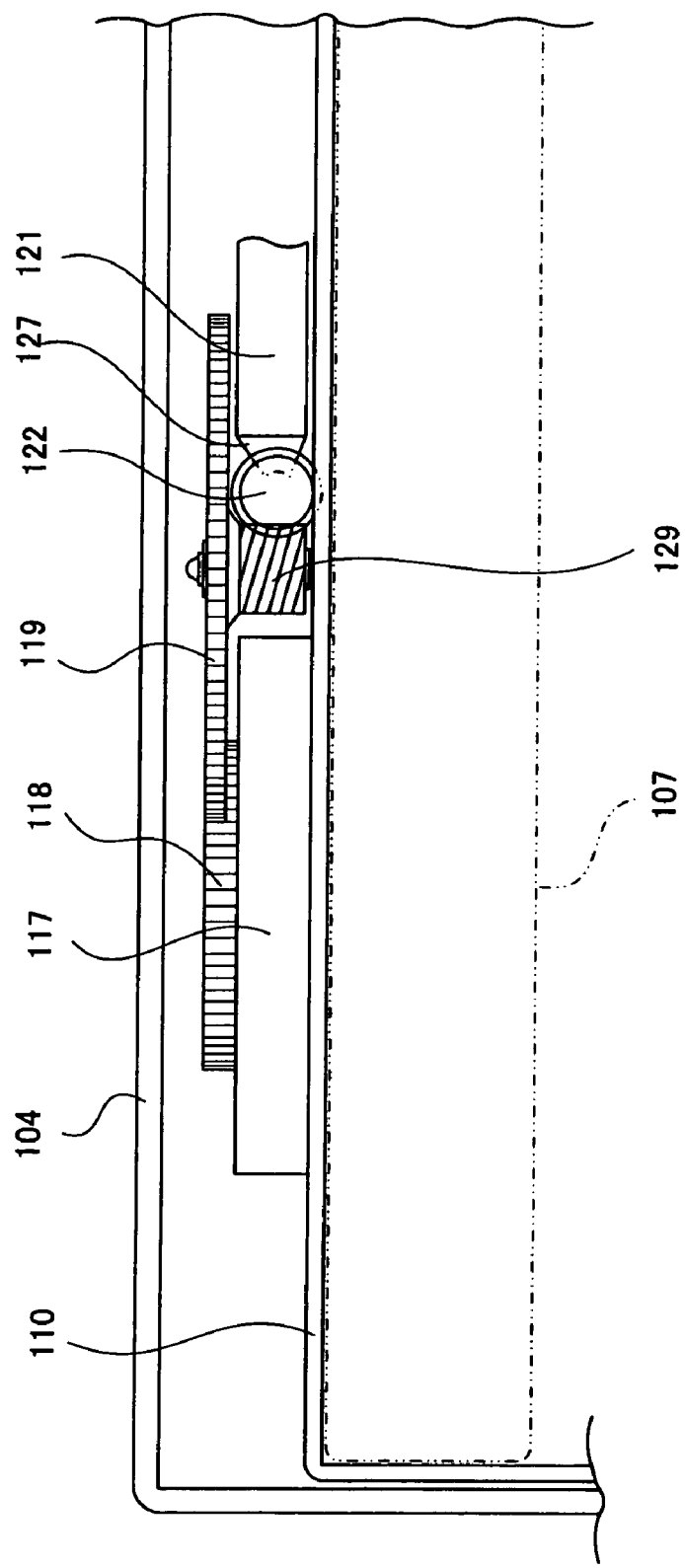
FIG. 37 is an enlarged view showing the principle part of the conventional magneto-optical recording/reproducing apparatus.
Figure 38A:
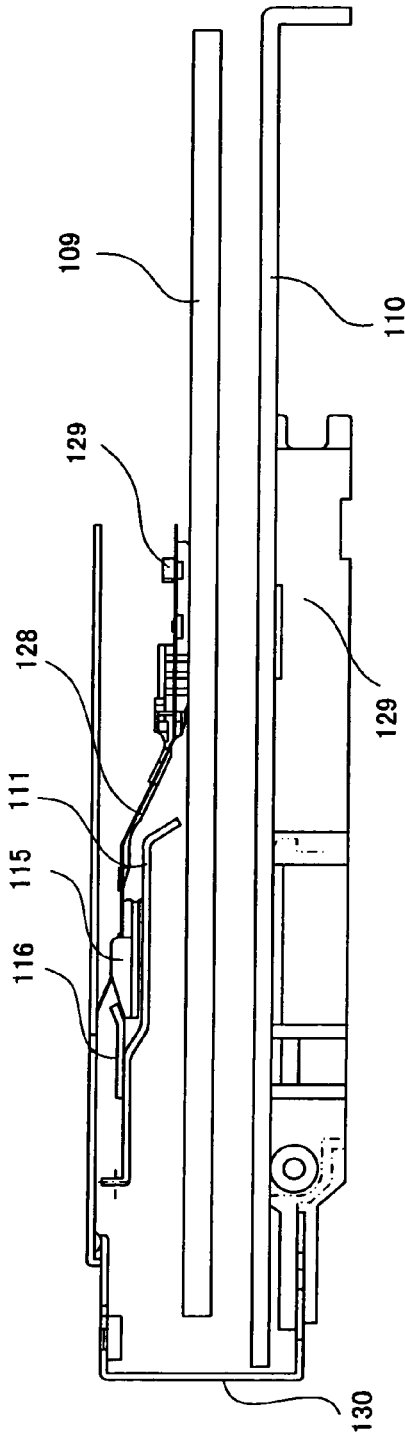
FIGS. 38A and 38B are enlarged side views showing a magnetic head unit of the conventional magneto-optical recording/reproducing apparatus.
Figure 38B:
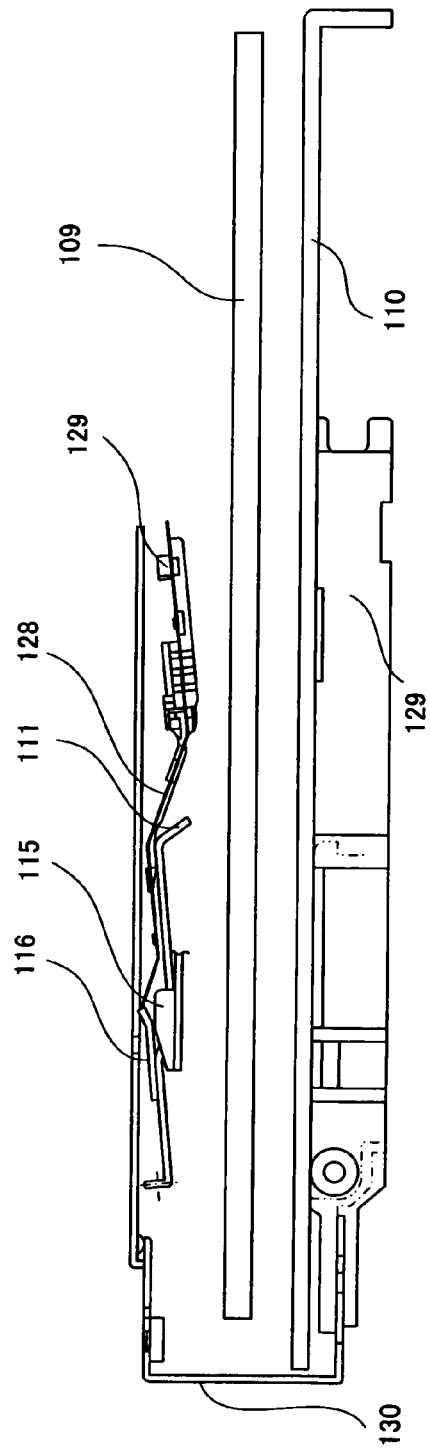
Figure 39:
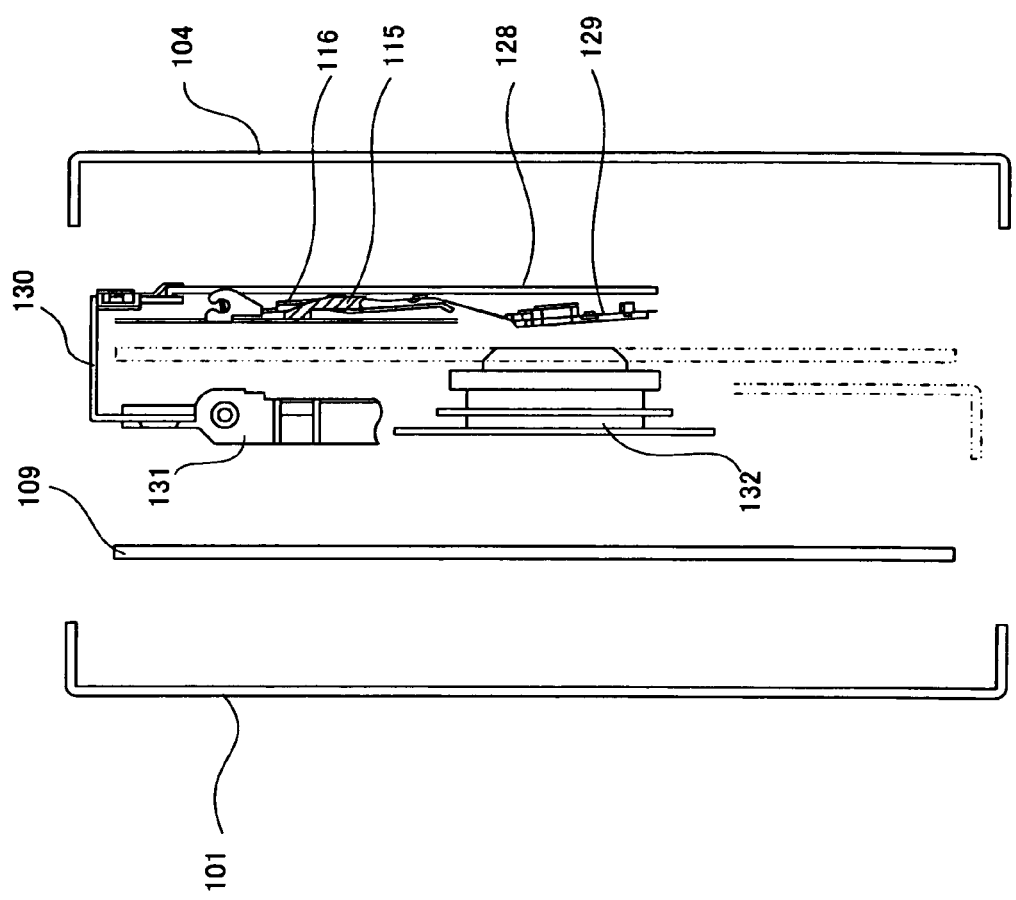
FIG. 39 is an enlarged exploded view showing the principle part of the conventional magneto-optical recording/reproducing apparatus.
Figure 40B:
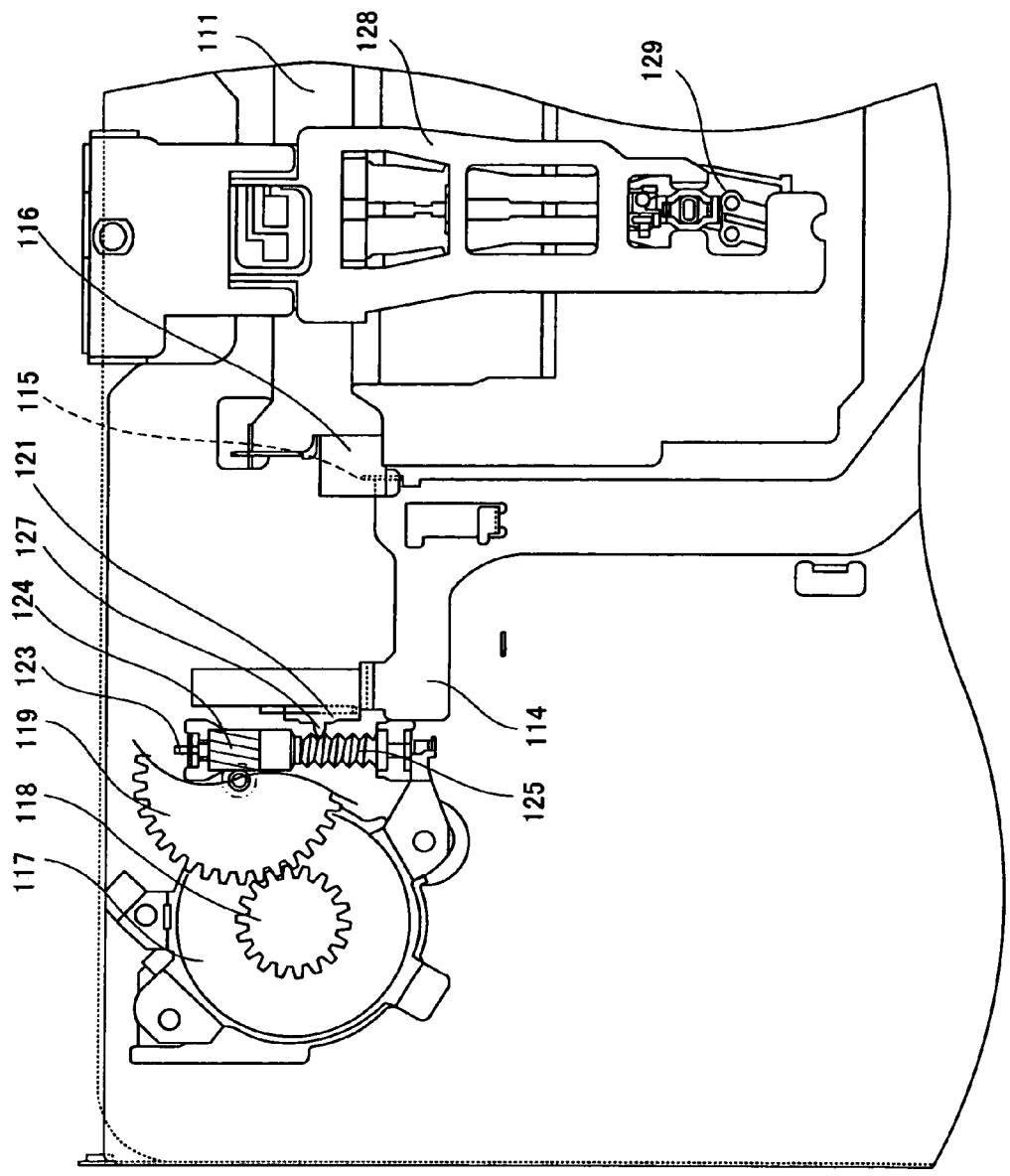
FIGS. 40A and 40B are a principle part enlarged side view and a principle part enlarged plan view of the magnetic head unit of the conventional magneto-optical recording/reproducing apparatus.
Figure 40A:
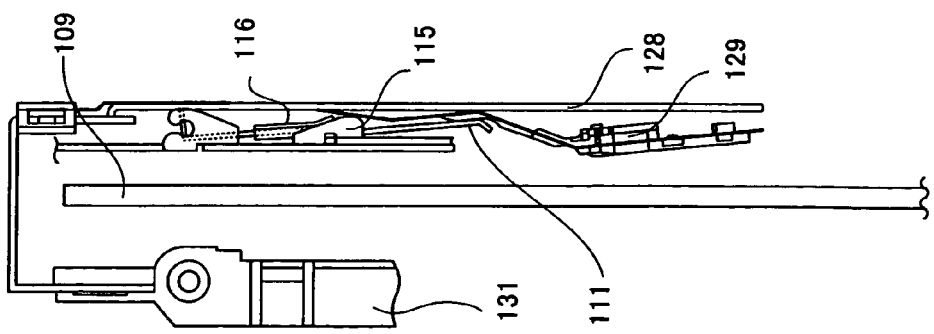
Figure 41B:
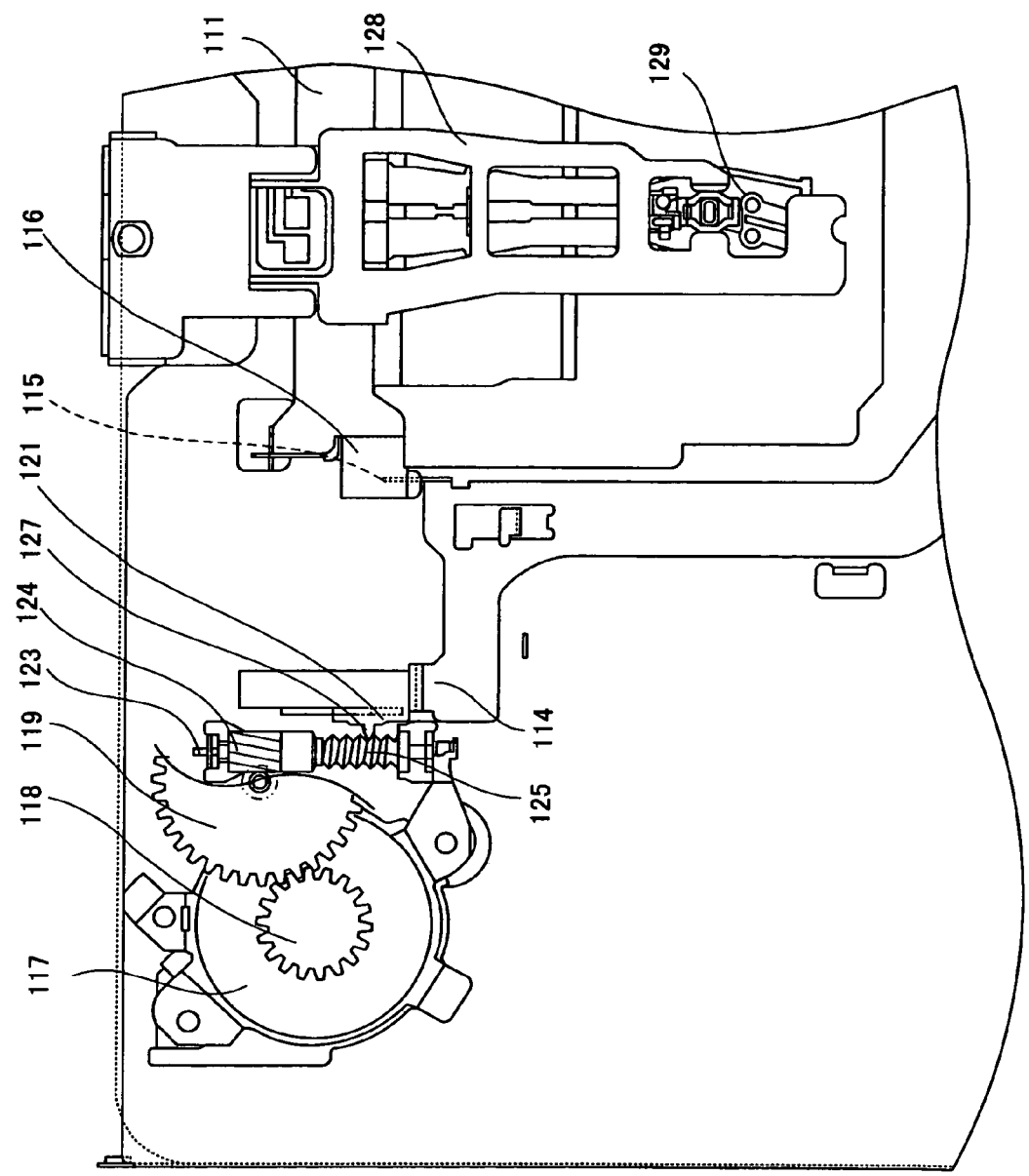
FIGS. 41A and 41B are a principle part enlarged side view and a principle part enlarged plan view of the magnetic head unit of the conventional magneto-optical recording/reproducing apparatus.
Figure 41A:
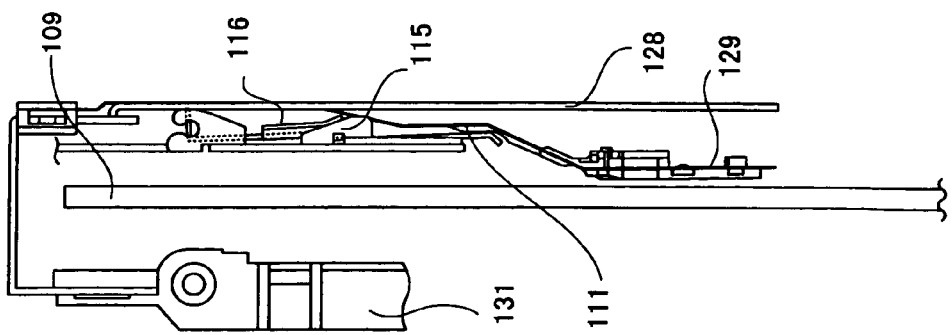
Figure 42B:
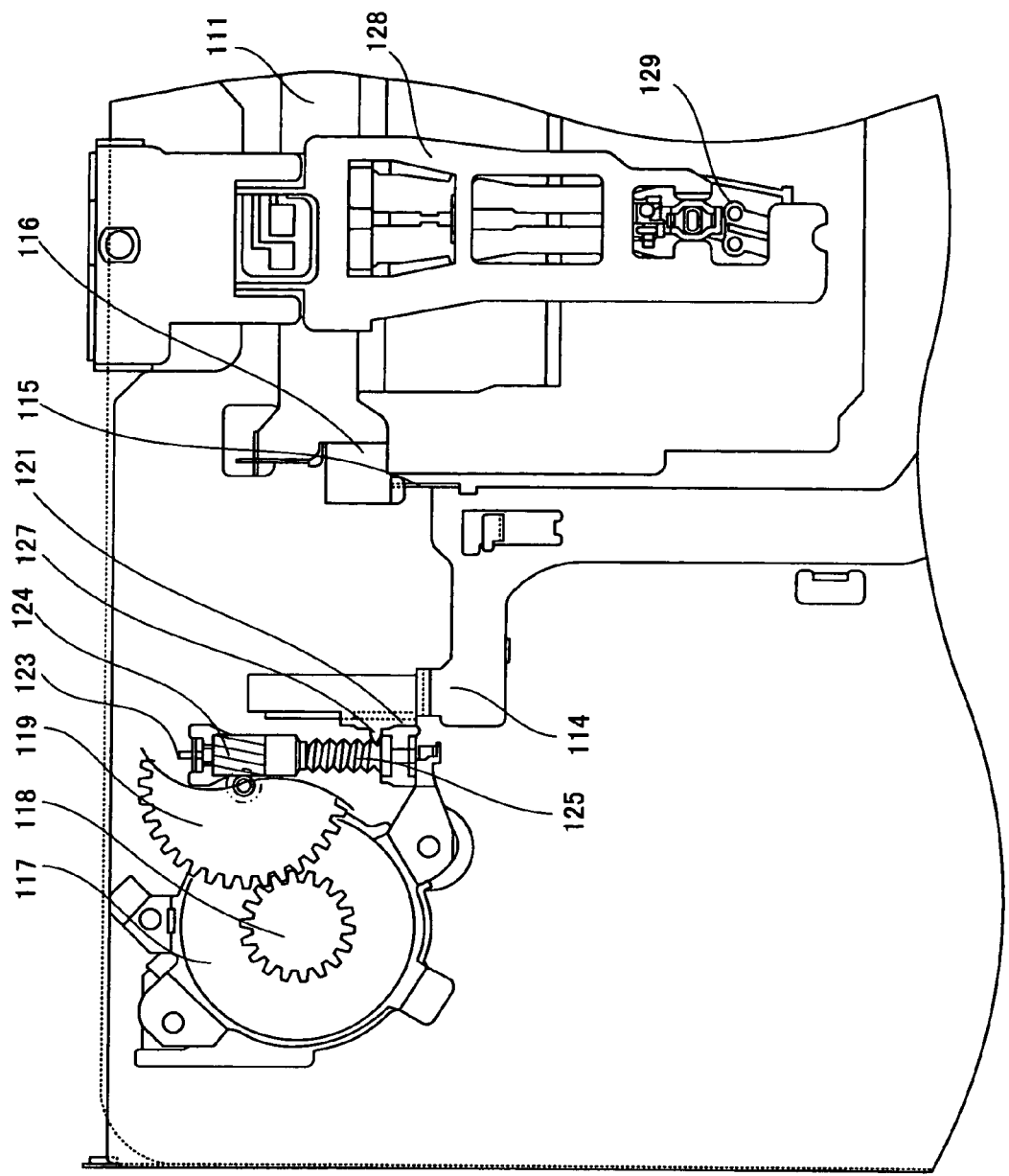
FIGS. 42A and 42B are a principle part enlarged side view and a principle part enlarged plan view of the magnetic head unit of the conventional magneto-optical recording/reproducing apparatus.
Figure 42A:
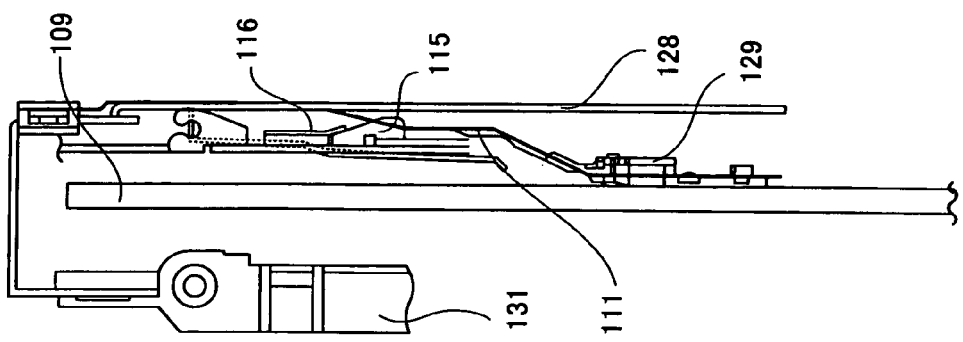

In the case where the linear member 44 is not electrified but the linear member 44 is caused to naturally contract due to a high temperature, rotary forces $P_1$ to $P_4$ of the drive lever 19 operated by tension generated by the shrinkage of the linear member 44 have a power relationship of $P_1>P_2>P_3>P_4$. As in the foregoing case, the rotary forces $P_1$ to $P_4$ gradually decrease according to a slight decrease in the shrinkage of the linear member 44. Meanwhile, the urging forces $F_1$, $F_2$, $F_3$, and $F_4$ acting along the rotation direction of the drive lever from the locking arm 29 are changed to $F_1<F_2>F_3<F_4$. In other words, as shown in FIGS. 31 to 33, when the cam following roller 31 is in contact with the joint (top) of the first tilted surface 60*a* and the second tilted surface 60*b* on the convex portion 60 of the cam 22 or immediately after the cam following roller 31 reaches the second tilted surface 60*b* from the top, a relationship of $P_1<F_1$, $P_2>F_2$, and $P_3>F_3$ is obtained and the drive lever 19 is allowed to rotate in the other direction (arrow B). As shown in FIG. 34, when the cam following roller 31 reaches the second tilted surface 60*b* of the convex portion 60, $P_4<F_4$ is obtained and the urging force $F_4$ of the locking arm 29 exceeds the rotary force $P_4$. In this state, the drive lever 19 comes into the locking state. Similar relationships are obtained in the case where the linear member 43 is not electrified but natural contraction occurs due to a high temperature, in a state in which the cam following roller 31 is in contact with the one-side concave surface 22*c* of the drive lever 19.

In this way, even when natural contraction acts due to a high temperature and the cam following roller 31 moves over the tops of the convex portions 60 and 61 from the first tilted surfaces 60*a* and 61*a* forming the convex portions 60 and 61, the cam following roller 31 is locked on the second tilted surfaces 60*b* and 61*b* and the locking state of the rotation of the drive lever 19 can be kept by the locking arm 29, thereby improving reliability.

The invention claimed is:

1. An operating device, comprising:
  a pair of linear members made of a shape memory alloy, and contracting axially due to heat generated by electrification and generating tension in the contracting direction;
  a movable member supported on a fixing member to be rotatable about a pivot shaft;
  a pair of drive rods respectively connected to both sides of the movable member with the pivot shaft being disposed between the sides of the movable member; and
  a power supply circuit for selectively electrifying the linear members,
  the linear members each having one end connected to the fixing member and the other end connected to the drive rod,
  the movable member repeatedly operating around the pivot shaft due to selective electrification of the power supply circuit, wherein
  the movable member comprises a locking unit for locking at rotation stop points in both directions around the pivot shaft,
  the locking unit including:
  a cam provided on the movable member,
  a locking arm having a base end pivotally supported on the fixing member and a leading end provided with a cam following roller which contacts with the cam slidingly, and
  an elastic member for urging the locking arm in a direction of pressing the cam following roller to the cam,
  the cam including:
  a one-side active surface a for applying force received from the cam following roller to the movable member swinging in one direction, and
  an other-side active surface for applying force received from the cam following roller to the movable member swinging in the other direction.

2. The operating device according to claim 1, wherein a single wire is bent to form the pair of linear members.

3. The operating device according to claim 1, further comprising a pair of lead portions formed in parallel with the linear members on a flexible printed board providing the power supply circuit of the operating device, wherein each of the lead portions has a leading end fixed on the drive rod and a base end fixed on the fixing member so that the lead portions can be distorted with shrinkage of the corresponding linear members, the movable member and the drive rods are connected by inserting connecting pins formed in one of the movable member and the drive rods into oval connecting holes formed in the other of the movable member and the drive rods, the connecting holes and the connecting pins are engaged with each other in a moving direction of the drive rods when the linear members are tensed by contraction and extension thereof, and the connecting holes accept movement of the connecting pins in the moving direction of the drive rods when the linear members are loosened in a non-electrified state.

4. The operating device according to claim 1, wherein the cam further comprises convex portions respectively formed on the one-side active surface and the other-side active surface, the convex portion for contacting with the cam following roller to prevent the movable member from rotating in a non-electrified state.

5. The operating device according to claim 4, wherein in the non-electrified state, initial tension acts in a contracting direction on the linear member not being switched from an electrified state to the non-electrified state, and $F_0 > P_0$ is satisfied wherein $P_0$ represents force acting on the movable member along a rotation direction thereof based on the initial tension and $F_0$ represents force acting on the convex portions of the cam along a rotation direction of the movable member based on force F acting from the locking arm, and in the electrified state, $T > F_0$ is satisfied wherein T represents force acting on the movable member along a rotation direction thereof based on contractive force of the electrified linear member.

6. The operating device according to claim, wherein even when the linear member naturally contracts due to a high temperature in the non-electrified state of the linear member and the movable member rotates so that the cam following roller moves over a top of the convex portion of the cam from a first tilted surface on a base side of the convex portion, the cam following roller has a second tilted surface formed near a top of the cam on the convex portion so that urging force from the locking arm is larger than rotary force of the movable member on the second tilted surface.

7. The operating device according to claim 5, wherein even when the linear member naturally contracts due to a high temperature in the non-electrified state of the linear member and the movable member rotates so that the cam following roller moves over a top of the convex portion of the cam from a first tilted surface on a base side of the convex portion, the cam following roller has a second tilted surface formed near a top of the cam on the convex portion so that urging force from the locking arm is larger than rotary force of the movable member on the second tilted surface.

8. A position switching device including the operating device according to claim 1, comprising a lifter held by the fixing member to be swingable between an active position and an inactive position, wherein the movable member has a guide surface for urging the lifter in a swinging direction, releases the lifter in the inactive position at a rotation stop point in one direction of the movable member, and swings the lifter to the active position at a rotation stop point in the other direction of the movable member, and the lifter is switched to the active position and the inactive position by the repeated operation of the movable member around the pivot shaft.

9. A magneto-optical recording/reproducing apparatus, comprising:

the position switching device according to claim 7; and a magnetic head provided to be swingable between a position at which the magnetic head slidingly contact with an optical disc and a position at which the magnetic head separates from the optical disc, wherein the position switching device has a lifter for holding, in an active position, the magnetic head at the position at which the magnetic head separates from the optical disc, and releasing, in an inactive position, the magnetic head at the position at which the magnetic head slidingly contacts with the optical disc, and a magnetic head placed so as to swing to and from a position making sliding contact with an optical disc and a position separated from the optical disc, wherein the position switching device has a lifter for holding, on an active position, the magnetic head on the position separated from the optical disc and releasing, on an inactive position, the magnetic head to the position making sliding contact with the optical disc.

\* \* \* \* \*